United States Patent [19]

Imazeki et al.

[11] Patent Number: 4,618,997

[45] Date of Patent: Oct. 21, 1986

[54] PORTABLE TRANSCEIVER

[75] Inventors: Kazuyoshi Imazeki; Toshiyuki Tanaka; Hiromichi Miyakoshi, all of Tokyo, Japan

[73] Assignee: General Research of Electronics, Inc., Tokyo, Japan

[21] Appl. No.: 592,825

[22] Filed: Mar. 23, 1984

[51] Int. Cl.[4] .............................................. H04B 1/40
[52] U.S. Cl. ...................................... 455/76; 455/77; 455/183; 455/186
[58] Field of Search .................................. 455/75–77, 455/165, 183, 186; 331/1 A

[56] References Cited

U.S. PATENT DOCUMENTS

| 4,153,877 | 5/1979 | Fathauer et al. | 455/76 |
|---|---|---|---|
| 4,245,351 | 1/1981 | Tults | 455/183 |
| 4,254,504 | 3/1981 | Lewis et al. | 455/77 |
| 4,377,871 | 3/1983 | Borras et al. | 455/76 |
| 4,484,355 | 11/1984 | Henke et al. | 455/76 |

Primary Examiner—Jin F. Ng
Attorney, Agent, or Firm—Trexler, Bushnell & Wolters, Ltd.

[57] ABSTRACT

A micrprocessor-controlled, frequency-synthesized radio transceiver system comprise a microprocessor for controlling the synthesis of local-oscillator frequencies for both the transmitting and receiving of radio signals. The microprocessor has a predetermined control capacity significantly smaller than the capacity required to control the synthesis of local-oscillator frequencies for a first plurality of radio frequencies. A transmitter circuit and a receiver circuit are capable of operating at all radio frequencies within the same predetermined band of frequencies. A control input arrangement permits customizing the microprocessor to control the synthesis of local-oscillator frequencies for a second plurality of radio frequencies within its predetermined control capacity. A phase-locked loop system is also provided for synthesizing the local oscillator frequencies, and comprises a VCO responsive to each of a plurality of predetermined voltage levels for generating an oscillatory signal at a corresponding frequency, a PLL control circuit coupled with the VCO and responsive to predetermined master control signals, each corresponding to a desired frequency, for producing a corresponding voltage level, and a pre-scaler circuit coupled intermediate the VCO and the PLL control circuit and responsive to the oscillatory signal for producing a scaled feedback control signal at a much lower frequency. The PLL control circuit is responsive to the feedback control signal for locking in the frequency of the oscillatory signal to the desired frequency.

15 Claims, 7 Drawing Figures

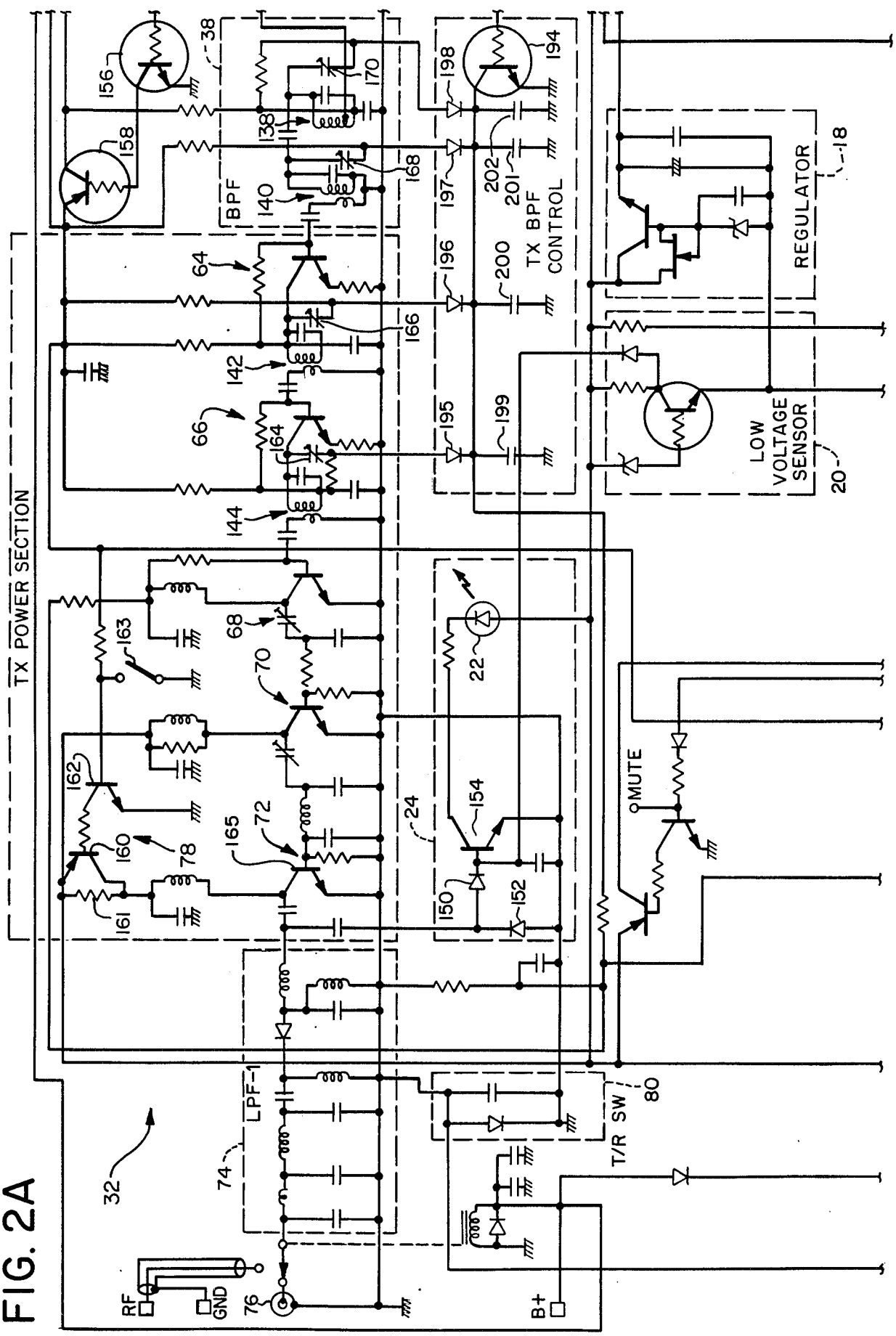

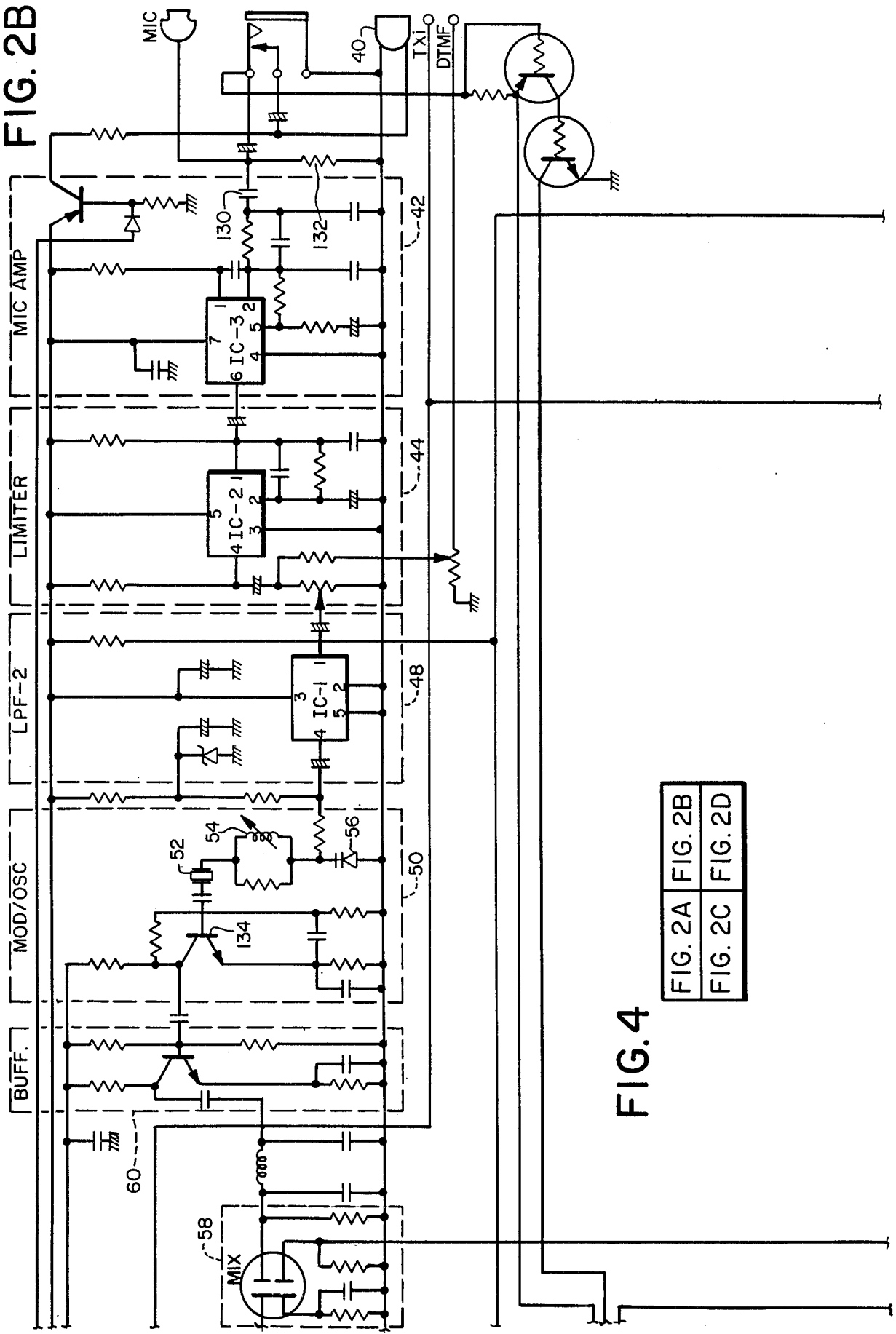

PORTABLE TRANSCEIVER

BACKGROUND OF THE INVENTION

This invention relates generally to the radio transmission and reception arts and more particularly to a novel and improved transceiver. While the invention may find utility in a broad variety of applications, the disclosure thereof will be facilitated by referring particularly to a portable, VHF transceiver.

Various bands or ranges of radio frequencies have been assigned by the U.S. Federal Communications Commission ("FCC") to be used for specific purposes and/or by specific users. For example, the frequencies between 88.1 and 107.9 MHz are divided into 200 KHz wide channels for use in commerical FM broadcasting. Similarly, the frequencies from 108 MHz to 136 MHz are divided into 25 KHz channels for use in civil aviation. The VHF bands include frequencies in the range of 136 MHz to 174 MHz and are divided into channels of varying widths for various uses.

It is this latter range of frequencies, 136 MHz through 174 MHz, to which the present disclosure is directed. However, it will be understood that the principles of the invention are applicable to other ranges of frequencies as well.

Moreover, within given frequency ranges, there are numerous radio-frequency divisions and sub-divisions which are mandated by the FCC, by both the purpose of the use and the identity of the user. These divisions may be several megahertz wide and the sub-divisions may be 5 KHz or 25 KHz wide. For example, generally speaking, the frequencies in the range from 138 MHz to 144 MHz are reserved for use by agencies or units of government, whether federal, state or local. In the same fashion, the frequencies from 144 MHz through 148 MHz are reserved for use by amateur or "ham" radio operators. Finally, the so-called VHF-high band, which includes carrier-frequencies from 148 MHz to 174 MHz, is sub-divided for a plurality of uses including commercial use by businesses.

Heretofore, it has been customary to provide a transceiver unit specially designed for two-way communications on one or more channels in a relatively small segment or portion of the foregoing frequency ranges or bands. For example, one wishing to operate on channels in the amateur-frequency ranges would purchase a transceiver capable of transmission and reception only in the 144 MHz to 148 MHz range. Substantial modification to such a transceiver would be necessary to enable transmission or reception on other channels or in other ranges. Moreover, such modifications may be prohibited by the FCC, which generally requires pre-approval of a transceiver unit as built and supplied by the manufacturer, and does not permit modifications of such units to broadcast in frequency ranges other than the "pre-approved" ones.

Accordingly, an individual or business desirous of two-way communication on channels located in more than one of the FCC-mandated and assigned channels has heretofore often been obliged to purchase separate transceiver equipment for each channel.

Advantageously, the present invention provides a novel transceiver which is capable of economically providing two-way communications at any carrier frequency in the 136 MHz to 174 MHz range of frequencies. Moreover, the transceiver in accordance with the invention is capable of being customized for a particular user's requirements for transmission and reception over a plurality of channels at widely-spaced frequencies within the foregoing relatively wide frequency ranges. As will be seen, the preferred embodiment of the transceiver of the invention described herein readily may be factory "programmed" to transmit and receive on a plurality of selected channels having carrier frequencies at any point within two separate and selectable 3-MHz wide segments of the foregoing range of frequencies. More or fewer such segments, as well as wider or narrower segments, or course may be provided without departing from the principles of the present invention.

For example, an individual or business which wishes two-way communications in a "business use" band (e.g., 150.815 to 150.995 MHz and 151.625 to 151.955 MHz) and in the marine band (i.e, 161.600 to 162.000 MHz) need only so specify when ordering a transceiver unit constructed in accordance with the invention. The transceiver of the invention may then be customized, quickly, easily and economically, for operation at a plurality of selected channels in these two bands. Advantageously, this provides a two-way communication system between salesmen or workers in the field, for example, and their offices or dispatchers, as the case may be, over selected channels at frequencies approved by the FCC for such use, but in relatively widely-shaped frequency ranges, without any interference either to or from transmissions taking place in closely adjacent channel frequencies.

Achieving the foregoing operations by conventional devices required a relatively bulky, complex and expensive transceiver. The present invention, however, advantageously achieves such operations in a relatively small and inexpensive, portable, battery-powered unit. Moreover, the invention advantageously utilizes relatively inexpensive and yet highly-reliable, microprocessor-controlled frequency-synthesized circuitry to achieve this operation.

More specifically, the provision of sufficient central processing unit ("CPU") or microprocessor ("processor") and related memory capacity to synthesize local-oscillator frequencies for various channels in the broad frequency ranges mentioned above has heretofore been relatively complex and costly. However, the transceiver of the present invention advantageously provides such features with but a minimum of processor capacity and memory space, hence requiring only relatively inexpensive and commercially-available processor components.

As an additional advantage, the transceiver of the illustrated embodiment utilizes frequency-synthesized, phase-locked loop ("PLL") tuning under the control of the novel CPU circuitry so as to achieve surprising accuracy in the tuning of each channel or carrier frequency selected within each of the pre-selected segments. Additional advantageous features of the present invention will become apparent upon reading the detailed description of the illustrated embodiment hereinbelow.

OBJECTS OF THE INVENTION

Accordingly, it is a general object of the invention to provide a novel and improved transceiver.

A more specific object of the invention is to provide a transceiver capable of operation over a broad range of frequencies, which may be customized or selectively programmed for operation on a plurality of channels within this range in accordance with the requirements of a particular user.

A related object of the invention is to provide a transceiver in accordance with the foregoing objects which is relatively small, light-weight and battery-operated for portable, hand-held operation.

A related object of the invention is to provide a transceiver in accordance with the foregoing objects which offers significant improvement in adjacent spurious signal rejection or control.

A further object of the invention is to provide a transceiver in accordance with the foregoing objects which offers a relatively high degree of resolution and flexibility of performance with but a minimum of complexity and expense.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIGS. 2A, 2B, 2C and 2D together form a schematic circuit diagram illustrating a preferred embodiment of the transceiver illustrated in block diagram form in FIG. 1;

FIG. 4 illustrates the manner in which FIGS. 2A through 2D inclusive may be arranged so as to view the entire circuit thereof.

DETAILED DESCRIPTION OF THE ILLUSTRATED EMBODIMENT

Figure 1:
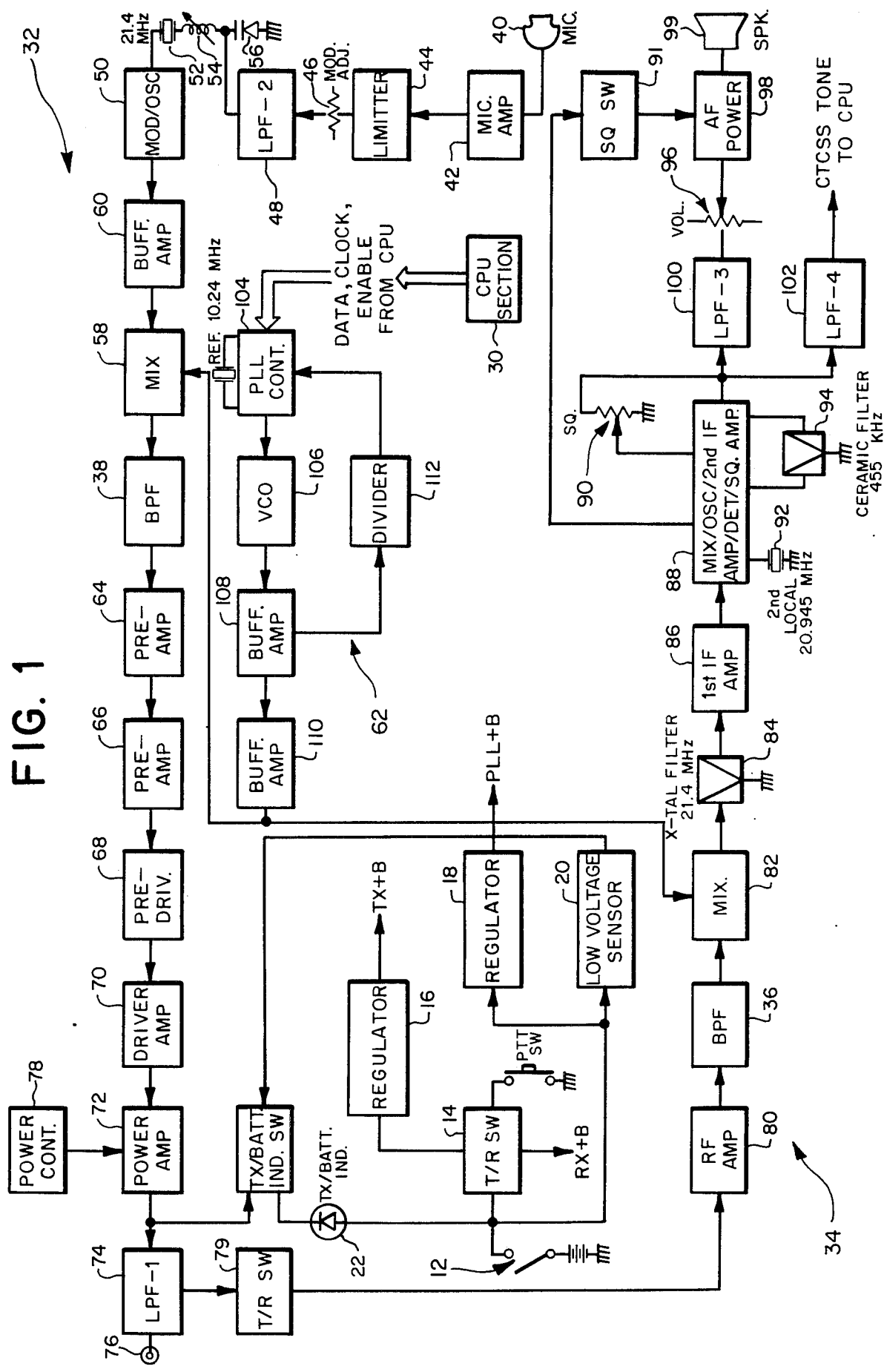
FIG. 1 is a block diagram of a transceiver constructed in accordance with the principles of the present invention.

Referring now to the drawings, and initially to FIG. 1, a transceiver constructed in accordance with the principles of the present invention is shown in block diagram form. In accordance with the invention, the portable transceiver comprises a microprocessor-controlled, frequency-synthesized transceiver system. Advantageously, the circuits of the invention are designed for use in a relatively small, light-weight, portable hand-held transceiver.

Preferably, the transceiver is battery powered, for example, by a battery 10. An associated on/off switch 12 applies the battery potential to a transmit/receive switch ("T/R SW") 14 which in turn switches the battery power either to the transmitter ("TX") portion or the receiver ("RX") portion of the transceiver. A voltage regulator 16 is also provided for the transmitter section. An additional voltage regulator 18 is provided for a phase-locked loop ("PLL") portion of the transceiver to be described later.

In the embodiment illustrated, a low-voltage sensor circuit 20 is provided for monitoring the battery voltage and for actuating a suitable indicator LED 22 if the voltage falls below a predetermined level. Preferably, this LED 22 also serves as a "transmitter on" indicator for indicating when the transmitter section is in operation. Accordingly, a suitable function switch 24 ("TX/BATT. IND. SW") is provided for coupling the LED 22 to one of the transmitter section and the low voltage sensor for this purpose.

In accordance with the invention, microprocessor means comprising a CPU section 30 are provided for controlling the synthesis of local-oscillator frequencies for both transmitting and receiving purposes. This microprocessor means has a predetermined, limited control and memory capacity. This is done to minimize the cost and space requirements of the CPU section for economical inclusion in the relatively small, portable transceiver system of the invention. Additionally, this permits use of a relatively inexpensive and readily available microprocessor components.

The capacity of the CPU section or microprocessor means 30 is materially smaller than the capacity required to control such local-oscillator frequency-synthesis for transmission and reception of all of the channels in a predetermined, relatively broad band of frequencies over which the transceiver of the invention is designed to operate. In the illustrated embodiment, the transceiver system is designed for operation over frequencies in a VHF band, in the range from 136 MHz through 174 MHz. However, in accordance with the invention, the capacity of the microprocessor means 30 is considerably smaller than that required for local-oscillator frequency-synthesis for all channels within this range.

As previously mentioned, the FCC has assigned various channels of 15 KHz, 20 KHz and 25 KHz widths in this VHF band. Accordingly, the CPU of the invention may be programmed to control tuning in 5 KHz increments in order to cover all of these channels. As will be more fully described later, the microprocessor means 30 is provided with sufficient capacity for tuning a predetermined number of channels in such 5 KHz increments over two 3 MHz segments of this VHF band. It will be noted that other ranges of frequencies as well as other segments may be selected for operation without departing from the invention.

A transmitter circuit means or transmitter ("TX") section designated generally by reference numeral 32 is capable of operation throughout the predetermined band or range of frequencies (i.e., from 136 MHz to 174 MHz). Similarly, a receiver circuit means or receiver ("RX") section designated generally by reference numeral 34 is also capable of operation over the entire range or band of frequencies (from 136 MHz to 174 MHz). Advantageously, variable tuning means is provided for both the transmitter and receiver sections 32, 34. This variable tuning means is operative for tuning both the transmitter circuit means 32 and the receiver circuit means 34 for operation over at least one segment of the predetermined band of frequencies (136 MHz to 174 MHz). In this regard, the segment selected comprises a predetermined range of frequencies and is selectable at any portion of the foregoing band. Moreover, this at least one segment is selected so as to extend over a range of frequencies which includes the selected channels or frequencies of operation which are within the predetermined control and memory capacity of the microprocessor means 30.

From the foregoing, it will be appreciated that the portable transceiver of the invention may be customized for the particular use desired by the customer, by the selection of a desired number of channels for transceiver operation. Accordingly, although the mircroprocessor means 30 need not have capacity for operation over the entire band of frequencies, the transceiver is nonetheless usable over the entire band by selecting a plurality of channels for operation or both, or either, of the transmitter section 32 and receiver section 34. In this regard, many users desire the selection of identical channels for operation of both the transmitter section 32 and receiver section 34, to enable two-way communications.

Once these channels have been selected and the CPU customized, as will be more fully described hereafter, two 3 MHz bands or segments are selected for BPFs 36, 38. These two segments are selected so that all of the selected channels fall within one or the other.

In the illustrated embodiment, the variable tuning means comprises a first tunable bandpass filter means ("BPF") 36 coupled in circuit with the receiver circuit means 34 and a second tunable bandpass filter means ("BPF") 38 coupled in circuit with the transmitter circuit means 32. These variable tuning means or variable BPFs 36 and 38 are operative for tuning both the transmitter circuit means and the receiver circuit means for operation over two such segments of the preselected frequency band. Hence, each of the two segments selected comprises a predetermined range of frequencies selectable at any portion of the predetermined band, while the two segments are selected to cover two ranges of frequencies which together include the predetermined number of channels or frequencies which have been selected and which are within the control capacity of the microprocessor means or CPU section 30.

In the illustrated embodiment, these two segments are each substantially 3 MHz wide. Advantageously, the selection of two such segments permits the selection of channels of operation at widely-spaced frequencies, since the two segments of operation of the BPFs may be selected at any portion of the band, whether close together, overlapping or widely spaced. For example, operation may be desired at several channels within a "business use" band (e.g., 150.815 to 150.995 MHz and 151.625 to 151.955 MHz) and another group of channels in the marine band (i.e., 161.600 to 162.000 MHz).

Accordingly, one of the 3 MHz wide segments may be selected by adjusting the center frequency of the BPFs to a frequency midway between 150.815 to .151.955 MHz. This may be referred to as the "low band" or low segment of operation. Similarly, the second or "high band" segment may similarly be accommodated by tuning the second BPF to a center frequency midway between 161.600 and 162.000 MHz. In addition to accommodating relatively widely spaced groups of channels, this limiting of the BPF operation to two 3 MHz segments greatly enhances adjacent spurious control (i.e., rejection or attenuation), because the effective BPF range is narrower than would be provided, for example, by utilizing a single 6 MHz wide band or segment.

With reference to the transmitting circuit means or TX section 32, a microphone 40 and associated microphone amplifier ("MIC. AMP") transmit voice communications to a limiter 44, a modulation adjust ("MOD. ADJ.") potentiometer 46, and a low-pass filter ("LPF-2") 48. LPF 48 feeds a modulator oscillator ("MOD-/OSC") circuit portion 50. This modulator/oscillator circuit 50 is also provided with a 21.4 MHz crystal 52, a tuning coil 54 and varactor 56. The voice signal to be transmitted is thus premodulated with a 21.4 megahertz sub-carrier, and this pre-modulated signal is fed out to a mixer stage 58 by way of a buffer amplifier stage 60.

The mixer stage 58 frequency modulates the premodulated signal to a suitable radio frequency ("RF") carrier signal at the selected transmit frequency, by using a local-oscillaor signal at an appropriate frequency which is provided from the PLL section, designated generally by reference numeral 62.

Advantageously, in view of the 21.4 megahertz premodulation, the PLL section 62 may operate at a frequency 21.4 megahertz below the desired transmission carrier frequency. This permits the use of readily available and inexpensive low-frequency components in the PLL section 62, as will be more fully described hereinafter.

The mixed and modulated signal from the mixer 58 is next fed through the variable tuning means or BPF 38, which has been pre-adjusted to permit transmission only in either of the two selected 3 MHz wide segments of the selected VHF band (136 MHz–174 MHz). Additional preamp stages 64, 66 and a predriver ("PRE-DRIV.") 68 feed the mixed and filtered signal to the final driver amp 70 and power amp 72. An additional output low pass filter 74 delivers the amplified signal to antenna 76 for transmission.

In the illustrated embodiment a further power control ("POWER CONT") circuit 78 is provided at the power amp 72 to control the gain and, hence, the power consumption thereof during transmission. This feature minimizes battery drain on the unit, which is significant in a relatively small, portable, battery-operated unit.

Referring now to the receiver circuit means or RX section 34, a RF amp stage 80 amplifies radio frequency ("RF") signals received from antenna 76 by way of the LPF 74 and an additional transmit/receive switch ("T/R SW") 79 which is also provided for switching between transmitter and receiver sections, to enable two-way communications. The RF amp section feeds the previously described tuning means or tunable bandpass filter means ("BPF") 36 which passes only those received frequencies which are within one or the other of the selected 3 MHz segments of the band. The BPF 36 feeds a mixer ("MIX.") circuit 82 which demodulates the signal to a 21.4 MHz IF level by mixing with an appropriate local-oscillator frequency provided by the PLL section 62. A 21.4 MHz crystal filter 84 feeds this mixed signal to a first IF amp 86 which feeds a second IF stage 88.

In the illustrated embodiment, the second IF stage 88 comprises an intergrated circuit component which performs the remaining demodulation functions, including a second mixer/oscillator, second IF amp, detector and squelch amplifier. A suitable squelch ("SQ") control in the form of potentiometer 90 is coupled to the second IF stage circuit 88. Additionally, a 20.945 megahertz crystal reference 92 is provided for the second local-oscillator and mixer function, thereby demodulating the frequency to the standard second IF frequency of 455 KHz (21.4 MHz less 20.945 MHz). A 455 KHz ceramic filter 94 is also provided for the second IF amp portion of the circuit 88. As with the 21.4 MHz premodulation in the TX section, this 20.945 MHz demodulation permits use of a relatively low-frequency from the PLL section 62 at the mixer 84, again permitting the use or relatively low-frequency components in the PLL section 62.

The second IF circuit 88 feeds the audio section of the transceiver including a volume control potentiometer 96, an audio or AF power amp 98 and speaker ("SPK") 99, by way of a low-pass filter 100 ("LPF-3").

An additional low-pass filter 102 ("LPF-4") is provided for applying demodulated CTCSS tones to the CPU section 30 for further processing.

Reference is next directed to the phase-locked loop means for PLL section 62. In operation, PLL section 62 is coupled to receive control signals including data, clock and enable signals from the CPU section or microprocessor means 30. The PLL section 62 is capable of synthesizing the correct local-oscillator frequencies for all of the radio frequencies within the selected 136 MHz–174 MHz band, in response to corresponding ones of the control signals from the CPU section 30.

In this regard, the microprocessor means or CPU section 30 is operative for producing predetermined control signals which include data corresponding to the local-oscillator frequencies for the selected channels of operation of the TX and RX sections 32, 34. The phase-locked loop means includes a PLL control means or circuit 104 which is responsive to these control signals from the CPU section 30 for controlling the synthesis of corresponding frequencies. The PLL control circuit feeds control signals to a voltage-controlled oscillator ("VCO") 106 which, in conjunction with a divider 112, buffer amplifier 108, and PLL control circuit 104, synthesizes the corresponding oscillatory signals or local-oscillator frequencies for use by both the transmitter section mixer 58 and the receiver section mixer 82. These local-oscillator frequency signals are fed out by way of buffer amplifiers 108 and 110. The buffer amp 108 also feeds back the VCO oscillatory signal or local-oscillator frequency to the PLL control means 104 by way of a novel dual-modulus selection means which includes a prescaler or divider circuit 112.

In accordance with a feature of the invention, the dual-modulus selection means is responsive to predetermined ones of the control signals from the CPU section 30 which are delivered thereto by way of the PLL control means 104 for controlling synthesis of the first and second group of local-oscillator frequencies. These first and second groups of local-oscillator frequencies are generated in response to the same frequency selection data from the CPU section. However, an additional control signal determines which of the first and second groups of local-oscillator frequencies are generated in response to given control data from the CPU section. As will be seen, this feature permits an increased tuning resolution, greatly improving transceiver performance, with but a minimum of additional CPU capacity.

Advantageously, the data storage or capacity requirement of the CPU section 30 is thereby reduced by an additional one-half with respect to the required data for frequency synthesis. That is, the provision of a dual-modulus selection means in the form of prescaler or divider 112 permits the generation of two groups of frequencies in response to the same data from the CPU section 30.

In operation, the foregoing modulus selection is done by providing two divisor ratios or a first and a second modulus for the divider 112. Hence, this divider 112, coupled in a feedback loop to the PLL control means 104, acts as a prescaler means coupled intermediate the VCO means 106 and the PLL control means 104. The prescaler or divider 112 is responsive to each oscillatory signal produced by VCO means 106 for producing a scaled feedback control signal to the PPL control means 104 at a frequency corresponding to the oscillatory signal divided by the selected divisor or modulus. Accordingly, a group of "even" frequencies and a second, like group of "odd" frequencies may be generated from a single set of frequency synthesis data from the CPU section 30 by alternatively selecting between the first and second divisor ratios or moduli of the divider or dual-modulus selection means 112.

As an additional advantage, provision of the dual-modulus prescaler or divider 112 permits operation of the PLL control means or circuit 104 at a frequency significantly lower than the transmit or receive frequency generated by the VCO. That is, the required frequency of PLL control means 104 operation is reduced by a factor corresponding to the selected modulus or divisor. Suitable control voltage scaling is then utilized to operate the VCO at the proper frequency. Together with the 21.4 megahertz crystal 52 of the TX section and 20.945 megahertz crystal 92 of the RX section, the use of prescaler divider 112 in this fashion permits PLL control circuit operation at a relatively low frequency, compared to the 136 MHz–174 MHz range of frequencies over which the transceiver operates. Accordingly, a relatively inexpensive low-frequency PLL control circuit 104 may be utilized.

Further details of the circuits of FIG. 1, as well as further details of the operation thereof will next be described with reference to FIGS. 2A through 2D inclusive, which together form a circuit schematic of a preferred form of the foregoing circuits. Reference is also invited briefly to FIG. 4, which illustrates the manner in which FIGS. 2A through 2D may be arranged so as to view the entire circuit.

Initially, attention is directed to FIG. 2B, wherein a first portion of the transmitter circuit means or TX section 32 is illustrated. An audio signal from the microphone 40 is applied to the input of an amplifier 42 ("IC-3") which has a pre-emphasis circuit comprising a capacitor 130 and a resistor 132. A second amplifier ("IC-2") serves as the modulation limiter 44, which controls or clips the signal from IC-3 to a predetermined level. Signals from the modulation limiter 44 are filtered by IC-1 which is the low pass filter 48 and has a cutoff frequency of 3 KHz and a 24 dB/octave rolloff.

The modulator and oscillator circuit 50 includes 21.4 megahertz crystal 52, tuning coil 54, varactor diode 56 and a transistor 134. This circuit frequency modulates the 21.4 MHz signal provided by crystal 52 with the signal from the filter IC-1 which is applied to the varactor diode 56. Buffer amplifier 60 applies the frequency modulated signal to mixer circuit 58 which comprises a dual-gate FET 136. This mixer then further modulates the frequency modulated signal with the output frequency of voltage-controlled oscillator ("VCO") 106 which is part of the PLL section 62.

Referring to FIG. 2A the mixer output signal is applied to bandpass filter 38 which includes transformers 138 and 140, as well as transformers 142 and 144, in circuit with respective preamp stages 64 and 66. These circuits feed the amplifying circuits 68, 70 and 72 which comprise the transmit power amplifier circuit to the antenna 76.

The switching circuit 24 is arranged for energizing LED 22 in response to the presence of an RF signal in the transmit power amplifier circuit (amplifier components 68, 70 and 72"). The circuit 24 samples a small portion of the RF signal from the power amplifier 72 at diodes 150 and 152 which apply the resultant DC level to switching transistor 154 to turn on LED 22.

Application of DC power of the modulator/oscillator section 50, the buffer amp 60 and mixer 58 is controlled by a pair of transistors 156 and 158. These transistors 156 and 158 are coupled to a transmit inhibit ("TXi") line or terminal which is controlled from the CPU section 30 and from IC 104 of the PLL section (see FIG. 2D). When the CPU section 30 is ready to transmit, a logic high level is delivered to the TXi terminal to turn on transistors 156 and 158 and thus supply power to the circuits 50, 60 and 58. However, if a malfunction should occur in the PLL section, pin 9 of the PLL control IC 104 (See FIG. 2D) pulls the TXi line low to turn off the transistors 156 and 158.

The power control section 78 comprises transistor 160 and 162 and a power level selection switch 163. This circuitry controls the gain of the power amplifier 72. When the switch 163 is closed, the transistor 162 is rendered non-conductive and the transistor 160 conducts to bypass current limiting resistor 161. Conversely, when switch 163 is open, transistor 162 is rendered conductive and transistor 160 turns off, putting biasing resistor 161 back in circuit and thereby lowering the bias current to the collector circuit of transistor 165 of the power amp circuit 72. This lowers the gain. The transmitter power is further controlled by operation of PTT switch 159 in the transmit/receive switching circuit 79 (see FIG. 2C).

Reference is next invited to the BPF circuit 68 including the previously mentioned transformers 138, 140, 142 and 144. In accordance with the invention, the BPF provides two 3 MHz pass bands or segments which may be individually selected during operation by the CPU section 30. As previously indicated, these two 3 MHz bands or segments may be either overlapping or separated as desired. During the setup operation, the technician sets the higher of the two bands or segments by adjusting the transformers 138, 140, 142 and 144. The lower of the two bands or segments is selected by adjusting tuning capacitors 164, 166, 168 and 170. Hence, the foregoing adjustable transformers and tuning capacitors comprise respective first and second variable impedance means for tuning the respective two segments of the larger VHF band in which the desired channels of operation are located.

Figure 2C:
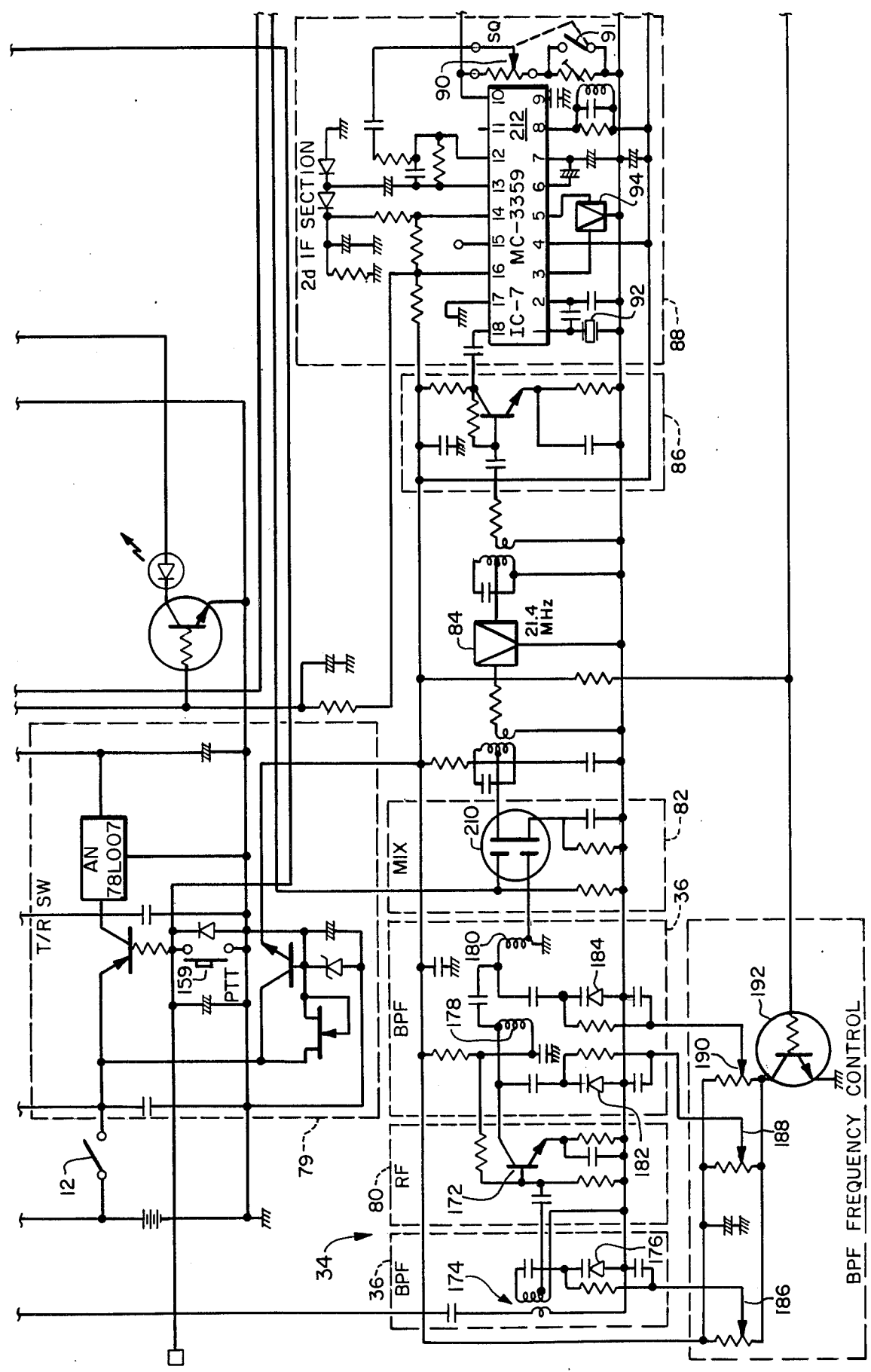

Selection of the two 3 MHz bands of operation for the receiver circuit means or RX section 34 is similar. In this regard, reference is now invited to FIGS. 2C and 2D, wherein the receiver section 34 is illustrated in greater detail. Referring initially to FIG. 2C, it will be seen that the RF amplifier stage 80 includes a transistor 172 which receives the signal from the antenna by way of the low-pass filter 74 and a first portion of the bandpass filter ("BPF") including transformer 174 and varactor 176. The remaining portion of BPF 36 includes similar transformers 178 and 180 and associated varactors 182 and 184. Varactors 176, 182 and 184 are also coupled with respective variable resistors 186, 188 and 190, each which is coupled to the positive voltage supply at one end thereof and to a switching transistor 192 at its opposite end.

During the set-up operation, the two 3 MHz bands or segments for the RX section are selected at this BPF circuit 36 in similar fashion to that mentioned above in the TX section BPF. In this regard, the higher band is tuned by adjusting the transformers 174, 178 and 180 while the lower band is set by adjusting the variable resistors 186, 188 and 190. Hence, these adjustable transformers and variable resistors comprise variable impedance means for tuning the desired two 3 MHz bands or segments.

The switching transistor 192 permits the separate adjustment of the respective transformers and variable resistors for the high and low bands, as well as the separate selection of the high and low bands by the CPU during receiver operation. In similar fashion, a similar switching transistor 194 is provided for the transmitter section BPF tuning control and band section (see FIG. 2A). This transistor 194 is coupled to the respective tuning capacitors 164, 166, 168 and 170 by respective diodes 195, 196, 197 and 198 which feed the collector electrode of transistor 194. Respective fixed capacitors 199, 200, 201, and 202 are also coupled intermediate the collector electrode of transistor 194 and ground. Accordingly, the tuning capacitors are disabled with transistor 194 in a non-conductive condition to enable tuning of the high band by adjustment of the transformers 138, 140, 142 and 144. Thereafter, the transistor 194 is switched to the conductive state for tuning the low band at tuning capacitors 164, 166, 168 and 170. Thereafter the transistors 192 and 194 are switched on and off during transmitter and receiver operation, respectively, to select one of these high and low 3-MHz bands. The switching action of the respective transistors 192 and 194 is controlled by the CPU section 30 by way of the PLL control IC 104 (at pins 14 and 15 thereof) as will be described later.

Referring briefly to the remaining portions of the receiver circuit means or RX section 34, it will be seen that the mixer circuit 82 comprises a dual gate FET 210 which receives a selected local-oscillator frequency from the PLL section 62 as will be described later. The 21.4 MHz crystal filter 84 then delivers the IF signal from the mixer 82 to the second IF section 88 by way of buffer amplifier 86. The second IF section 88 primarily comprises an integrated circuit component 212 ("IC-7"), preferably of the type MC-3359. This IC performs the second mixer and local-oscillator, second IF amp, detection and squelch control functions, as previously mentioned, in conjunction with the second local-oscillator 20.945 MHz crystal 92 and 455 KHz ceramic filter 94, as well as squelch control potentiometer 90 and which is ganged to a squelch control on/off switch 91.

Figure 2D:
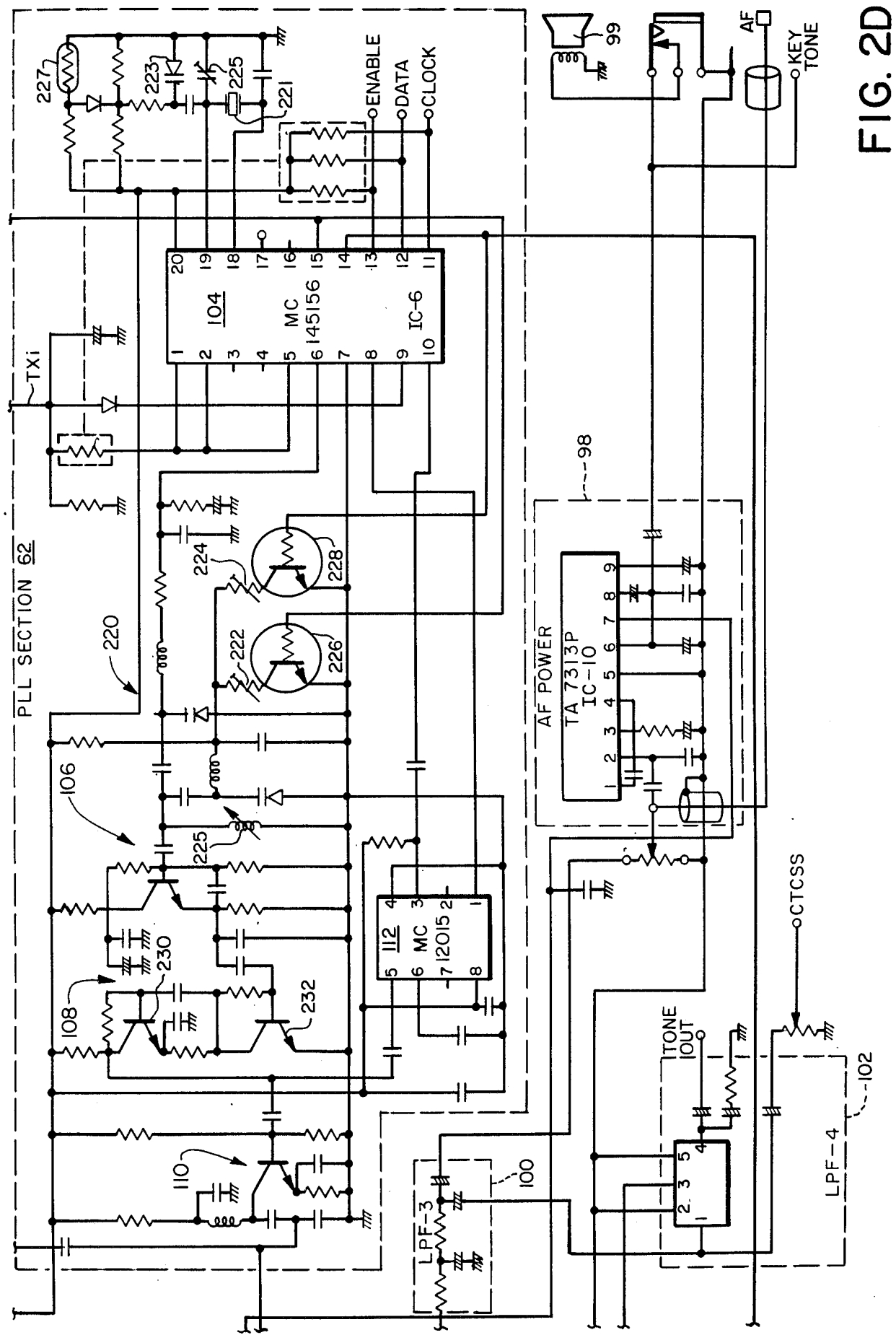

Referring briefly to FIG. 2D, the detected signal is fed to the AF power amp 98 by way of the low-pass filter 100 and volume control potentiometer 96 as previously mentioned. The additional low-pass filter 102 feed out any received CTCSS tones to the CPU section 30 for further processing. The AF power amp preferably comprises an integrated circuit ("IC-10") of the type generally designated TA7313P.

Reference is next invited to the PLL section 62 which is illustrated in FIG. 2D. As previously mentioned, the PLL section 62 includes PLL control means in the form of integrated circuit component 104 ("IC-6"), preferably of the type MC145156. This PLL control means is coupled with the VCO means or circuit 106 and is responsive to the "enable", "data" and "clock" control signals received on correspondingly indicated enable, data and clock lines from the CPU section 30. The data signals correspond to the desired frequency of operation, whether for transmission or reception. The PLL control means ("IC-6") responds to these signals by producing corresponding frequencies which are converted to suitable voltage control levels of the VCO 106 by an intervening frequency-to-voltage converting circuit designated generally 220.

This latter circuit 220 includes an adjustable tuning coil 225, and a pair of variable resistors 222 and 224.

The variable resistors 222, 224 are switched in and out of the circuit by respective switching transistors 226 and 228 in response to the previously mentioned switching control signals produced at pins 14 and 15 of IC-6. During the set-up operation, the technician sets the VCO 106 for operation in the selected 3 MHz segments by use of the tuning coil and variable resistors 222 and 224. That is, these elements are adjusted to obtain a range of frequency operation from the VCO which corresponds to the two ("high" and "low") 3 MHz bands or segments selected for the TX section and RX section are previously described.

In this regard, the variable tuning coil 225 is used to adjust the high band for both the transmit and receive sections. The variable resistor 222, when switched into circuit by activation of transistor 226, is utilized to tune the low band for the receiver section. Similarly, when the transistor 228 is activated, the variable resistor 224 is utilized to set the low band for the transmitter section. Thereafter, during operation the transistors 226 and 228 are alternatively switched in and out of circuit for operation of the receiver section and transmitter section in the high or low band as desired. It will be remembered that these same control outputs of the PLL circuit 104 also control the BPFs for selection of the high and low bands, by way of transistors 192 and 194 for RX and TX sections, respectively.

In operation, the high band is selected for operation of either the transmitter section or receiver section by deactivating both transistors 226 and 228 as well as the high/low band selection transistors 192 and 194. Alternatively, the low band of operation for the receiver section is selected by switching on transistors 226 and 192, while the low band of operation for the transmitter section is selected by switching on transistors 228 and 194.

Accordingly, the variable resistors 222, 224 and tuning coil 225, and the transistors 226 and 228 comprise range setting and selection means. These are coupled intermediate the PLL control means 104 and the VCO means 106 and are responsive to range selection signals; that is, the switching signals produced at pins 14 and 15 of the PLL control means 104 for initially setting, and thereafter for selecting between, the two 3 MHz segments or corresponding ranges of frequencies of the local-oscillator signals to be produced by the VCO means 106. In this regard, the PLL control means 104 includes suitable circuit means interioraly thereof which are responsive to the master control signals from the CPU section 30 for producing the range or segment selection control signals. These latter signals comprise switching signals produced at pins 14 and 15 at the proper times; that is, in accordance with whether transmission or reception is desired, and whether the desired frequency of operation selected by the CPU falls within the preselected high or low 3-MHz segment.

The PLL control IC-6 is also provided with suitable components for tuning stability and reference. These latter components include a 10.24 MHz reference crystal 221, a varactor 223, a tuning capacitor 225, and a 10K thermistor 227 for temperature stability.

The remaining portion of the PLL section 32 includes first buffer circuit 108 comprises transistors 230 and 232 and feeds back the VCO output to complete the loop, by way of the novel pre-scaler/divider 112. In the illustrated embodiment this latter component 112 preferably comprises an integrated circuit of the type generally designated MC12015.

In accordance with a feature of the invention, as previously mentioned, the use of the pre-scaler or divider 112 permits the feeding back of a scaled feedback control signal at a frequency much lower than the VCO output or oscillatory signal frequency, permitting operation of the PLL IC 104 at a relatively low-frequency, while still achieving tuning in the VHF band from 136 MHz to 174 MHz. The PLL control means 104 is responsive to the feedback control signal from pre-scaler or divider 112 for setting or "locking in" the frequency of the VCO output signal to the desired frequency corresponding to the master control signals received on the enable, data and clock lines from the CPU section 30.

In accordance with a further feature of the invention, the pre-scaler or divider circuit 112 comprises dual-modulus divider means for dividing the VCO output or oscillatory signal by one of at least two selectable factors or divisors to comprise the scaled feedback control signal to PLL control means 104. The divider 112 includes control input means at pin 1 thereof responsive to divisor-selection signals produced at pin 8 of the PLL control means 104 for selecting one of these two divisors. In this regard the PLL control means 104 includes divider control means internally of the IC which are responsive to the master control signals from the CPU section 30 for producing the divisor selection signals at the proper times. In the illustrated embodiment of the invention, the two selectable divisors are 64 and 65. This is, the feedback signal may be either 1/64 or 1/65 of the frequency of the VCO output.

As previously mentioned, the use of two divisor factors permits further subdivision of the frequencies in the desired segments to alternate sets of "even" and "odd" frequencies, thereby greatly reducing the memory and CPU capacity requirements for tuning any of the possible incremental channel frequencies (at 5 KHz increments in the illustrated embodiment) within the selected VHF band. That is, the same frequency selection data from the CPU results in the selection or generation of one of two different local-oscillator frequencies by the VCO 106 in accordance with which of the two divisors (64 or 65) is selected for the pre-scaler or divider 112.

Figure 3:
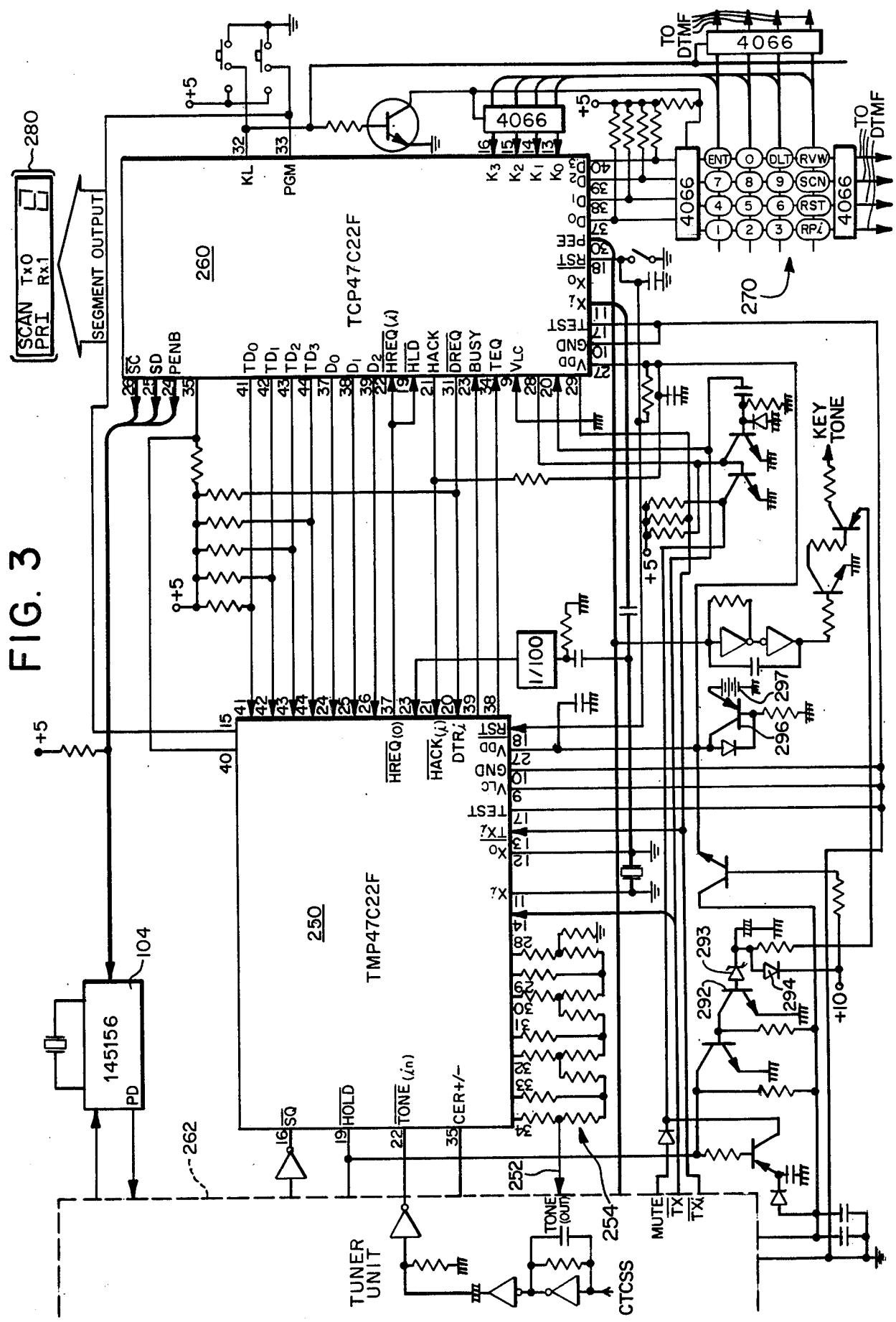
FIG. 3 is a schematic circuit diagram illustrating in a preferred form of the control or CPU portion of the circuit for the transceiver of FIG. 1.

Reference is next invited to FIG. 3 wherein further details of the CPU section 30 are illustrated. A first CPU 250, preferably of the type TMP47C22F is utilized as a CTCSS tone encoder and decoder. This CPU 250 receives a CTCSS tone, if present, from the receiver section; that is, from the output of low-pass filter 102 as previously mentioned. The CTCSS tone is fed into the CPU 250 by way of suitable buffer components as illustrated. CPU 250 also functions to generate suitable CTCSS tones or transmission to the TX section at a TONE (out) terminal 252. In this regard, a suitable quasi-sinewave signal is generated from the CTCSS output of CPU 250 by a transistor array 254.

The second CPU component 260 is preferably of the type generally designated TCP47C22F. This second CPU 260 is the control CPU and controls operation of the CPU 250, of the PLL transmit and receive functions and of a display 280. In this regard, CPU 260 is provided with sufficient memory and control capacity to store and generate the necessary data for control of the PLL control IC 104 at CPU pins 24, 25 and 26. In this regard, the PLL control means or IC 104 is again shown diagrammatically in FIG. 3. Also, the remaining transceiver circuits are again diagrammatically indicated in FIG. 3 by the dashed line 262.

In the illustrated embodiment of the invention, the CPU 260 is provided with sufficient memory capacity to store or memorize up to ten preselected channels which may be selected and input by way of a keyboard 270. In this particular embodiment, when as many as ten desired channels of transceiver operation are selected, the technician may enter data or "program" the CPU 260 to enable frequency-synthesis of corresponding local-oscillator frequencies for tuning these channels in both the receiver and transmitter sections. In this regard, the PLL control integrated circuit 104 (preferably of the type MC145156) requires data corresponding to given numbers "N" to control synthesis of corresponding local-oscillator frequencies by the VCO. In this embodiment, a formula for the correct "N" data for tuning to a given RF carrier frequency f, is as follows:

$$N = (f - 21.4 \text{ MHz})/0.005$$

Once the up to ten channels of operation have been selected and the appropriate data entered to the CPU, the technician adjusts the PLL high band and low band control elements, comprising the tuning coil 225 and variable resistors 222 and 224 are previously described. In this regard, the CPU is actuated to call for the highest frequency channel entered and the transistors 226 and 228 are disabled to permit tuning of the coil 225 until the PLL section locks at this highest frequency. Thereafter, the lowest of the entered frequencies which is within 3 MHz of this higher frequency is called for by CPU 260 and coil 225 is adjusted until the PLL section 32 again locks. Thereafter, respective upper and lowermost frequencies falling within a second 3 MHz wide band or segment are similarly tuned or adjusted by adjusting respective variable resistors 222 and 224 until the PLL section 32 locks on these frequencies as well.

Upon selection of frequencies and entering of the appropriate data to the CPU, the technician then selects appropriate 3 MHz bands or segments for the BPS associated with the respective TX and RX sections as previously described. In this regard, it is required that the frequencies of the selected channels may be grouped or arranged so as to fall within two such 3 MHz segments. Hence, this limitation enters into the initial selection of channels. Thereafter the center frequencies of the BPFs 36, 38 are adjusted as previously described to set the BPFs for operation in these two 3 MHz segments.

The selected channels may be automatically scanned upon command from the keyboard 270 during operation, if desired. The keyboard 270 includes numerical keys for selection, by frequency numbers, of specific channels, from among those selected, for transmit and/or receive operation. It will be understood, that once the up to ten channels of operation have been selected, the corresponding data for synthesizing local-oscillator frequencies for these channels will be entered into the CPU by way of the keyboard 270. Thereafter, any attempt to select a channel not included within these selected and "programmed" channels will result in an "error" signal being given on a display 280.

In this regard, the CPU 260 also controls the display 280 which preferably comprises an LCD display and includes suitable indicators for displaying the function selected, whether scanning, transmitting or receiving, as well as whether the high or low band or segment is currently in operation, together with a numerical indication of the frequency of the presently selected channel. An additional numerical indication of numerals 1 through 10 may also be displayed for indicating which one of the selected channels is being tuned.

An additional priority function is provided, whereby the CPU 260 memorizes one of the selected channels as a "priority" channel. During scanning operation, if a signal is received on the priority channel, the CPU 260 will automatically switch transceiver operation to that channel to enable two-way communications.

Additional interfacing is provided in the form of bi-lateral switch integrated circuits of the type generally designated 4066 for accommodating optional DTMF installation and switching between normal mode and DTMF mode.

In the illustrated embodiment, the CPU circuit of FIG. 3 also includes memory power supply backup including a low-voltage detector circuit comprising transistor 292 and diode 293 which are coupled to the positive voltage supply by way of additional diode 294. Backup power is provided to the CPU for memory protection by a further transistor 296, which automatically switches to a backup battery 297 when low battery voltage is detected by the foregoing circuit.

While particular embodiments of the invention have been shown and described in detail, it will be obvious to those skilled in the art that changes and modifications of the present invention, in its various apsects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

In order to fully illustrate a specific embodiment of the invention, exemplary programs for the CPUs 250 and 260 are reproduced on the following pages.

© 1983 General Research of Electronics, Inc.

CP/M TLCS-47 ASSEMBLER V2.2

```
LOC   OBJ      LINE        SOURCE STATEMENT

1  ;------------------------------------------------
                2  ; TITLE CTCSS TONE EN/DE-CODE CONTROL SYSTEM.
                3  ;        TONE SQUELTI - TRANSCIVER CONTROLLOR.
                4  ;
                5  ; TLCS - 47 APPLICATION PROGRAM.
                6  ;         ( TCP 47C22F MICRO PROCESSOR AND LCD IF.)
                7  ;
                8  ;                        1982 - 5 - 10  :PROG - S
                9  ;                        1983 - 1 - 20  :END
               10  ;                   BY   H. MIYAKOSHI
               11  ;------------------------------------------------
               12  ; I/O PORT ADR EQUATION TABLE
               13  ;----------

ROM PAGE NO. 0

0000          14  R0      EQU     0         ;INPUT ONLY(KEY-B PORT)
 0001          15  R1      EQU     1         ;P1
 0002          16  R2      EQU     2         ;P2
 0003          17  R3      EQU     3         ;----
 0004          18  R4      EQU     4         ;D/A LOWER ORDER
 0005          19  R5      EQU     5         ;D/A HI ORDER
 0006          20  R6      EQU     6         ;OUTPUT PORT
 0007          21  R7      EQU     7         ;DATA TRANSFER RECIVE
 0008          22  R8      EQU     8         ;INPUT PORT
 0009          23  R9      EQU     9         ;DIGIT INPUT
 000E          24  HLDS    EQU     14        ;HOLD STATUS REG.
 0010          25  HOLD    EQU     16        ;HOLD CTL REG.
 000F          26  SIOB    EQU     15        ;SERIAL TX/RX BUFR
 001F          27  SIOC    EQU     31        ;             STATUS REG
 0019          28  TV      EQU     25        ;INTERVAL TIMER
 001C          29  TC1C    EQU     28        ;TIMER #1 CTL PORT
 001D          30  TC2C    EQU     29        ;         #2
 001A          31  LCD1    EQU     H'1A      ;LCD CONTROL PORT #1
 001B          32  LCD2    EQU     H'1B      ;                 #2
               33  ; I/O PORT BIT ADR EQUATION TABLE
 0000          34  TXI1    EQU     0         ;TX MODE SEL
 0000          35  TXI     EQU     0         ;SAME FLAG
 0001          36  TX      EQU     1         ;TX COMAND
 0002          37  DF      EQU     2         ;DOUBLE FUNC.
 0003          38  SQ      EQU     3         ;SQUELTI BIT
 0000          39  HREQ    EQU     0         ;HOLD BIT
 0000          40  HACKO   EQU     0         ;HOLD OK OUTPUT
 0000          41  HACK    EQU     0         ;SAME FLAG
 0000          42  TRN     EQU     0         ;REQUEST TRANSFER FLAG
 0001          43  TEG     EQU     1         ;TONE OK
 0002          44  BUSY    EQU     2         ;SYSTEM BUSY FLAG
 0003          45  CER     EQU     3         ;F - GEN. ERROR CORRECTOR
               46  ; SYSTEM CONTROL FLAG BIT ADR TABLE
 0000          47  WAIT    EQU     0         ;CO/TONE CHECK WAIT FLAG
 0001          48  HACKI   EQU     1         ;HOLD ACK RETURN
 0000          49  TD      EQU     0         ;TONE DECODE STARTER
 0001          50  CCO     EQU     1         ;SQUELTI DETECTION RESECT
 0002          51  DR      EQU     2         ;
 0002          52  ED      EQU     2         ;ENCODE =0 ;EN/DE-CODE =1
 0003          53  EMPT    EQU     3         ;MEMORY EMPTY = 0 ;OCP=1
               54  ;---------
               55  ; RAM MAPPING
               56  ;---------
               57  ; RAM PAGE #ZERO
               58  ;---------
 0000          59  PAG0    EQU     0         ;PAGE ADR #0 SET
 0000          60  MC      EQU     0         ;SYSTEM CONTROL FLAG
 0001          61  FNC     EQU     1         ;CONTROL MODE DATA TEMP
```

```
0002            62 SY1      EQU    2         ;SYSTEM CONTROL FLAG #1
00CB            63 WK1      EQU    H'B       ;WORKING REG. #1
000C            64 HG       EQU    H'C       ;INTERRPTION REG. TEMP
000D            65 LG       EQU    H'D       ;AND IT HI ORDER
000E            66 AR       EQU    H'E       ;AND ACC.
000F            67 FC       EQU    H'F       ;TONE FLAME COUNTER
                68 ;----------
                69 ; RAM PAGE #1
                70 ;----------
0001            71 PAG1     EQU    1         ;PAGE ADR #1 SET
0010            72 CHN      EQU    H'10      ;CH. #
0011            73 TEMP     EQU    H'11      ;WORKING REG. #2
0014            74 PA       EQU    H'14      ;16 - BITS CALUCULATION REG.
001C            75 TCH      EQU    H'1C      ;SELECTED TONE # TEMP
                76 ;----------
                77 ; RAM PAGE #2
                78 ;----------
0002            79 PAG2     EQU    2         ;PAGE ADR #2 SET
0020            80 EADR     EQU    H'20      ;EVNE CH. MEMORY ADDR
0022            81 OADR     EQU    H'22      ;ODD CH. MEMORY ADDR
                82 ;----------
                83 ; RAM PAGE #3
                84 ;----------
0003            85 PAG3     EQU    3         ;PAGE ADR #3 SET
                86 ;----------
                87 ; RAM PAGE #4
                88 ;----------
0004            89 PAG4     EQU    4         ;PAGE ADR #4 SET
                90 ;----------
                91 ; RAM PAGE #5
                92 ;----------
0005            93 PAG5     EQU    5         ;PAGE ADR #5 SET
                94 ;----------
                95 ; RAM PAGE #6
                96 ;----------
0006            97 PAG6     EQU    6         ;PAGE ADR #6 SET
                98 ;----------
                99 ; RAM PAGE #7
               100 ;----------
0007           101 PAG7     EQU    7         ;PAGE ADR #7 SET
0070           102 D0       EQU    H'70      ;DIGIT 0 DATA BUFR
0071           103 D1       EQU    H'71      ;DIGIT 1 DATA BUFR
0072           104 D2       EQU    H'72      ;DIGIT 2 DATA BUFR
               105 ;----------
               106 ; RAM PAGE #8
               107 ;         (PAGE #12)
               108 ;----------
000C           109 PAG8     EQU    12        ;PAGE ADR #8 SET
000C           110 PAG12    EQU    12        ;PAGE ADR #12 SET
               111 ;----------
               112 ; RAM PAGE #9
               113 ;         (PAGE #13)
               114 ;----------
000D           115 PAG9     EQU    13        ;PAGE ADR #9 SET
000D           116 PAG13    EQU    13        ;PAGE ADR #13 SET
               117 ;----------
               118 ; RAM PAGE #10
               119 ;         (PAGE #14)
               120 ;----------
000E           121 PAG10    EQU    14        ;PAGE ADR #10 SET
000E           122 PAG14    EQU    14        ;PAGE ADR #14 SET
               123 ;----------
               124 ; RAM PAGE #11
               125 ;         (PAGE #15)
               126 ;----------
000F           127 PAG11    EQU    15        ;PAGE ADR #11 SET
000F           128 PAG15    EQU    15        ;PAGE ADR #15 SET
00F4           129 TC1      EQU    H'F4      ;TIMER COUNTER #1
00F8           130 TC2      EQU    H'F8      ;TIMER COUNTER #2
00FC           131 DCC      EQU    H'FC      ;ROM ADDRESSING POINTER
00FF           132 SSP      EQU    H'FF      ;SUBROUTINE STACK POINTER
```

```
ROM PAGE NO. 0

0000                133             ORG     H'0
                    134     ;--------
                    135     ; INTERRUPTION ADDR JUMP VECTOR TABLE
                    136     ;--------
0000 6255           137             BS      INIZ            ;POWER ON
0002 6026           138             BS      INT1            ;TONE FRAME INTERRUPT
0004 6004           139             BS      *               ;NOT USE
0006 6006           140             BS      *               ;NOT USE
0008 6009           141             BS      HTC2            ;TC(2) OVERFLOWED
000A 600A           142             BS      *               ;NOT USE
000C 6101           143             BS      TXHL            ;COMAND REQUEST
                    144     ;

ROM PAGE NO. 0

000E                145             ORG     H'E
                    146     ;--------
                    147     ; SHORT FORMAT SUBROUTIN CALL TABLE
                    148     ;         CALL    N
                    149     ; N IS CALCURATED AS FOLLOWS:
                    150     ;               (ADR - 6)
                    151     ;       N = ---------
                    152     ;                2
                    153     ;--------
                    154     ; PAUSE TC1
                    155     ;--------
000E 40             156 P1:         LD      A,#0            ;CLEAR ACC
000F 3A8C           157             OUT     A,%TC1C         ;& STOP TIMER #1
0011 2A             158             RET
                    159     ;

ROM PAGE NO. 0

0016                160             ORG     H'16
                    161     ;--------
                    162     ; PAUSE TC2
                    163     ;--------
0016 40             164 P2:         LD      A,#0            ;CLEAR ACC
0017 3A8D           165             OUT     A,%TC2C         ;& STOP TIMER #2
0019 2A             166             RET
                    167     ;

ROM PAGE NO. 0

001E                168             ORG     H'1E
                    169     ;--------
                    170     ; SAVE ALL REGS./RESTORE ALL REGS.
                    171     ;--------
001E                172 SV:
001E 300E           173 RS:         XCH     A,AF            ;SAVE/RESTORE ACC
0020 290C           174             XCH     HL,HG           ;SAVE/RESTORE H.L-REG
0022 2A             175             RET
                    176     ;

ROM PAGE NO. 0

0026                177             ORG     H'26
                    178     ;--------
                    179     ; TONE CHANNEL NUMBER X 2
                    180     ;--------
0026 06             181 T2:         TEST    CF              ;RESET CARRY
0027 C1             182             LD      H,#PAG1         ;PAGE SET
0028 EC             183             LD      L,#TCH          ;& GET TONE # TEMP ADR
0029 0C             184             LD      A,@HL
002A C5             185             ROLC    A               ;ACC X 2
002B 1A             186             ST      A,@HL+
002C A9             187             BSS     *-3             ;SHIFT W-WORD
002D 2A             188             RET
                    189     ;
```

```
ROM PAGE NO. 0

002E                190           ORG     H'2E
                    191    ;--------
                    192    ; ADDITION  DATA COUNTER TO TONE NUMBER
                    193    ;--------
                    194    ; RESET CARRY BEFORE CALL
002E EC             195 AH:         LD      L,#TCH          ;SET WO ADDR
002F C1             196            LD      H,#PAG1
0030 0C             197            LD      A,@HL
0031 CF             198            LD      H,#PAG15
0032 15             199            ADDC    A,@HL
0033 1A             200            ST      A,@HL+
0034 AF             201            BSS     *-5
0035 2A             202            RET
                    203    ;

ROM PAGE NO. 0

0036                204            ORG     H'36
                    205    ;--------
                    206    ; CLEAR TC1 COUNTER
                    207    ;--------
0036 CF             208 C1:         LD      H,#PAG15        ;GET PAGE ADDR POINTER
0037 E4             209            LD      L,#TC1
0038 603E           210            BS      ZS

ROM PAGE NO. 0

003E                211            ORG     H'3E
                    212    ;--------
                    213    ; ZERO STORED SUBROUTINE
                    214    ;--------
003E F0             215 ZS:         ST      #0,@HL+         ;CLEAR MEMORY
003F F0             216            ST      #0,@HL+

ROM PAGE NO. 1

0040 F0             217            ST      #0,@HL+
0041 2A             218            RET                     ;RETURN
                    219    ;

ROM PAGE NO. 1

0046                220            ORG     H'46
                    221    ;--------
                    222    ; @(DC) DATA LOADER
                    223    ;--------
0046 C1             224 DL:         LD      H,#PAG1         ;GET PAGE ADDR POINTER
0047 E6             225            LD      L,#PA+2
0048 33             226            LDL     A,@DC
0049 1A             227            ST      A,@HL+
004A 32             228            LDH     A,@DC+
004B 0F             229            ST      A,@HL
004C 303D           230            ADD     L,#-3
004E 33             231            LDL     A,@DC
004F 1A             232            ST      A,@HL+
0050 32             233            LDH     A,@DC+
0051 0F             234            ST      A,@HL
0052 2A             235            RET
                    236    ;

ROM PAGE NO. 1

0056                237            ORG     H'56
                    238    ;--------
                    239    ; SHIFT AC AND SWAPPED AC AND HR
                    240    ;--------
0056 05             241 AHR:        ROLC    A               ;ACC X 2
0057 30             242            XCH     A,H             ;& SAVE ACC
0058 2A             243            RET                     ;RETURN
                    244    ;
```

ROM PAGE NO. 1

```
005E                245             ORG     H'5E
                    246     ;--------
                    247     ; ADDITION AND STORE INCRS. LR
                    248     ;--------
005E  15            249     ASI:    ADDC    A,@HL           ; ADDITIONAL COUNT
005F  0F            250             ST      A,@HL           ; & SAVE
0060  18            251             INC     L               ; & ADDR SET TO NEXT
0061  2A            252             RET
                    253     ;
```

ROM PAGE NO. 1

```
0066                254             ORG     H'66
                    255     ;--------
                    256     ; SET F(OFFSET) TABLE POINTER
                    257     ;--------(A'734) TO DATA COUNTER
0066  CF            258     SFP:    LD      H,#PAG15        ;GET PAGE ADDR
0067  EC            259             LD      L,#DCC          ;& GET DATA COUNTER ADDR
0068  F0            260             ST      #0,@HL+         ;SET LSD
0069  F0            261             ST      #0,@HL+         ;SET OSD
006A  F7            262             ST      #7,@HL+         ;SET MSD
006B  2A            263             RET                     ;RETURN
                    264     ;
```

ROM PAGE NO. 1

```
006E                265             ORG     H'6E
                    266     ;--------
                    267     ; ADDR OFFSET PRESET
                    268     ;--------
006E  CF            269     AF:     LD      H,#PAG15        ;GET PAGE ADDR
006F  EC            270             LD      L,#DCC          ;& GET ADR OF DATA COUNTER
0070  F8            271             ST      #H'B,@HL+       ;SET LSD
0071  F1            272             ST      #1,@HL+         ;AND 2ND DIGIT
0072  F0            273             ST      #0,@HL+         ;SET MSD/OFFSET ADR
0073  2A            274             RET
                    275     ;
```

ROM PAGE NO. 2

```
0086                276             ORG     H'86
                    277     ;--------
                    278     ; TONE DECODE INTERRUPTION HANDLER
                    279     ;       COUNT TONE 4 - FRAME AT 20(US) CP
                    280     ;       FOR FC = 0 DETECTION.
                    281     ;--------
0086  73            282     INT1:   CALLS   SV              ;SAVE ALL REGS
0087  39C0          283             TESTP   MC,TD           ;TEST IF DECODE MODE
0089  603D          284             BS      15              ;YES
008B  73            285             CALLS   RS              ;NO..RSESTORE ALL REGS
008C  2B            286             RETI                    ;RETURN
                    287     ; TONE DATA DECODE MODE
008D                288     I5      EQU     *
                    289     ; CHECK FOR TONE COUNT
008D  72            290             CALLS   P2              ;YES..STOP ERROR COUNTER
008E  3C0F          291             LD      A,FC            ;GET FREAM COUNTER
0090  0E            292             TESTP   ZF              ;FC = 0 ?
0091  60C3          293             BS      I40             ;YES
0093  2F1F          294             ADD     FC,#1           ;NO..COUNT 4-TIMES ?
0095  60C9          295             BS      IEND0           ;NO
0097  00            296             NOP                     ;YES..END OF FRAME COUNT
0098  71            297             CALLS   P1              ;STOP TC1
0099  72            298             CALLS   P2              ;STOP TC2
009A  21C4          299             CALL    MTST            ;GET CH. MEM ADDR
009C  2103          300             CALL    LTCH            ;
009E  74            301             CALLS   T2              ;TONE CH.DATA X 2
009F  74            302             CALLS   T2
00A0  CF            303             LD      H,#PAG15
```

```
00A1 EC         304            LD    L,#DCC        ;GET TIMER COUNTER ADR
00A2 F0         305            ST    #H'0,@HL+     ;SET LSD
00A3 F3         306            ST    #H'3,@HL+     ;SET 0CD
00A4 F7         307            ST    #H'7,@HL+     ;SET MSD DATA
00A5 C1         308            LD    H,#PAG1       ;GET PAGE ADR
00A6 EF         309            LD    L,#TCH+3      ;GET MSD ADR
00A7 F0         310            ST    #0,@HL+       ;CLEAR MSD
00A8 75         311            CALLS AH
00A9 78         312            CALLS DL
00AA 21B3       313            CALL  AP
00AC 19         314            DEC   L
00AD 5E         315            TEST  @HL,3
00AE 6084       316            BS    I20
00B0 3B56       317  I10:      CLR   %R6,TEQ
00B2 60BD       318            BS    I30
                319  ; CHECK UPER LIMIT
00B4 78         320  I20:      CALLS DL
00B5 21B8       321            CALL  AP
00B7 19         322            DEC   L
00B8 5E         323            TEST  @HL,3
00B9 60B0       324            BS    I10
                325  ; TONE CHECK OK
00BB 3B16       326            SET   %R6,TEQ
00BD 3940       327  I30:      CLR   MC,TD
00BF 3B65       328            CLR   %R6,BUSY

ROM PAGE NO. 3

00C1 60D1       329            BS    IEND1
                330  ; SELECT DECODE COUNTER STARTER COMAND
00C3 2CCF       331  I40:      ST    #-4,FC
00C5 7C         332            CALLS C1
00C6 44         333            LD    A,#B'0100
00C7 3A8C       334            OUT   A,%TC1C
00C9 CF         335  IEND0:    LD    H,#PAG15      ;GET PAGE ADR
00CA E8         336            LD    L,#TC2        ;GET TIMER COUNTER ADR
00CB FA         337            ST    #H'A,@HL+     ;SET FIRST DIGIT
00CC FF         338            ST    #H'F,@HL+     ;SET 2ND DIGIT
00CD FF         339            ST    #H'F,@HL+     ;SET MSD
00CE 49         340            LD    A,#B'1001     ;GET COMAND DATA
00CF 3A8D       341            OUT   A,%TC2C       ;SET TIMER COUNTER
00D1 CF         342  IEND1:    LD    H,#PAG15      ;INT1 ALL DONE
00D2 EF         343            LD    L,#SSP        ;GET STACK ADR
00D3 4C         344            LD    A,#12         ;GET INITIAL DATA SPW
00D4 CF         345            ST    A,@HL         ;AND RESET STACK POINTER
00D5 3645       346            EICLR IL,B'000101   ;RESET INTERRUPTION REQUEST
00D7 6274       347            BS    F1            ;RETURN
                348  ;
                349  ;--------
                350  ; TIMER COUNTER #2 INTERRUPTION HANDLER
                351  ;
                352  ;       \  S0 TIME-OUT              200(MS)
                353  ;          TONE DECODER TIME-OUT    70(MS)
                354  ;--------
00D9 73         355  HTC2:     CALLS SV            ;SAVE ALL REG.
00DA 71         356            CALLS P1            ;STOP TIMER #1
00DB 72         357            CALLS P2            ;STOP TIMER #2
00DC 3932       358            TEST  SY1,WAIT      ;TEST IF WAITE MODE?
00DE 60EE       359            BS    HTC3          ;NO
00E0 3942       360            CLR   SY1,WAIT      ;YES..CLEAR FLAG
00E2 CF         361            LD    H,#PAG15      ;GET PAGE ADR
00E3 E8         362            LD    L,#TC2        ;GET TIMER COUNTER ADR
00E4 F9         363            ST    #9,@HL+       ;SET TIMER LSD
00E5 FF         364            ST    #15,@HL+      ;SET TIMER OSD
00E6 FF         365            ST    #15,@HL+      ;AND SET MSD
00E7 49         366            LD    A,#B'1001     ;SET TIMER COUNTER CMD
00E8 3A8D       367            OUT   A,%TC2C       ;AND OUTPUT
00EA 3910       368            SET   MC,DSQ       ;AND SET DETECTION FLAG
00EC 60F6       369            BS    HTC4          ;DONE
                370  ; FIND TIME OUT
```

```
00EE 2000    371 HTC3:    ST    #0,MC              ;CLEAR CONTROL FLAG
00F0 3B76    372          CLR   %R6,TRN            ;CLEAR TRANSFER COMAND
00F2 3B56    373          CLR   %R6,TEO
00F4 3B66    374          CLR   %R6,BUSY
             375 ; INTERRUPTION NO RETURN SET
00F6         376 HTC4     EQU   *
00F6 CF      377          LD    H,#PAG15           ;GET PAGE ADR
00F7 EF      378          LD    L,#SSP             ;GET STACK POINTER WD
00F8 FC      379          ST    #12,@HL+           ;SET &CLEAR STACK PTR
00F9 3661    380          EICLR IL,B'100001        ;AND EIN RETURN SET
00FB 3BE0    381          TESTP %R0,DF             ;TEST IF FUNC # = 2?
00FD 64EB    382          BS    F2                 ;YES
00FF 6274    383          BS    F1                 ;NO RETURN TO FUNC #1
             384 ;
             385 ;--------
             386 ; INTERRUPTION #2 HANDLER
             387 ; MODE DF = 1..(D0) COMAND WORD
             388 ;              0 = CH. DATA READ
             389 ;              1 = TONE DATA FROM
             390 ;              2 = TONE DATA TO MAN CPU
             391 ;              3 =
             392 ;
             393 ;             (D1) DATA DIGIT LOWER
             394 ;             (D2) DATA DIGIT HI
             395 ;
             396 ; MODE DF = 0..(D0) COMAND WORD
             397 ;              0 = CH. DATA READ
             398 ;              1 = TONE DECODE CMD
             399 ;              2 =
             400 ;
             401 ;             (D1) DATA DIGIT

ROM PAGE NO. 4 *

0101         402 TXHL:
             403 ;--------------------
0101 73      404 INT2:    CALLS SV                 ;SAVE ALL REGS.
0102 71      405          CALLS P1                 ;STOP TC #1
0103 72      406          CALLS P2                 ;STOP TC #2
0104 2000    407          ST    #0,MC              ;CLEAR CONTROL FLAGS
0106 3B26    408          SET   %R6,BUSY           ;SET SYSTEM BUSY FLAG
0108 2CF7    409          OUT   #B'1111,%R7        ;RESET PORT
010A 3B76    410          CLR   %R6,TRN            ;CLEAR TRANSFWER COMAND
010C CF      411          LD    H,#PAG15           ;GET PAGE ADR
010D EF      412          LD    L,#SSP             ;GET STACK POINTRE ADR
010E FC      413          ST    #12,@HL+           ;AND RESET STACK POINTER
010F 3BA0    414          TEST  %R0,DF             ;FNC = 1?
0111 6119    415          BS    FM1                ;YES
0113 3920    416          SET   MC,DR              ;NO..RESET CTL FLAG
0115 3664    417          EICLR IL,B'100100        ;SET INTERRUPTION CODE
0117 64EB    418          BS    F2                 ;RETURN
             419 ; SET THE FUNCTION MODE 1 CONTROL
0119 00      420 FM1:     NOP                      ;FUNCTION MODE #1 CONTROL
             421 ;----------
             422 ; DECODE TONE COMAND
             423 ;----------
011A 76      424          CALLS C1                 ;CLEAR TC 1 COUNTER
011B CF      425          LD    H,#PAG15           ;GET PAGE ADR
011C E8      426          LD    L,#TC2             ;GET TIMER #2 ADR
011D FC      427          ST    #12,@HL+           ;SET TIMER LSD
011E FE      428          ST    #14,@HL+           ;SET TIMER CSD
011F FF      429          ST    #15,@HL+           ;AND SET TIMER COUNTER
0120 49      430          LD    A,#B'1001          ;GET TIMER CONTROL DATA
0121 3A30    431          OUT   A,%TC2C            ;AND OUTPUT
0123 3902    432          SET   SY1,WAIT           ;AND SET SQ/TONE DET. WAIT
0125 C1      433          LD    H,#PAG1            ;GET PAGE ADR
0126 E0      434          LD    L,#CHN             ;GET CH. TEMP ADR
0127 3A67    435          IN    %R7,@HL            ;READ CH. DATA
0129 3664    436          EICLR IL,B'100100        ;EIN
012B 6274    437          BS    F1                 ;AND GO OUT FNC.
             438 ;
```

ROM PAGE NO. 5

```
 0140              439            ORG    H'140
                   440  ;--------
                   441  ; SUBROUTINE PACKAGE
                   442  ;--------
                   443  ; TONE GENERATE D/A CONVETER MODULE
                   444  ;        TONE OF 1-CYCLE DIVIDED BY 12
                   445  ;--------  80 INSTRUCTION CYCLE
 0140 614B         446  D20:       BS     D10           ;ADJ THE CYCLE 2
 0142 33           447  DAC:       LDL    A,@DC         ;D/A DATA LO SET
 0143 3AA4         448             OUT    A,%R4         ;& OUTPUT
 0145 32           449             LDH    A,@DC+        ;D/A DATA HI SET
 0146 38B5         450             TEST   %R5,CER       ;TEST IF CORRECT FLG = 1?
 0148 80           451             BSS    D20           ;NO... ADJUSTMENT CPU CYCLE
 0149 3828         452             OR     A,#8          ;YES.. SET "CER"
 014B 3AA5         453  D10:       OUT    A,%R5         ;AND OUTPUT D/A CONSTANT
                   454  ; CHECK THE MEMORY DATA TABLE SIZE
 014D CF           455             LD     H,#PAG15      ;GET PAGE ADDR
 014E EE           456             LD     L,#DCC+2      ;GET DATA COUNTER ADDR
 014F 3848         457             ADD    @HL,#8        ;AND TEST IF COUNTER OVERFLOWED?
 0151 97           458             BSS    A1            ;NO
 0152 EC           459             LD     L,#DCC        ;YES..RESET DATA COUNTER
 0153 F4           460             ST     #H'4,@HL+     ;    SET LSD
 0154 FF           461             ST     #H'F,@HL+     ;    SET 2ND DIGIT
 0155 F7           462             ST     #H'7,@HL+     ;    SET MSD
 0156 9C           463             BSS    A2            ;AND ADJUSTMENT THE CPU CYCLE
                   464  ; ADJUSTMENT EXECUTE CYCLE
 0157 3848         465  A1:        ADD    @HL,#8        ;RESTORE DATACOUNTER
 0159 00           466             NOP                  ;ADJ THE CYCLE 1
 015A 00           467             NOP                  ;              2
 015B 00           468             NOP                  ;              3
 015C 3890         469  A2:        TEST   %R0,TX        ;TX MODE RELASE?
 015E AC           470             BSS    A3            ;NO
                   471  ;--------
                   472  ; TONE ENCODE OVER
                   473  ;--------
 015F EF           474             LD     L,#SSP        ;GET STACK POINTER ADR
 0160 4C           475             LD     A,#12         ;GET STACK INI. DATA
 0161 0F           476             ST     A,@HL         ;AND SET SPW
 0162 3BC0         477             TESTP  %R0,TXI       ;CHECK THE TX MODE OFF?
 0164 6182         478             BS     *-2           ;NO
 0166 3665         479             EICLR  IL,B'100101   ;SET ENABLE INTR.
 0168 3866         480             CLR    %R6,BUSY      ;CLEAR SYSTEM CONTROL FLAGS.
 016A 6274         481             BS     F1            ;AND ALL DONE
                   482  ; CHECK POWER OFF
 016C 383E         483  A3:        TEST   %HLDG,WREG    ;TEST IF POWER OFF?
 016E B1           484             BSS    A4            ;NO
 016F 2239         485             CALL   HLT1          ;YES..SELECT LOWER POWER MODE
 0171 2195         486  A4:        CALL   V40           ;SET CPU TIMER FOR 160 (US)
 0173 2179         487             CALL   V5            ;AND 20(US)
 0175 00           488             NOP                  ;4(US)
 0176 00           489             NOP                  ;4(US)
 0177 2A           490             RET                  ;2(US)...AND TOTAL 80 INSTRUCTIONS
                   491                                  ;TIMER SET. (320(US)) TIMER
                   492
                   493  ;--------
                   494  ; PROGRAM INTERVAL TIMER MODULE
                   495  ;        COUNT CPU CYCLE 1-INSTRUCTION/4(US)
                   496  ;--------
                   497  ; 5-CYCLE TIMER
                   498  ;        (20 US)
                   499  ;--------
 0178 00           500  V5:        NOP
                   501  ;--------
                   502  ; 4-CYCLE TIMER
                   503  ;        (16 US)
                   504  ;--------
 0179 2A           505  V4:        RET
                   506  ;
```

```
                507 ;--------
                508 ; 10 - CYCLE TIMER
                509 ;         (40 US)
                510 ;--------
017A  C0        511 V10:    NOP
017B  00        512         NOP
017C  00        513         NOP
017D  6178      514         BS      V5
                515 ;
                516 ;--------
                517 ; 20 - CYCLE TIMER
                518 ;         (80 US)
                519 ;--------
017F  217A      520 V20:    CALL    V10

ROM PAGE NO. 6 *

0181  2178      521         CALL    V5
0183  00        522         NOP
0184  2A        523         RET
                524 ;
                525 ;--------
                526 ; 40 - CYCLE TIMER
                527 ;        (160 US)
                528 ;--------
0185  217F      529 V40:    CALL    V20
0187  217A      530         CALL    V10
0189  2178      531         CALL    V5
018B  00        532         NOP
018C  2A        533         RET
                534 ;
                535 ;--------
                536 ; 80 - CYCLE TIMER
                537 ;        (320 US)
                538 ;--------
018D  2185      539 V80:    CALL    V40
018F  217F      540         CALL    V20
0191  217A      541         CALL    V10
0193  2178      542         CALL    V5
0195  00        543         NOP
0196  2A        544         RET
                545 ;
                546 ;--------
                547 ; N - CYCLE TIMER
                548 ;       ENTRY TO V6 -
                549 ;--------
0197  00        550 V9:     NOP
0198  00        551 V8:     NOP
0199  00        552 V7:     NOP
019A  6179      553 V6:     BS      V4
                554 ;
                555 ;--------
                556 ; SEPARATE STACK POINTE DECODER
                557 ;       (SSP) - TO (H.L)
                558 ;--------
019C  3CFF      559 SPS:    LD      A,SSP
019E  3302      560         ADD     A,#2
01A0  06        561         TEST    CF
01A1  C0        562         LD      H,#0
01A2  7A        563         CALLS   AHR
01A3  7A        564         CALLS   AHR
01A4  7A        565         CALLS   AHR
01A5  05        566         ROLC    A
01A6  382C      567         OR      A,#B'1100
01A8  30        568         XCH     A,H
01A9  31        569         XCH     A,L
01AA  2A        570         RET
                571 ;
                572 ;--------
                573 ; AC RERATIVE JUMP TO LOCATION
                574 ;--------
```

```
01AE 3F11      575 AJ:     ST      A,TEMP      ;SAVE AC
01AD 219C      576         CALL    SPS         ;GET LINK POINTER
01AF 3C11      577         LD      A,TEMP      ;GET OFFSET VALUE
01B1 06        578         TEST    CF          ;RESET CARRY
01B2 7B        579         CALLS   ASI
01B3 40        580         LD      A,#0        ;CLEAR ACC
01B4 7B        581         CALLS   ASI         ;ADD THE 2ND DIGIT
01B5 40        582         LD      A,#0        ;CLEAR ACC
01B6 7B        583         CALLS   ASI         ;ADD THE LAST DIGIT
01B7 2A        584         RET                 ;RETURN
               585 ;
               586 ;--------
               587 ; ADDITION  PA + TC1 = PA
               588 ;--------
01B8 06        589 AF:     TEST    CF
01B9 E4        590         LD      L,#TC1      ;GET TIMER COUNTER REG. ADR
01BA CF        591         LD      H,#PAG15    ;GET PAGE ADR
01BB 0C        592         LD      A,@HL       ;GET DATA
01BC C1        593         LD      H,#PAG1     ;GET SOURCE REG. ADR
01BD 7B        594         CALLS   ASI         ;ADD AND STORE INCRS.
01BE 11        595         MOV     L,A         ;GET L-REG DATA
01BF 3303      596         ADD     A,#3        ;TEST IF MAX ADR?
```

ROM PAGE-NO. 7 *

```
01C1 618A      597         BS      *-7         ;NO. MORE
01C3 2A        598         RET
               599 ;
               600 ;--------
               601 ; MEMORY LOCATION TO H.L AND TEST AVLABLE
               602 ;        SF = 0 RETURN -MEMORY OCP
               603 ;        SF = 1                EMPTY
               604 ;--------
01C4 3C10      605 MTST:   LD      A,CHN
01C6 C0        606         LD      H,#0
01C7 06        607         TEST    CF
01C8 07        608         RORC    A
01C9 30        609         XCH     A,H
01CA 38C2      610         ADD     H,#2
01CC E3        611         LD      L,#3
01CD 06        612         TEST    CF
01CE 61D1      613         BS      *+3
01D0 E1        614         LD      L,#1
01D1 5B        615         TEST    @HL,EMPT
01D2 2A        616         RET
               617 ;
               618 ;--------
               619 ; LOAD MEMORY DATA TO TCH-REGISTOR
               620 ;--------
01D3 0C        621 LTCH:   LD      A,@HL
01D4 3333      622         AND     A,#B'0011
01D6 3F1D      623         ST      A,TCH+1
01D8 19        624         DEC     L
01D9 0C        625         LD      A,@HL
01DA 3F1C      626         ST      A,TCH
01DC 40        627         LD      A,#0
01DD 3F1E      628         ST      A,TCH+2
01DF 3F1F      629         ST      A,TCH+3
01E1 2A        630         RET
               631 ;
               632 ;--------
               633 ; SET DATA COUNTER
               634 ;--------
01E2 0C        635 SDC:    LD      A,@HL
01E3 3FFC      636         ST      A,DCC
01E5 18        637         INC     L
01E6 0C        638         LD      A,@HL
01E7 3FFD      639         ST      A,DCC+1
01E9 18        640         INC     L
01EA 0C        641         LD      A,@HL
01EB 3FFE      642         ST      A,DCC+2
```

```
01ED 2A        643             RET
               644       ;
               645       ;--------
               646       ; TRNS   - TRANSFER DATA HANDLER
               647       ;--------
01EE 2DDD      648  TRNS:      ST      #-3,WK1         ;SET LOOP COUNTER
01F0 0C        649             LD      A,@HL           ;GET DEST. DATA
01F1 18        650             INC     L               ;SET NEXT ADDR
01F2 290C      651             XCH     HL,HG           ;AND SAVE ADR PTR
01F4 1A        652             ST      A,@HL+          ;DATA TO DEST.
01F5 290C      653             XCH     HL,HG           ;RENEW ADDR PTR
01F7 2F1B      654             ADD     WK1,#1          ;W = W+1;TEST IF ZERO?
01F9 61F0      655             BS      *-9             ;NO
01FB 2A        656             RET                     ;ALL DONE RETURN
               657       ;
               658       ;--------
               659       ; RECIVE TRANSFERED DATA FROM MAIN CPU
               660       ;--------
01FC C7        661  RCV:       LD      H,#PAG7
01FD E0        662             LD      L,#D0
01FE 3BC9      663             TESTP   %R9,0           ;TEST IF DIGIT 0=0?
```

ROM PAGE NO. 8

```
0200 61FE      664             BS      *-2             ;NO..WAITE
               665       ; SYNCRONASE SEQUENCE CYCLE
0202 38B9      666             TEST    %R9,0           ;TEST IF DIG 0=1?
0204 6202      667             BS      *-2             ;NO..WAITE
0206 3A67      668             IN      %R7,@HL         ;YES..READ DATA
0208 18        669             INC     L
0209 3899      670             TEST    %R9,1
020B 6209      671             BS      *-2
020D 3A67      672             IN      %R7,@HL
020F 18        673             INC     L
0210 3BA9      674             TEST    %R9,2
0212 6210      675             BS      *-2
0214 3A67      676             IN      %R7,@HL
0216 2A        677             RET
               678       ;
               679       ;--------
               680       ; POWER OFF
               681       ; HOLD CONTROL MODULE
               682       ;--------
0217 36BF      683  HLT:       DICLR   IL,B'111111     ;DISABLE INTR
0219 3856      684             CLR     %R6,TEC         ;CLEAR TONE DET OUTPUT
021B 3866      685             CLR     %R6,BUSY        ;CLEAR BUSY FLAG
021D 4D        686             LD      A,#B'1101       ;GET HOLD COMAND
021E 3846      687             CLR     %R6,HACK        ;OUTPUT HOLD REQUEST
0220 3893      688  HLT10:     TEST    %R8,HACKI       ;HOLD OK?
0222 6220      689             BS      HLT10           ;NO
0224 00        690             NOP                     ;YES
0225 00        691             NOP
0226 00        692             NOP
0227 00        693             NOP
0228 00        694             NOP
0229 00        695             NOP
022A 00        696             NOP
022B 00        697             NOP
022C 00        698             NOP
022D 2C04      699             OUT     #0,%R4          ;CLEAR PORT #4
022F 2C05      700             OUT     #0,%R5          ;CLEAR PORT #5
0231 4D        701             LD      A,#B'1101       ;GET HOLD STATUS
0232 3A3D      702             OUT     A,%HOLD         ;SINK THE HOLD MODE
               703       ; SYSTEM LOW POWER MODE /RESTART
0234 3806      704             SET     %R6,HACK        ;RESET REQ P6
0236 3665      705             EICLR   IL,B'100101     ;SET INTR ENABLE
0238 2A        706             RET                     ;AND RETURN
               707       ;
```

```
                    708 ;----------------------------------
                    709 ; HOLD CONTROL 2ND CALL MODULE
                    710 ;                NOT USE   DICLR
                    711 ;                          EICLR
                    712 ;----------------------------------
0239 3B56           713 HLT1:    CLR    %R6,TEQ       ;CLEAR TONE CHECK BIT
023B 3B66           714          CLR    %R6,BUSY      ;CLEAR SYSTEM CTL FLAG
023D 00             715          NOP
023E 3B46           716          CLR    %R6,HACK      ;SET REQ. TO HOLD MODE
```

ROM PAGE NO. 9

```
0240 3B93           717 HLT20:   TEST   %R6,HACKI     ;CPU 1 HOLD READY?
0242 6240           718          BS     HLT20         ;NO
0244 00             719          NOP                  ;YES
0245 00             720          NOP
0246 00             721          NOP
0247 00             722          NOP
0248 00             723          NOP
0249 00             724          NOP
024A 00             725          NOP
024B 00             726          NOP
024C 00             727          NOP
024D 00             728          NOP
024E 2C04           729          OUT    #0,%R4        ;CLEAR PORT #4
0250 2C05           730          OUT    #0,%R5        ;CLEAR PORT #5
0252 4D             731          LD     A,#B'1101     ;GET HOLD COMMAND DATA
0253 3A30           732          OUT    A,%HOLD       ;AND OUTPUT CMD
                    733 ; SYSTEM LOW POWER MODE
0255 3B06           734          SET    %R6,HACK      ;RESET CONTROL SIGNAL
0257 2A             735          RET                  ;AND SYSTEM RESTART
                    736 ;
                    737 ; CTCSS - POWER ON START-UP MODULE
                    738 ;         CONTROLLED FOR TTSYS(TT-SYSTEM)
                    739 ;
                    740 ;--------
                    741 ; POWER ON INITIALIZE
                    742 ;         (SYSTEM POWER THRN ON)
                    743 ;         RST = "L" START
                    744 ;--------
0258 2C04           745 INIZ:    OUT    #B'0000,%R4   ;CLEAR OUTPUT PORT #4
025A 2C05           746          OUT    #B'0000,%R5   ;AND #5
025C 2C16           747          OUT    #B'0001,%R6   ;AND #6
                    748 ; DATA RAM ALL CLEAR
025E C0             749          LD     H,#PAG0       ;GET INITIALIZE STARTING PAGE
025F E0             750          LD     L,#MC         ;AND GET STARTING WORD
0260 F0             751          ST     #0,@HL+       ;AND CLEAR MEMORY
0261 6260           752          BS     *-1           ;LOOP FOR CLEAR ALL WORD
0263 33C1           753          ADD    H,#1          ;LOOP FOR CLEAR ALL PAGE
0265 6260           754          BS     *-5           ;AND AGAIN
                    755 ; RESET STACK POINTER
0267 4C             756 Z30:     LD     A,#12         ;GET STACK INITIAL DATA
0268 3FFF           757          ST     A,SSP         ;AND SET
                    758 ; SET INTERRUPTION REGISTOR
026A 41             759          LD     A,#B'0001     ;GET MASK REG DATA
026B 13             760          XCH    A,EIR
026C 3BA0           761          TEST   %R0,DF        ;TEST IF PROGRAM MODE?
026E 626C           762          BS     *-2           ;NO..WAITE THIS MODE
0270 3640           763          EICLR  IL,B'000000   ;ENABLE INTR.
0272 64EB           764          BS     F2            ;GO START FUNC #2
                    765 ;
                    766 ;
                    767 ; PSTART    PROGRAM START
                    768 ;          MAIN CONTROL MODULE
                    769 ;          MODULE #F0.....MAIN CONTROLLER
                    770 ;                 #F1.....NORMAL FUNCTION HANDLER
                    771 ;                 #F2.....SYSTEM PROGRAMER
                    772 ;                 #Z30....INITIALIZER
                    773 ;--------
0274                774 PSTART:
0274 3BA0           775 F1:      TEST   %R0,DF        ;FNC = 2?
```

```
0276 627C      776           BS     F1ST              ;NO
               777 ;CHANGE THE CONTRL MODE            ;GET INT. MASK DATA
0278 43        778           LD     A,#B'0011         ;AND SET
0279 13        779           XCH    A,EIR             ;DONE
027A 64E8      780           BS     F2
               781 ; FUNCTION MODE #1 CONTROL
027C 3B3E      782 F1ST:     TEST   %HLDS,HREQ        ;TEST IF HOLD REQUEST?
027E 6282      783           BS     *+4               ;NO

ROM PAGE NO.10

0280 2217      784           CALL   HLT               ;YES..WAITE FOR PWR ON
0282 2D11      785           ST     #1,FNC            ;SET MODE COUNTER
0284 3B80      786           TEST   %R0,TXI           ;YES...TX AVLABLE?
0286 64B3      787           BS     TSOM              ;NO - WAITE TX! = "H"
0288 71        788           CALLS  P1                ;PAUSE TC1
0289 2016      789           CALL   P2                ;PAUSE TC2
028B 3B26      790           SET    %R6,BUSY          ;SET SYSTEM BUSY FLAG
028D 2D00      791           ST     #0,MC             ;AND CLEAR MATICNE CONTROL WD 028F 3630      792           DICLR  IL,B'000000       ;YES..DISABLE INTERRUPTION
0291 21C4      793           CALL   MTST              ;MEMORY EMPTY?
0293 6323      794           BS     TONE0             ;YES
0295 21D3      795           CALL   LTCH              ;NO
0297 7C        796           CALLS  SFF               ;GET F(OFFSET) TABLE ADR
0298 06        797           TEST   CF                ;RESET CARRY
0299 C1        798           LD     H,#PAG1           ;GET PAGE ADR
029A EF        799           LD     L,#TCH+3          ;GET REG. ADR PTR
029B F0        800           ST     #0,@HL+           ;AND CLEAR MSD
029C 75        801           CALLS  AH                ;SET (F) BAIASE
029D 33        802           LDL    A,@DC
029E 3B75      803           CLR    %R5,CER
02A0 03        804           INC    A
02A1 62A5      805           BS     *+4
02A3 3B35      806           SET    %R5,CER
02A5 21C4      807           CALL   MTST
02A7 21D3      808           CALL   LTCH
02A9 C1        809           LD     H,#PAG1           ;GET PAGE ADR
02AA EC        810           LD     L,#TCH            ;GET TONE NUMBER TEMP
02AB 06        811           TEST   CF                ;RESET CARY
02AC 0C        812           LD     A,@HL             ;GET MSD DATA
02AD 05        813           ROLC   A                 ;AC X 2
02AE 1A        814           ST     A,@HL+            ;SAVE AND SET NEXT ADR
02AF 0C        815           LD     A,@HL             ;GET 2ND DATA
02B0 05        816           ROLC   A                 ;AC X 2 AND SAVE CARY
02B1 0F        817           ST     A,@HL             ;DONE
02B2 70        818           CALLS  AF                ;A(OFFSET) PRESET
02B3 06        819           TEST   CF                ;RESET CARRY
02B4 C1        820           LD     H,#PAG1           ;GET PAGE ADR
02B5 EF        821           LD     L,#TCH+3          ;GET MSD ADR
02B6 F0        822           ST     #0,@HL+           ;CLEAR MSD
02B7 75        823           CALLS  AH
02B8 228A      824           CALL   *+2               ;MAKE CURRENT LOCATION ADR
                                                      ;& GET STACK ADR TO H.L
02BA 219C      825           CALL   SPS
02BC 2DCC      826           ST     #TCH,HG           ;SET DESTNATOIN ADR
02BE 2D1D      827           ST     #PAG1,LG          ;AND LOWER

ROM PAGE NO.11

02C0 21EE      828           CALL   TRNS
02C2 06        829           TEST   CF                ;RESET CARRY
02C3 C1        830           LD     H,#PAG1           ;GET PAGE ADR
02C4 EF        831           LD     L,#TCH+3          ;GET REG. MSD DATA ADR
02C5 F0        832           ST     #0,@HL+           ;CLEAR MSD
02C6 75        833           CALLS  AH
02C7 219C      834           CALL   SPS
02C9 290C      835           XCH    HL,HG             ;SET DEST. ADR
02CB CF        836           LD     H,#PAG15          ;AND SET SOURCE ADR
02CC EC        837           LD     L,#DCC
02CD 21EE      838           CALL   TRNS
```

```
                    839 ; SET D/A TABLE POINTER
02CF CF             840         LD    H,#PAG15
02D0 EC             841         LD    L,#DCC         ;SET TABLE COUNTER ADR
02D1 F4             842         ST    #4,@HL+        ;SET LSD
02D2 FF             843         ST    #15,@HL+       ;SET 2ND DIGIT
02D3 F7             844         ST    #7,@HL+        ;SET MSD
02D4 2A             845         RET
                    846 ;
                    847 ;--------
                    848 ; CHANNEL DATA DECODER TABLE
                    849 ;     CH. = 0 IS NO TONE ENCODE.
                    850 ;--------
02D5 6023           851         BS    TONE0
02D7 6330           852         BS    TONE1
02D9 634E           853         BS    TONE2
02DB 6357           854         BS    TONE3
02DD 6365           855         BS    TONE4
02DF 6371           856         BS    TONE5
02E1 637D           857         BS    TONE6
02E3 6383           858         BS    TONE7
02E5 6392           859         BS    TONE8
02E7 63A0           860         BS    TONE9
02E9 63AC           861         BS    TONE10
02EB 63B8           862         BS    TON10          ;TONE (10') SELECT
02ED 63C4           863         BS    TONE11
02EF 63CE           864         BS    TONE12
02F1 63DA           865         BS    TONE13
02F3 63E6           866         BS    TONE14
02F5 63F0           867         BS    TONE15
02F7 63FA           868         BS    TONE16
02F9 6404           869         BS    TONE17
02FB 640C           870         BS    TONE18
02FD 6414           871         BS    TONE19
02FF 6420           872         BS    TONE20

ROM PAGE NO.12 *

0301 642C           873         BS    TONE21
0303 6436           874         BS    TONE22
0305 643E           875         BS    TONE23         ;TONE (23)
0307 6448           876         BS    TONE24         ;TONE (24)
0309 6452           877         BS    TONE25         ;TONE (25)
030B 645A           878         BS    TONE26         ;TONE (26)
030D 6462           879         BS    TONE27
030F 646C           880         BS    TONE28
0311 6476           881         BS    TONE29
0313 647E           882         BS    TONE30
0315 6486           883         BS    TONE31
0317 648C           884         BS    TONE32
0319 6494           885         BS    TONE33
031B 649C           886         BS    TONE34
031D 64A2           887         BS    TONE35
031F 64A8           888         BS    TONE36
0321 64AE           889         BS    TONE37
                    890 ;
                    891 ;-----------------------------------------------
                    892 ; TONE GENERATOR GENERATION LIST
                    893 ;
                    894 ; CHANNEL I REGURATION(HZ) I GEN. (HZ) I ERROR RATIO(%)
                    895 ;-------+-----------------+-----------+----------------
                    896 ;    1  I      67         I   66.9    I   - 0.2
                    897 ;    2  I      71.9       I   71.8    I   - 0.2
                    898 ;    3  I      74.4       I   74.4    I   - ---
                    899 ;    4  I      77         I   76.8    I   + 0.3
                    900 ;    5  I      79.7       I   79.8    I   + 0.2
                    901 ;    6  I      82.5       I   82.3    I   - 0.4
                    902 ;    7  I      85.4       I   85.3    I   - 0.2
                    903 ;    8  I      88.5       I   88.6    I   + 0.2
                    904 ;    9  I      91.5       I   91.3    I   - 0.2
                    905 ;   10  I      94.8       I   94.6    I   - 0.3
                    906 ;   10' I      97.4       I   97.3    I   - 0.2
                    907 ;   11  I     100.0       I  100.1    I   + 0.1
```

```
                    908 ;       12   I       103.5      I    103.6    I    + 0.1
                    909 ;       13   I       107.2      I    107.3    I    + 0.1
                    910 ;       14   I       110.9      I    110.8    I    - 0.1
                    911 ;       15   I       114.8      I    115.4    I    + 0.3
                    912 ;       16   I       118.8      I    119      I    + 0.2
                    913 ;       17   I       123        I    123.2    I    + 0.2
                    914 ;       18   I       127.3      I    127      I    - 0.3
                    915 ;       19   I       131.8      I    131.8    I    - ---
                    916 ;       20   I       136.5      I    136.1    I    - 0.3
                    917 ;       21   I       141.3      I    141.7    I    + 0.3
                    918 ;       22   I       146.2      I    146.7    I    + 0.4
                    919 ;       23   I       151.4      I    150.9    I    - 0.4
                    920 ;       24   I       156.7      I    156.6    I    - 0.1
                    921 ;       25   I       162.2      I    162.7    I    + 0.4
                    922 ;       26   I       167.9      I    168      I    - 0.1
                    923 ;       27   I       173.8      I    173.6    I    - 0.2
                    924 ;       28   I       179.9      I    179.5    I    - 0.3
                    925 ;       29   I       186.2      I    186      I    - 0.2
                    926 ;       30   I       192.8      I    192.9    I    + 0.1
                    927 ;       31   I       203.5      I    204.2    I    + 0.4
                    928 ;       32   I       210.7      I    210.4    I    - 0.2
                    929 ;       33   I       218.1      I    217      I    - 0.6
                    930 ;       34   I       225.7      I    226.4    I    + 0.4
                    931 ;       35   I       233.6      I    234      I    + 0.2
                    932 ;       36   I       241.8      I    242.2    I    + 0.2
                    933 ;       37   I       250.3      I    251      I    + 0.3
                    934 ;------------------------------------------------------
                    935 ; TONE GENERATE MUST BE SMALL ERROR RATIO AND
                    936 ;    IT -0.4 < ERROR < +0.4 (%)
                    937 ;
                    938 ;--------
                    939 ; TONE GENERATOR MODULE
                    940 ;      KIND   OF 37 TONE GENERATE.
                    941 ;--------
                    942 ; NO TONE
0323 3B90           943 TONE0:   TEST   %R0,TX          ;TX = "H"?
0325 6335           944          BS     TN1             ;NO
                    945 ;END OF TX MODE
0327 CF             946          LD     H,#PAG15        ;YES..GET PAGE ADR
0328 EF             947          LD     L,#SSP          ;GET STACK POINTER ADR
0329 4C             948          LD     A,#12           ;STACK STARTING ADR SET
032A 0F             949          ST     A,@HL           ;AND DEPOSIT
032B 3BC0           950          TESTP  %R0,TX1         ;TURN OFF TX1 ?
032D 632B           951          BS     *-2             ;NO
032F 3665           952          EICLR  IL,B'100101     ;YES
0331 3B66           953          CLR    %R6,BUSY        ;CLEAR CONTROL SIGNAL
0333 6274           954          BS     F1              ;ALL DONE
                    955 ;WAITE FOR TX = "H" LEVELE      ;CONTROL
0335                956 TN1      EQU    *
0335 3B3E           957          TEST   %HLDS,HREQ      ;NO..LOW POWER ?
0337 6323           958          BS     TONE0           ;NO
0339 2239           959          CALL   HLT1            ;YES
033B 6323           960          BS     TONE0           ;RESTART PGM
                    961 ;
                    962 ;--------
                    963 ; TONE1
                    964 ; 311 INSTRCTIONS
                    965 ;--------
033D 2142           966 TONE1:   CALL   DAC             ; 30 INST.
033F 218D           967          CALL   V80             ; 80 INST.
```
*ROM PAGE NO.13 *
```
0341 218D           968          CALL   V80
0343 2185           969          CALL   V40             ; 40 INST.
0345 217F           970          CALL   V20             ; 20 INST.
0347 2197           971          CALL   V9              ;  9 INST.
0349 633D           972          BS     TONE1           ;  2 INST.
                    973 ; 290 INSTRUCTIONS
034B 2142           974 TONE2:   CALL   DAC
034D 218D           975          CALL   V80
```

```
034F 218D      976           CALL   V80
0351 2185      977           CALL   V40
0353 2198      978           CALL   V8          ; 8 INST.
0355 634B      979           BS     TONE2
               980  ; 280 INSTRUCTIONS
0357 2142      981  TONE3:   CALL   DAC
0359 218D      982           CALL   V80
035B 218D      983           CALL   V80
035D 217F      984           CALL   V20
035F 217A      985           CALL   V10         ; 10 INST.
0361 2198      986           CALL   V8          ; 8 INST.
0363 6357      987           BS     TONE3
               988  ; 271 INSTRUCTIONS
0365 2142      989  TONE4:   CALL   DAC
0367 218D      990           CALL   V80
0369 218D      991           CALL   V80
036B 217F      992           CALL   V20
036D 2197      993           CALL   V9          ; 9 INST.
036F 6365      994           BS     TONE4
               995  ; 261 INSTRUCTIONS
0371 2142      996  TONE5:   CALL   DAC
0373 218D      997           CALL   V80
0375 218D      998           CALL   V80
0377 217A      999           CALL   V10
0379 2197      1000          CALL   V9
037B 6371      1001          BS     TONE5
               1002 ; 253 INSTRUCTIONS
037D 2142      1003 TONE6:   CALL   DAC
037F 218D      1004          CALL   V80

ROM PAGE NO.14 *

0381 218D      1005          CALL   V80
0383 217A      1006          CALL   V10
0385 00        1007          NOP
0386 637D      1008          BS     TONE6
               1009 ; 244 INSTRUCTIONS
0388 2142      1010 TONE7:   CALL   DAC
038A 218D      1011          CALL   V80
038C 218D      1012          CALL   V80
038E 00        1013          NOP
038F 00        1014          NOP
0390 6388      1015          BS     TONE7
               1016 ; 235 INSTRUCTIONS
0392 2142      1017 TONE8:   CALL   DAC
0394 218D      1018          CALL   V80
0396 2185      1019          CALL   V40
0398 217F      1020          CALL   V20
039A 2197      1021          CALL   V9
039C 2178      1022          CALL   V4          ; 4 INST.
039E 6392      1023          BS     TONE8
               1024 ; 228 INSTRUCTIONS
03A0 2142      1025 TONE9:   CALL   DAC
03A2 218D      1026          CALL   V80
03A4 2185      1027          CALL   V40         ;40 INSTR. DELAY
03A6 217F      1028          CALL   V20
03A8 219A      1029          CALL   V6          ; 6 INST.
03AA 63A0      1030          BS     TONE9
               1031 ; 220 INSTRUCTIONS
03AC 2142      1032 TONE10:  CALL   DAC
03AE 218D      1033          CALL   V80
03B0 2185      1034          CALL   V40
03B2 217A      1035          CALL   V10
03B4 2198      1036          CALL   V8
03B6 63AC      1037          BS     TONE10
               1038 ; 214 INSTRUCTIONS
03B8 2142      1039 TON10:   CALL   DAC         ;80
03BA 218D      1040          CALL   V80         ;80
03BC 2185      1041          CALL   V40         ;40
03BE 217A      1042          CALL   V10         ;10
```

ROM PAGE NO.15

```
03C0  00          1043            NOP                     ;1
03C1  00          1044            NOP                     ;1
03C2  63B8        1045            BS      TON10           ;2
                  1046  ; 208 INSTRUCTIONS
03C4  2142        1047  TONE11:   CALL    DAC
03C6  218D        1048            CALL    V80
03C8  2185        1049            CALL    V40
03CA  219A        1050            CALL    V6
03CC  63C4        1051            BS      TONE11
                  1052  ; 201 INSTRUCTIONS
03CE  2142        1053  TONE12:   CALL    DAC
03D0  218D        1054            CALL    V80
03D2  217F        1055            CALL    V20
03D4  217A        1056            CALL    V10
03D6  2197        1057            CALL    V9
03D8  63CE        1058            BS      TONE12
                  1059  ; 194 INSTRUCTIONS
03DA  2142        1060  TONE13:   CALL    DAC
03DC  218D        1061            CALL    V80
03DE  217F        1062            CALL    V20
03E0  217A        1063            CALL    V10
03E2  00          1064            NOP                     ; 1 INST.
03E3  00          1065            NOP
03E4  63DA        1066            BS      TONE13
                  1067  ; 188 INSTRUCTIONS
03E6  2142        1068  TONE14:   CALL    DAC
03E8  218D        1069            CALL    V80
03EA  217F        1070            CALL    V20
03EC  219A        1071            CALL    V6
03EE  63E6        1072            BS      TONE14
                  1073  ; 181 INSTRUCTIONS
03F0  2142        1074  TONE15:   CALL    DAC
03F2  218D        1075            CALL    V80
03F4  217A        1076            CALL    V10
03F6  2197        1077            CALL    V9
03F8  63F0        1078            BS      TONE15
                  1079  ; 175 INSTRUCTIONS
03FA  2142        1080  TONE16:   CALL    DAC
03FC  218D        1081            CALL    V80
03FE  2197        1082            CALL    V9
```

ROM PAGE NO.16

```
0400  2179        1083            CALL    V4
0402  63FA        1084            BS      TONE16
                  1085  ; 169 INSTRUCTIONS
0404  2142        1086  TONE17:   CALL    DAC
0406  218D        1087            CALL    V80
0408  2199        1088            CALL    V7
040A  6404        1089            BS      TONE17
                  1090  ; 164 INSTRUCTIONS
040C  2142        1091  TONE18:   CALL    DAC
040E  218D        1092            CALL    V80
0410  00          1093            NOP
0411  00          1094            NOP
0412  640C        1095            BS      TONE18
                  1096  ; 158 INSTRUCTIONS
0414  2142        1097  TONE19:   CALL    DAC
0416  2185        1098            CALL    V40
0418  217F        1099            CALL    V20
041A  2197        1100            CALL    V9
041C  2199        1101            CALL    V7
041E  6414        1102            BS      TONE19
                  1103  ; 153 INSTRUCTIONS
0420  2142        1104  TONE20:   CALL    DAC
0422  2185        1105            CALL    V40
0424  217F        1106            CALL    V20
0426  2197        1107            CALL    V9
0428  00          1108            NOP                     ;1 INSTR. DELAY
```

```
0429 00         1109           NOP              ;1 INSTR. DELAY
042A 642C       1110           BS   TONE20
                1111 ; 147 INSTRUCTIONS
042C 2142       1112 TONE21:   CALL DAC
042E 2185       1113           CALL V40
0430 217F       1114           CALL V20
0432 2178       1115           CALL V5
0434 642C       1116           BS   TONE21
                1117 ; 142 INSTRUCTIONS
0436 2142       1118 TONE22:   CALL DAC
0438 2185       1119           CALL V40
043A 217F       1120           CALL V20
043C 6436       1121           BS   TONE22
                1122 ; 138 INSTRUCTIONS
043E 2142       1123 TONE23:   CALL DAC
```

ROM PAGE NO.17

```
0440 2185       1124           CALL V40
0442 2197       1125           CALL V9
0444 2199       1126           CALL V7           ;7 INSTR. DELAY
0446 643E       1127           BS   TONE23
                1128 ; 133 INSTRUCTIONS
0448 2142       1129 TONE24:   CALL DAC
044A 2185       1130           CALL V40
044C 219A       1131           CALL V6
044E 2178       1132           CALL V5
0450 6448       1133           BS   TONE24
                1134 ; 128 INSTRUCTIONS
0452 2142       1135 TONE25:   CALL DAC
0454 2185       1136           CALL V40
0456 219A       1137           CALL V6
0458 6452       1138           BS   TONE25
                1139 ; 124 INSTRUCTIONS
045A 2142       1140 TONE26:   CALL DAC
045C 2185       1141           CALL V40
045E 00         1142           NOP
045F 00         1143           NOP
0460 645A       1144           BS   TONE26
                1145 ; 120 INSTRUCTIONS
0462 2142       1146 TONE27:   CALL DAC
0464 217F       1147           CALL V20
0466 217A       1148           CALL V10
0468 2198       1149           CALL V8
046A 6462       1150           BS   TONE27
                1151 ; 116 INSTRUCTIONS
046C 2142       1152 TONE28:   CALL DAC
046E 217F       1153           CALL V20
0470 2198       1154           CALL V8
0472 219A       1155           CALL V6
0474 646C       1156           BS   TONE28
                1157 ; 112 INSTRUCTIONS
0476 2142       1158 TONE29:   CALL DAC
0478 217F       1159           CALL V20
047A 217A       1160           CALL V10
047C 6476       1161           BS   TONE29
                1162 ; 108 INSTRUCTIONS
047E 2142       1163 TONE30:   CALL DAC
```

ROM PAGE NO.18

```
0480 217F       1164           CALL V20
0482 219A       1165           CALL V6
0484 647E       1166           BS   TONE30
                1167 ; 102 INSTRUCTIONS
0486 2142       1168 TONE31:   CALL DAC
0488 217F       1169           CALL V20
048A 6486       1170           BS   TONE31
                1171 ; 99 INSTRUCTIONS
048C 2142       1172 TONE32:   CALL DAC
048E 217A       1173           CALL V10
```

```
0490 2199      1174            CALL  V7
0492 643C      1175            BS    TONE32
               1176 ; 96 INSTRUCTIONS
0494 2142      1177 TONE33:    CALL  DAC
0496 217A      1178            CALL  V10
0498 2179      1179            CALL  V4
049A 6494      1180            BS    TONE33
               1181 ; 92 INSTRUCTIONS
049C 2142      1182 TONE34:    CALL  DAC
049E 217A      1183            CALL  V10
04A0 649C      1184            BS    TONE34
               1185 ; 89 INSTRUCTIONS
04A2 2142      1186 TONE35:    CALL  DAC
04A4 2199      1187            CALL  V7
04A6 64A2      1188            BS    TONE35
               1189 ; 86 INSTRUCTIONS
04A8 2142      1190 TONE36:    CALL  DAC
04AA 2179      1191            CALL  V4
04AC 64A8      1192            BS    TONE36
               1193 ; 83 INSTRUCTIONS
04AE 2142      1194 TONE37:    CALL  DAC
04B0 00        1195            NOP
04B1 64AE      1196            BS    TONE37
               1197 ;
               1198 ; SQ CHECK MODE
04B3 3990      1199 TSQM:      TEST  MC,DSQ           ;TEST IF SQUELTI DETECTION MF
DE?
04B5 6274      1200            BS    F1               ;NO
04B7 30F0      1201 TSQ2:      TESTP %R0,SQ           ;YES..CHECK SQ TURN ON?
04B9 6274      1202            BS    F1               ;NO
               1203 ; SQ TURN ON
04BB 36A5      1204            DICLR IL,B'100101      ;MASK INTERRUPTION
04BD 72        1205            CALLS P2
04BE 21C4      1206            CALL  MTST

ROM PAGE NO.19

04C0 5A        1207            TEST  @HL,ED          ;TONE DECODE ?
04C1 64D3      1208            BS    TSQ1            ;NO
04C3 CF        1209            LD    H,#PAG15        ;YES
04C4 E3        1210            LD    L,#TC2          ;TIME OUT COUNTER SET
04C5 FA        1211            ST    #H'A,@HL+       ;4.09 X 6 = 24.5 (MC)
04C6 FF        1212            ST    #H'F,@HL+       ;TIMER COUNTER
04C7 FF        1213            ST    #H'F,@HL+       ;PRESET
04C8 2036      1214            CALL  C1
04CA 49        1215            LD    A,#B'1001
04CB 3A3D      1216            OUT   A,%TC2C
04CD 3900      1217            SET   MC,TD
               1218 ; TONE DECODE START
04CF 3950      1219            CLR   MC,DSQ
04D1 64DD      1220            BS    DSQEXT          ;DONE
               1221 ;
04D3 71        1222 TSQ1:      CALLS P1
04D4 72        1223            CALLS P2
04D5 3940      1224            CLR   MC,TD
04D7 3950      1225            CLR   MC,DSQ
04D9 3B16      1226            SET   %R6,TEQ
04DB 3B66      1227            CLR   %R6,BUSY
               1228 ; RETURN TO CONTROL PROGRAM
04DD 3661      1229 DSQEXT:    EICLR IL,B'100001     ;SET RETURN INTERRUPTION MODE
04DF 6274      1230            BS    F1              ;DONE
               1231 ;
               1232 ;---------
               1233 ; READ CHANNEL DATA
               1234 ;    FOR FUNC #2 MODE
               1235 ;---------
04E1 3C71      1236 RCH1:      LD    A,D1            ;GET CPU(1) CHANNEL DATA
04E3 3F10      1237            ST    A,CHN           ;AND SAVE IT.
04E5 3960      1238            CLR   MC,DR           ;AND CLEAR CTL FLAG
04E7 3B66      1239            CLR   %R6,BUSY        ;CLEAR BUSY FLAG
04E9 64E9      1240            BS    F2              ;AND DONE
```

```
                1241 ;
                1242 ;--------
                1243 ; F2
                1244 ; SYSTEM PROGRAM MODE
                1245 ;         SET-UP MODULE
                1246 ;--------
04EB 388E       1247 F2:    TEST    %HLDS,HREQ      ;HOLD?
04ED 64F1       1248         BS      *+4             ;NO
04EF 2217       1249         CALL    HLT             ;CONTROL HOLD STATE
04F1 3BE0       1250         TESTP   %R0,DF          ;FNC = 2?
04F3 64F9       1251         BS      F2ST            ;YES
04F5 43         1252         LD      A,#B'0011       ;GET INTRRUPTION MASK REG.
04F6 13         1253         XCH     A,EIR           ;AND SET
04F7 6274       1254         BS      F1              ;AND GO TO PROGRAM
04F9 00         1255 F2ST:  NOP
04FA 39A0       1256         TEST    MC,DR           ;TEST IF COMAND RECIVED?
04FC 64EB       1257         BS      F2              ;NO
                1258 ; DATA RECIVE MODE
04FE 21FC       1259         CALL    RCV

ROM PAGE NO.20

0500 E0         1260         LD      L,#D0
0501 43         1261         LD      A,#B'0011
0502 1E         1262         AND     A,@HL
0503 08         1263         TEST    CF              ;RESET CARY
0504 05         1264         ROLC    A               ;ACC X 2 SET
0505 21A3       1265         CALL    AJ
0507 64E1       1266         BS      RCH1
0509 650F       1267         BS      TDR
050B 651F       1268         BS      TTX
050D 65CD       1269         BS      *
                1270 ; TONE CHANNEL-DATA RECIVE
050F 21C4       1271 TDR:   CALL    MTST
0511 3C72       1272         LD      A,D2
0513 3828       1273         OR      A,#B'1000
0515 1B         1274         ST      A,@HL
0516 3C71       1275         LD      A,D1
0518 0F         1276         ST      A,@HL
0519 3960       1277         CLR     MC,DR
051B 3B66       1278         CLR     %R6,BUSY
051D 64EB       1279         BS      F2              ;DONE
                1280 ; TONE DATA TRANSFER MODE
051F 3B36       1281 TTX:   SET     %R6,TRN         ;SET OUTPUT ACK
0521 21C4       1282         CALL    MTST            ;SET MEMORY ADDR
0523 0C         1283         LD      A,@HL
0524 3F72       1284         ST      A,D2
0526 19         1285         DEC     L
0527 0C         1286         LD      A,@HL
0528 3F71       1287         ST      A,D1
052A 3B66       1288         CLR     %R6,BUSY        ;CLEAR SYSTEM BUSY OUTPUT
052C C7         1289 TTX1:  LD      H,#PAG7         ;GET PAGE ADR
052D E1         1290         LD      L,#D1           ;GET TRANSIVER ADR
052E 3B39       1291         TEST    %R9,0           ;D0 = 1?
0530 652E       1292         BS      *-2             ;NO..WAITE DATA OUTPUT
0532 3B99       1293         TEST    %R9,1           ;TEST IF D1 = 1?
0534 6532       1294         BS      *-2             ;NO
0536 3AE7       1295         OUT     @HL,%R7         ;YES..OUTPUT DATA
0538 3BA9       1296         TEST    %R9,2           ;D2 = 1?
053A 6533       1297         BS      *-2             ;NO
053C 13         1298         INC     L               ;YES..SET NEXT BUFR ADR
053D 3AE7       1299         OUT     @HL,%R7         ;AND OUTPUT
053F 652C       1300         BS      TTX1            ;LOOP TILL NEXT COMAND
                1301 ;
                1302 ;--------
                1303 ; PROGRAM CONSTANT TABLE
                1304 ;--------
                1305 ; F-GENERATOR ERROR CORRECTOR FLAGS
                1306 ;--------
```

ROM PAGE NO.28 *

```
07.00                 1307            ORG    H'700
0700 00               1308            DATA   0            ;IGNORE
0701 00               1309            DATA   0            ;CH. #1
0702 00               1310            DATA   0            ;CH. #2
0703 00               1311            DATA   0
0704 FF               1312            DATA   -1
0705 FF               1313            DATA   -1
0706 00               1314            DATA   0
0707 00               1315            DATA   0
0708 FF               1316            DATA   -1
0709 00               1317            DATA   0
070A 00               1318            DATA   0            ;CH. #10
070B 00               1319            DATA   0            ;TONE (10')
070C FF               1320            DATA   -1
070D FF               1321            DATA   -1
070E FF               1322            DATA   -1
070F 00               1323            DATA   0
0710 FF               1324            DATA   -1
0711 FF               1325            DATA   -1
0712 FF               1326            DATA   -1
0713 00               1327            DATA   0
0714 00               1328            DATA   0
0715 00               1329            DATA   0            ;CH. #20
0716 FF               1330            DATA   -1
0717 FF               1331            DATA   -1
0718 00               1332            DATA   0
0719 00               1333            DATA   0
071A FF               1334            DATA   -1
071B 00               1335            DATA   0
071C 00               1336            DATA   0
071D 00               1337            DATA   0
071E 00               1338            DATA   0
071F FF               1339            DATA   -1           ;CH. #30
0720 FF               1340            DATA   -1
0721 00               1341            DATA   0
0722 00               1342            DATA   0
0723 FF               1343            DATA   -1           ;CH. #34
0724 FF               1344            DATA   -1           ;CH. #35
0725 FF               1345            DATA   -1           ;CH. #36
0726 FF               1346            DATA   -1           ;CH. #37
                      1347    ;
```

ROM PAGE NO.28

```
0730                  1348            ORG    H'730
                      1349    ;--------
                      1350    ; TONE DECODER REFERENCE DATA TABLE
                      1351    ;         UPER/LOWER LIMIT
                      1352    ;--------
0730 00000000         1353            DATA   0,0,0,0
0734 F6FCF65C         1354            DATA   H'F6,H'FC,H'F6,H'5C ;2308 - 2463
0738 F772F72C         1355            DATA   H'F7,H'72,H'F7,H'2C ;2190 - 2260
073C F7BDF777         1356            DATA   H'F7,H'BD,H'F7,H'77 ;2115 - 2185
```

ROM PAGE NO.29

```
0740 F7FEF7C2         1357            DATA   H'F7,H'FE,H'F7,H'C2 ;2050 - 2110
0744 F84EF808         1358            DATA   H'F8,H'4E,H'F8,H'08 ;1970 - 2040
0748 F88AF858         1359            DATA   H'F8,H'8A,H'F8,H'58 ;1910 - 1960
074C F8DAF894         1360            DATA   H'F8,H'DA,H'F8,H'94 ;1830 - 1900
0750 F90CF8E4         1361            DATA   H'F9,H'0C,H'F8,H'E4 ;1780 - 1820
0754 F952F916         1362            DATA   H'F9,H'52,H'F9,H'16 ;1710 - 1770
0758 F97AF95C         1363            DATA   H'F9,H'7A,H'F9,H'5C ;1670 - 1700
075C F9A2F984         1364            DATA   H'F9,H'A2,H'F9,H'84 ;1630 - 1660
0760 F9D4F9AC         1365            DATA   H'F9,H'D4,H'F9,H'AC ;1580 - 1620
0764 FA10F9DE         1366            DATA   H'FA,H'10,H'F9,H'DE ;1520 - 1570
0768 FA42FA1A         1367            DATA   H'FA,H'42,H'FA,H'1A ;1470 - 1510
076C FA74FA4C         1368            DATA   H'FA,H'74,H'FA,H'4C ;1420 - 1460
0770 FAA8FA7E         1369            DATA   H'FA,H'A8,H'FA,H'7E ;1370 - 1410
```

```
0774 FA03FAAE  1370              DATA   H'FA,H'03,H'FA,H'AE ;1325 - 1365
0778 FB05FA03  1371              DATA   H'FB,H'05,H'FA,H'03 ;1275 - 1320
077C FB2DFB0A  1372              DATA   H'FB,H'2D,H'FB,H'0A ;1235 - 1270

ROM PAGE NO.30

0780 FB55FB32  1373              DATA   H'FB,H'55,H'FB,H'32 ;1195 - 1230
0784 FB7DFB5A  1374              DATA   H'FB,H'7D,H'FB,H'5A ;1155 - 1190
0788 FBA5FB82  1375              DATA   H'FB,H'A5,H'FB,H'82 ;1115 - 1150
078C FBCDFBAA  1376              DATA   H'FB,H'CD,H'FB,H'AA ;1075 - 1110
0790 FBF0FBD2  1377              DATA   H'FB,H'F0,H'FB,H'D2 ;1040 - 1070
0794 FC13FBFA  1378              DATA   H'FC,H'13,H'FB,H'FA ;1005 - 1030
0798 FC36FC16  1379              DATA   H'FC,H'36,H'FC,H'16 ; 970 - 1002
079C FC57FC39  1380              DATA   H'FC,H'57,H'FC,H'39 ; 937 -  967
07A0 FC77FC59  1381              DATA   H'FC,H'77,H'FC,H'59 ; 905 -  935
07A4 FC96FC78  1382              DATA   H'FC,H'96,H'FC,H'78 ; 874 -  904
07A8 FCAFFC97  1383              DATA   H'FC,H'AF,H'FC,H'97 ; 849 -  873
07AC FCD1FCB5  1384              DATA   H'FC,H'D1,H'FC,H'B5 ; 815 -  843
07B0 FCF8FCE1  1385              DATA   H'FC,H'F8,H'FC,H'E1 ; 773 -  793
07B4 FD16FCFC  1386              DATA   H'FD,H'16,H'FC,H'FC ; 746 -  772
07B8 FD30FD17  1387              DATA   H'FD,H'30,H'FD,H'17 ; 720 -  745
07BC FD46FD31  1388              DATA   H'FD,H'46,H'FD,H'31 ; 698 -  719

ROM PAGE NO.31

07C0 FD5FFD48  1389              DATA   H'FD,H'5F,H'FD,H'48 ; 673 -  696
07C4 FD75FD61  1390              DATA   H'FD,H'75,H'FD,H'61 ; 651 -  671
07C8 FD8EFD77  1391              DATA   H'FD,H'8E,H'FD,H'77 ; 620 -  649
               1392          ;

ROM PAGE NO.31

07F4           1393              ORG    H'7F4
               1394          ;--------
               1395          ; SIN WAVE GENERATOR DATA TABLE
               1396          ;       7-BITS D/A CONVETOR CONSTANT
               1397          ;--------
07F4 26        1398              DATA   H'26           ;1.5  (V)
07F5 31        1399              DATA   H'31           ;2    (V)
07F6 3C        1400              DATA   H'3C           ;2.37 (V)
07F7 40        1401              DATA   H'40           ;2.5  (V)
07F8 3C        1402              DATA   H'3C           ;2.37 (V)
07F9 31        1403              DATA   H'31           ;2    (V)
07FA 26        1404              DATA   H'26           ;1.5  (V)
07FB 19        1405              DATA   H'19           ;1    (V)
07FC 10        1406              DATA   H'10           ;0.63 (V)
07FD 0D        1407              DATA   H'0D           ;0.5  (V)
07FE 10        1408              DATA   H'10           ;0.63 (V)
07FF 19        1409              DATA   H'19           ;1    (V)
               1410              END

ASSEMBLY COMPLETE,     0 PROGRAM ERROR(S)

SYMBOL TABLE

A1     0157     A2     015C     A3     016C     A4     0171
  AF     006E     AH     002E     AHR    0056     AJ     01AB
  AP     0183     AR     000E     ASI    005E     BUSY   0002
  C1     003E     CER    0003     CHN    0010     D0     0070
  D1     0071     D10    0148     D2     0072     D20    0140
  DAC    0142     DCC    00FC     DF     0002     DL     0046
  DR     0002     DSQ    0001     DSQEXT 0400   * EADR   0020
  ED     0002     EMPT   0003     F1     0274     F1ST   027C
  F2     04EB     F2ST   04F9     FC     000F     FM1    0119
  FNC    0001     HACK   0000   * HACK0  0000     HACK1  0001
  HG     000C     HLDS   000E     HLT    0217     HLT1   0239
  HLT10  0220     HLT20  0240     HOLD   0010     HREQ   0000
  HTC2   00D9     HTC3   00EE     HTC4   00F6     I10    0080
  I20    00B4     I30    00BD     I40    00C3     I5     008D
  IEND0  00C9     IEND1  0001     INIZ   0258     INT1   0036
* INT2   0101   * LCD1   001A   * LCD2   001B     LG     000D
  LTCH   01D3     MC     0000     MTST   01C4   * OADR   0022
```

```
  P1        000E     P2        0016    PA        0014     PAG0      0000
  PAG1      0001   * PAG10     000E  * PAG11     000F   * PAG12     000C
* PAG13     000D   * PAG14     000E    PAG15     000F   * PAG2      0002
* PAG3      0003   * PAG4      0004  * PAG5      0005   * PAG6      0006
  PAG7      0007   * PAG8      000C  * PAG9      000D   * PSTART    0274
  R0        0000   * R1        0001  * R2        0002   * R3        0003
  R4        0004     R5        0005    R6        0006     R7        0007
  R8        0008     R9        0009    RCH1      04E1     RCV       01FC
  RS        001E   * SDC       01E2    SFP       0066   * SIDE      000F
* SIOC      001F     SPS       019C    SQ        0003     SSP       00FF
  SV        001E     SY1       0002    T2        0026     TC1       00F4
  TC1C      001C     TC2       00F8    TC2C      001D     TCH       001C
  TD        0000     TDR       050F    TEMP      0011     TEQ       0001
  TN1       0335     TON10     0388    TONE0     0323     TONE1     033D
  TONE10    03AC     TONE11    03C4    TONE12    03CE     TONE13    03DA
  TONE14    03E6     TONE15    03FC    TONE16    03FA     TONE17    0404
  TONE18    040C     TONE19    0414    TONE2     034E     TONE20    042C
  TONE21    042C     TONE22    0436    TONE23    043E     TONE24    0448
  TONE25    0452     TONE26    045A    TONE27    0462     TONE28    046C
  TONE29    0476     TONE3     0357    TONE30    047E     TONE31    0488
  TONE32    043C     TONE33    0494    TONE34    049C     TONE35    04A2
  TONE36    04A8     TONE37    04AE    TONE4     0365     TONE5     0371
  TONE6     037D     TONE7     0388    TONE8     0392     TONE9     03A0
  TRN       0003     TRNS      01EE    TSQ1      0403   * TSQ2      0487
  TSQM      0483     TTX       051F    TTX1      052C   * TV        0019
  TX        0001     TXHL      0101    TXI       0000   * TXI1      0000
  V10       017A     V20       017F    V3        0179     V40       0185
  V5        017B     V6        019A    V7        0199     V8        0198
  V90       013D     V9        0197    WAIT      0000     WK1       0008
* Z30       0267     Z8        003E

DEFINED   136 USER SYMBOL(S)

A>

©1983 General Research of Electronics, Inc.

A>TYPE TTS30.PRN

CP/M  TLCS-47  ASSEMBLER  V2.2

LOC  OBJ       LINE       SOURCE STATEMENT

1  ;------------------------------------------------------------
                2  ; TLCS - 47 MICRO-COMPUTER APPLICATION PROGRAM.
                3  ;
                4  ; HANDHELD TRANSCIVER CONTORL LSI USED FOR BUSSINESS
                5  ;       BAND SYSTEM
                6  ;
                7  ;                           1982 - 5 - 10   ;PROG - S
                8  ;                           1983 - 1 - 20   ;END
                9  ;                     BY   H. MIYAKOSHI
               10  ;------------------------------------------------------------
               11  ; SYSTEM TITLE ( TTSYS )
               12  ;------------------------------------------------------------
               13  ; I/O DEVICE CONTROL ADDR
               14  ;----------          ; BIT(3)   BIT(2)   BIT(1)   BIT(0)

ROM PAGE NO. 0

0000          15  R0      EQU    0    ; K3       K2       K1       K0
 0001          16  R1      EQU    1    ;NOT USE
 0002          17  R2      EQU    2    ;NOT USE
 0003          18  R3      EQU    3    ;NOT USE
 0004          19  R4      EQU    4    ; DTR      PEE      TXI      MUTE
 0005          20  R5      EQU    5    ; TRN(1)   TEQ      DF       KL
 0006          21  R6      EQU    6    ; D3       D2       D1       D0
 0007          22  R7      EQU    7    ; TD3      TD2      TD1      TD0
 0008          23  R8      EQU    8    ; BUSY     HREQ-    HACK     TX-
 0009          24  R9      EQU    9    ; ----     SC-      SO       PENB
 000E          25  HLDS    EQU   14    ;HOLD MODE STATUS REG.
 0010          26  HOLD    EQU   16    ;HOLD COMAND REG
```

```
000F          27 SIOB      EQU    15           ;SERIAL PORT BUFR REG.
001F          28 SIOC      EQU    H'1F         ;"         COMAND REG.
000E          29 SIOS      EQU    14           ;"         STATUS REG.
0019          30 TV        EQU    H'19         ;INTERVAL TIMER INT.
001C          31 TC1C      EQU    H'1C         ;TIMER COUNTER #1 COMAND REG.
001D          32 TC2C      EQU    H'1D         ;TIMER COUNTER #2 COMAND REG.
001A          33 LCD1      EQU    H'1A         ;LCD COMAND REG. #1
001B          34 LCD2      EQU    H'1B         ;LCD COMAND REG. #2
              35 ; I/O PORT BIT ADDRESS TABLE
0002          36 PEE       EQU    2            ;PEE SOUND DRIVER
0002          37 TEQ       EQU    2            ;TONE/SQ DETECOR SENCER
0001          38 DF        EQU    1            ;SYSTEM PROGRAMMER COMAND
0000          39 KL        EQU    0            ;LOCK KEY OPERATION COMAND
0003          40 DTR       EQU    3            ;REQUEST TO SEND COMAND DRIVER
0003          41 TRN1      EQU    3            ;CPU 2  TO  CPU 1 TRANSFER DRIVER
0001          42 TXI       EQU    1            ;TRANSCIVER TX INHIBIT
0000          43 MUTE      EQU    0            ;AUDIO MUTE DRIVER
0000          44 PENB      EQU    0            ;"DTMF" POWER TURN ON DRIVER
0003          45 BUSY      EQU    3            ;CPU 2   STATE BUSY
0001          46 HACK      EQU    1            ;CPU 2  HOLD READY TO
0002          47 HRG       EQU    2            ;SYSTEM HOLD REQUEST BIT
0000          48 TX        EQU    0            ;TX  COMAND
0003          49 SC        EQU    3            ;SERIAL SHIFT CLOCK RUN FLAG.
              50 ; I/O PORT USED SYMBOL
0007          51 TD        EQU    R7           ;CPU1  TO  CPU2  DATA BUS
0006          52 DIGT      EQU    R6           ;DIGIT OU
0000          53 KEY       EQU    R0           ;KEY BOARD
              54 ; LCD SEGMENT ADR TABLE
0000          55 SA1       EQU    0            ;S(A1)
0000          56 SB1       EQU    0            ;S(B1)
0000          57 SC1       EQU    0            ;S(C1)
0000          58 SD1       EQU    0            ;S(D1)
0000          59 SE1       EQU    0            ;S(E1)
0000          60 SF1       EQU    0            ;S(F1)
0000          61 SG1       EQU    0            ;S(G1)
0000          62 SA2       EQU    0            ;S(A2)
0000          63 SB2       EQU    0            ;S(B2)
0000          64 SC2       EQU    0            ;S(C2)
0000          65 SD2       EQU    0            ;S(D2)
0000          66 SE2       EQU    0            ;S(E2)
0000          67 SF2       EQU    0            ;S(F2)
0000          68 SG2       EQU    0            ;S(G2)
0000          69 SPRI      EQU    0            ;PRIORITY CH. DISPLAY INDICATOR
0000          70 PD        EQU    0            ;PRIORITY RECIVE INDICATOR
0000          71 STX       EQU    0            ;PROGRAM MODE ... TX DISPLAY
0000          72 SRX       EQU    0            ;PROGRAM MODE ... RX DISPLAY
0000          73 S0        EQU    0            ;TONE EN-CODE IND.
0000          74 S1        EQU    0            ;TONE EN/DE-CODE IND.
0000          75 SCAN      EQU    0            ;
              76 ; CONTROL FLAG BIT ADR TABLE
0002          77 MDB       EQU    2            ;BLANKING FOR MD CONTROL
0003          78 FST       EQU    3            ;#1 INPUT FLAG
0002          79 T05       EQU    2            ;TIMER 500(MS) INUSE
0001          80 T02       EQU    1            ;TIMER 200(MS) INUSE
0002          81 ATP       EQU    2            ;PRIORITY SAVED AUTO SCAN
0002          82 HFLG      EQU    2            ;HOLD REQUEST FLAG
0002          83 NTD       EQU    2            ;NORMAL TONE/SQ DETECT MODE
0001          84 TXRX      EQU    1            ;SERIAL DRIVER TURN USE
0000          85 RDEC      EQU    0            ;2ND MODE TONE/SQ DETECT CYCLE
0000          86 TOR       EQU    0            ;MUTE TIMER TURN OVER COUNT FLAG
0001          87 TODN      EQU    1            ;
0003          88 ER        EQU    3            ;
0003          89 SCDW      EQU    3            ;SCAN ON DUAL WATCH FLAG
0002          90 DPIR      EQU    2            ;PRIORITY CH. DISPLAY FLAG
0001          91 PIR       EQU    1            ;PRIORITY RECIVE MARK
0000          92 SDN       EQU    0            ;RX MODE INDICATOR
0003          93 AT        EQU    3            ;AUTO SCAN STARTER FLAG
0000          94 DP        EQU    0            ;
0000          95 DN        EQU    0            ;
0003          96 DWFS      EQU    3            ;DUAL WATCH SENCE FLAG
0000          97 DWF       EQU    0            ;SYSTEM DUAL WATCH MODE
```

```
0001          98 MD        EQU     1        ;MULTI-DATA DISPLAY MODE
0000          99 MATK      EQU     0        ;MUTE ATTACK TIMER COUNT FLAG
0003         100 ED        EQU     3        ;TONE E/D CODE FLAG
0003         101 EMPT      EQU     3        ;CH. MEMORY EMPTY = 0; INUSE = 1
0003         102 PEMPT     EQU     3        ;PRIORITY SELECT  =0 NOT; =1 USE
0003         103 CMSK      EQU     3        ;AUTO SCAN MASK BIT
0000         104 KONF      EQU     0        ;KEY ON(HIT) CHECK
0001         105 KSNS      EQU     1        ;KEY HIT/DEPRESS SENCE FLAG
0003         106 SIGN      EQU     3        ;REG. SIGN BIT
0000         107 NMF       EQU     0        ;NUMBER KEY HIT INDICATOR
0001         108 SOF       EQU     1        ;SQUELTI TURN OFF FLAG
0000         109 ET        EQU     0        ;
0003         110 ZSP       EQU     3        ;ZERO SUPPRESS FLAG
0002         111 CDF       EQU     2        ;CH. DATA DISPLAY FLAG
0003         112 MAXROM    EQU     3        ;TABLE END CODE
0002         113 FSTC      EQU     2        ;TX/RX CHECK FLAG
             114 ; CONTROL CONSTANT TABLE
0000         115 ID        EQU     0        ;SYSTEM IDEL MODE
0001         116 MWM       EQU     1        ;(F0) ... MEMORY PROGRAM MODE
0002         117 REC       EQU     2        ;     ... MEMORY READ OUT MODE
0003         118 REV       EQU     3        ;(F3) ... SCAN CH. REVIUW
0001         119 TXN1      EQU     1        ;(F0) ... TX DISPLAY UPER HALF
0002         120 TXN2      EQU     2        ;     ...              LOWER HALF
0005         121 TON1      EQU     5        ;     ... TONE DATA DISPLAY MODE
0001         122 RE1       EQU     1        ;
0002         123 RE2       EQU     2        ;
0003         124 RE3       EQU     3        ;
0004         125 RE4       EQU     4        ;
0005         126 RE5       EQU     5        ;
0006         127 RE6       EQU     6        ;RECALL DATA ; END CODE
0004         128 DL        EQU     4        ;
0005         129 PR        EQU     5        ;
0001         130 TM        EQU     1        ;TONE/TX.RX DATA READ MODE
0008         131 TDR       EQU     8        ;TRANSFER COMAND TO CPU #2
0009         132 TRCH      EQU     9        ;TRANSFER CH. DATA TO CPU #2
             133 ; KEY DECODE DATA TABLE
000A         134 ENT       EQU     10       ;ENTER KEY COMAND DATA
000C         135 MWK       EQU     12       ;MEMORY WRITE KEY
000F         136 REK       EQU     15       ;MEMORY DATA VERIFY KEY
000B         137 DLTK      EQU     11       ;DELAT KEY
000D         138 TXK       EQU     13       ;TX DATA INPUT KEY
             139 ;--------
             140 ; RAM ADDR TABLE
             141 ;--------
0000         142 PAG0      EQU     0        ;PAGE ADR ZERO SET
0000         143 STNL      EQU     0        ;CTL STATE CODE (L)
0001         144 STNH      EQU     1        ;CTL STATE CODE (H)
0002         145 WK1       EQU     2        ;WORKING REG. #1
0003         146 WK2       EQU     3        ;WORKING REG. #2
0004         147 HG2       EQU     4        ;H-REG. TEMP
0005         148 LG2       EQU     5        ;L-REG. TEMP
0006         149 WK3       EQU     6        ;WORKING REG. #3
0007         150 DRS       EQU     7        ;SYSTEM CONTROL FLAGS #1
0008         151 SY4       EQU     8        ;SYSTEM CONTROL FLAGS #2
0009         152 SY1       EQU     9        ;SYSTEM CONTROL FLAGS #3
000A         153 SY2       EQU     H'A      ;SYSTEM CONTROL FLAGS #4
000B         154 SY3       EQU     H'B      ;SYSTEM CONTROL FLAGS #5
000C         155 HG1       EQU     H'C      ;INTERRUPTION REGS TOL
000D         156 LG1       EQU     H'D      ; & IT LOWER ORDER
000E         157 SY5       EQU     H'E      ;SYSTEM CONTROL FLAGS #6
000F         158 IC        EQU     H'F      ;SIO BUFR COUNTER
             159 ;--------
             160 ; RAM PAGE #1
             161 ;--------
0001         162 PAG1      EQU     1        ;PAGE ADR #1 SET
0010         163 D0        EQU     H'10     ;DATA I/O BUFR #1
0011         164 D1        EQU     H'11     ; #2
0012         165 D2        EQU     H'12     ; #3
0013         166 D3        EQU     H'13     ; #4
0015         167 SBF       EQU     H'15     ;SIO BUFR REGISTERS
001A         168 OLD       EQU     H'1A     ;CHANNEL OLD DATA TEMP
```

```
001C           169 AREG      EQU    H'1C      ;CALCULATION REG. (A)
               170 ;----------
               171 ; RAM PAGE #2
               172 ;----------
0002           173 PAG2      EQU    2         ;PAGE ADR #2 SET
0020           174 RXME      EQU    H'20      ;RX EVEN MEMORY AREA
0024           175 RXMO      EQU    H'24      ;RX ODD  MEMORY AREA
0028           176 TXME      EQU    H'28      ;TX EVEN MEMORY AREA
002C           177 TXMO      EQU    H'2C      ;TX ODD  MEMORY AREA
               178 ;----------
               179 ; RAM PAGE #3
               180 ;----------
0003           181 PAG3      EQU    3         ;PAGE ADR #3 SET
               182 ;----------
               183 ; RAM PAGE #4
               184 ;----------
0004           185 PAG4      EQU    4         ;PAGE ADR #4 SET
               186 ;----------
               187 ; RAM PAGE #5
               188 ;----------
0005           189 PAG5      EQU    5         ;PAGE ADR #5 SET
               190 ;----------
               191 ; RAM PAGE #6
               192 ;----------
0006           193 PAG6      EQU    6         ;PAGE ADR #6 SET
               194 ;----------
               195 ; RAM PAGE #7
               196 ;----------
0007           197 PAG7      EQU    7         ;PAGE ADR #7 SET
0070           198 KD        EQU    H'70      ;KEY READER BUFR
0074           199 KNEW      EQU    H'74      ;NEW KEY DATA TEMP
0075           200 AR        EQU    H'75      ;INTERRUPTION ACC SAVE TEMP
0076           201 KFLG      EQU    H'76      ;KEY CONTROL FLAGS
0077           202 DIG       EQU    H'77      ;DIGIT TEMP
0078           203 PRI       EQU    H'78      ;PRIORITY CHANNEL DATA TEMP
007A           204 CH        EQU    H'7A      ;RECIVER CHANNEL TEMP
007C           205 XREG      EQU    H'7C      ;CALCULATION REG. (X)
               206 ;----------
               207 ; RAM PAGE #8
               208 ;       (PAGE #12)
               209 ;----------
000C           210 PAG8      EQU    12        ;PAGE ADR #8 SET
000C           211 PAG12     EQU    12        ;PAGE ADR #12 SET
00C0           212 SEG0      EQU    H'C0      ;SEGMENT #0
00C1           213 SEG1      EQU    H'C1      ;#1
00C2           214 SEG2      EQU    H'C2      ;#2
00C3           215 SEG3      EQU    H'C3      ;#3
00C4           216 SEG4      EQU    H'C4      ;#4
00C5           217 SEG5      EQU    H'C5      ;#5
00C6           218 SEG6      EQU    H'C6      ;#6
00C7           219 SEG7      EQU    H'C7      ;#7
00C8           220 SEG8      EQU    H'C8      ;#8
00C9           221 SEG9      EQU    H'C9      ;#9
00CA           222 SEG10     EQU    H'CA      ;#10
00CB           223 SEG11     EQU    H'CB      ;#11
00CC           224 SEG12     EQU    H'CC      ;#12
00CD           225 SEG13     EQU    H'CD      ;#13
00CE           226 SEG14     EQU    H'CE      ;#14
00CF           227 SEG15     EQU    H'CF      ;#15
               228 ;----------
               229 ; RAM PAGE #9
               230 ;       (PAGE #13)
               231 ;----------
000D           232 PAG9      EQU    13        ;PAGE ADR #9 SET
000D           233 PAG13     EQU    13        ;PAGE ADR #13 SET
00D0           234 SEG16     EQU    H'D0      ;SEGMENT #16
00D1           235 SEG17     EQU    H'D1      ;#17
00D2           236 SEG18     EQU    H'D2      ;#18
00D3           237 SEG19     EQU    H'D3      ;#19
00D4           238 SEG20     EQU    H'D4      ;#20
               239 ;----------
```

```
              240 ; RAM PAGE #10
              241 ;         (PAGE #14)
              242 ;----------
000E          243 PAG10    EQU    14        ;PAGE ADR #10 SET
000E          244 PAG14    EQU    14        ;PAGE ADR #14 SET
              245 ;----------
              246 ; RAM PAGE #11
              247 ;         (PAGE #15)
              248 ;----------
000F          249 PAG11    EQU    15        ;PAGE ADR #11 SET
000F          250 PAG15    EQU    15        ;PAGE ADR #15 SET
00F4          251 TC1      EQU    H'F4      ;TIMER COUNTER #1
00F7          252 KTN1     EQU    H'F7      ;KEY TONE TIMER COUNTER (H)
00F8          253 TC2      EQU    H'F8      ;TIMER COUNTER #2
00FB          254 KTN2     EQU    H'FB      ;KEY TONE TIMER COUNTER (L)
00FC          255 RTBP     EQU    H'FC      ;ROM DATA ADR POINTER
00FF          256 SSP      EQU    H'FF      ;SUBROUTINE STACK POINTER

ROM PAGE NO. 0

0000          257         ORG    H'0
              258 ;----------
              259 ; INTERRUPTION JUMP VECTOR
              260 ;----------
0000 64AE     261         B      INIZ       ;POWER ON INITIALIZE
0002 6333     262         B      INT1       ;INTERRUPTION #1
0004 6338     263         B      ISO        ;SERIAL DATA TRANSFER BUFR EMPTY
0006 6358     264         B      HTC1       ;TIMER COUNTER #1
0008 636D     265         B      HTC2       ;TIMER COUNTER #2
000A 63FD     266         B      TIMR          ;INTERVAL TIMER INTERRUPTION
000C 645F     267         B      INT2          ;INTERRPTION #2 (TX REQUEST COMAND

268 ;----------
              269 ; SAVE/RESTORE ALL REGISTERS
              270 ;----------
000E          271 SV:
000E 3D75     272 RS:      XCH    A,AR
0010 290C     273          XCH    HL,HG1
0012 2A       274          RET
              275 ; TIMER SET/RETURN
0013 F4       276 SET3SL:  ST     #4,@HL+    ;SET DATA
0014 FA       277          ST     #10,@HL+   ;AND SET LAST DATA
0015 2A       278          RET               ;RETURN

ROM PAGE NO. 0

0016          279         ORG    H'16
              280 ;----------
              281 ; PAUSE TC1
              282 ;----------
0016 40       283 P1:      LD     A,#0       ;CLEAR ACC
0017 3A8C     284          OUT    A,%TC1C
0019 2A       285          RET
              286 ;----------
              287 ; 3 SEC TIMER SET SUBROUTINE
              288 ;----------
001A C1       289 SET3S:   LD     H,#PAG1    ;GET PAGE ADR
001B E2       290          LD     L,#D2      ;GET TEMP ADR
001C F7       291          ST     #7,@HL+    ;SET 1ST DIGIT
001D 93       292          B      SET3SL     ;AND SET NEXT DIGIT

ROM PAGE NO. 0

001E          293         ORG    H'1E
              294 ;----------
              295 ; PAUSE TC2
              296 ;----------
001E 40       297 P2:      LD     A,#0
001F 3A8D     298          OUT    A,%TC2C
0021 2A       299          RET
              300 ;
              301 ;----------
```

```
                    302 ; AD SET PAGE ADDR
0022 C7             303 AD1:    LD      H,#PAG7          ;GET PAGE ADR
0023 15             304         ADDC    A,aHL            ;ADD TO REG.
0024 C1             305         LD      H,#PAG1          ;GET DESTINATION ADDR
0025 AB             306         BSS     A1               ;(N) DIGIT SAVE
                    307                                  ;AND ADD NEXT
                    308                                  ;AND RETURN
0026                309

ROM PAGE NO. 0

0026                310         ORG     H'26
                    311 ;--------
                    312 ; ADDITION FOR DOUBLE
                    313 ;--------
0026 06             314 AD:     TEST    CF               ;RESET CARY
0027 EC             315         LD      L,#XREG          ;GET REG. ADDR
0028 C1             316 AD2:    LD      H,#PAG1          ;GET PAGE ADDR PTR
0029 0C             317         LD      A,aHL            ;GET SOURCE DATA
002A A2             318         B       AD1              ;ADD CALCULATION
002B 1A             319 A1:     ST      A,aHL+           ;AND SAVE DATA /CHECK IF END?
002C A3             320         B       AD2              ;NO .. MORE
002D 2A             321         RET
                    322 ;

ROM PAGE NO. 0

002E                323         ORG     H'2E
                    324 ;--------
                    325 ; SUBTRACTION FOR DOUBLE
                    326 ;--------
002E EC             327 SB:     LD      L,#XREG          ;GET X-REG ADDR
002F C7             328 A2:     LD      H,#PAG7          ;GET PAGE ADR
0030 0C             329         LD      A,aHL            ;GET X-REG DATA
0031 C1             330         LD      H,#PAG1          ;CHANGE PAGE ADR TO A-REG.
0032 14             331         SUBRC   A,aHL            ;A - X = A
0033 1A             332         ST      A,aHL+           ;AND SAVE RSLT
0034 AF             333         B       A2               ;LOOP TILL 4-TIMES
0035 2A             334         RET                      ;RETURN
                    335 ;

ROM PAGE NO. 0

0036                336         ORG     H'36
                    337 ;--------
                    338 ; SHIFT AC AND SWAP CHEANGE
                    339 ;--------
0036 05             340 AHR:    ROLC    A
0037 30             341         XCH     A,H
0038 2A             342         RET
                    343 ;
                    344 ;--------
                    345 ; CLC - CLEAR CHANNEL DISPLAY MEMORY
                    346 ;--------
0039 C7             347 CLC:    LD      H,#PAG7          ;GET PAGE ADR
003A EA             348         LD      L,#CH_TEMP_ADR   ;GET CH. TEMP ADR
003B F0             349         ST      #0,aHL+          ;CLEAR LCD
003C F0             350         ST      #0,aHL+          ;CLEAR 2ND DIGIT
003D 2A             351         RET                      ;AND ALL DONE/RETURN
                    352 ;

ROM PAGE NO. 0

003E                353         ORG     H'3E
                    354 ;--------
                    355 ; ADDITION AND STORE INCRS. LR
                    356 ;--------
003E 15             357 ASI:    ADDC    A,aHL
003F 0F             358         ST      A,aHL

ROM PAGE NO. 1
```

```
0040 18         359              INC    L
0041 2A         360              RET
                361 ;
                362 ;------------
                363 ; TX INDICATOR TURN ON PGM
                364 ;------------
0042 CD         365 DSTX:        LD     H,#PAG9      ;GET PAGE ADR
0043 E1         366              LD     L,#SEG17     ;GET SEGMENT ADR
0044 8C         367              B      DSRTX        ;DONE
                368 ;

ROM PAGE NO. 1

0046            369              ORG    H'46
                370 ;--------
                371 ; TEST SCAN FLAG
                372 ;     SF = 1 NOT
                373 ;        = 0 AS MODE
                374 ;--------
0046 CD         375 TAS:         LD     H,#PAG9      ;GET PAGE ADDR
0047 E2         376              LD     L,#SEG18     ;GET FLAG ADDR POINTER
0048 58         377              TEST   @HL,SCAN
0049 2A         378              RET
                379 ;
                380 ;------------
                381 ; RX INDICATOR TURN ON PGM
                382 ;------------
004A CC         383 DSRX:        LD     H,#PAG8      ;GET PAGE ADR
004B EF         384              LD     L,#SEG15     ;GET SEGMENT ADR
004C 50         385 DSRTX:       SET    @HL,SRX      ;DISPLAY RX IND.
004D 2A         386              RET                 ;DONE/RETURN
                387 ;

ROM PAGE NO. 1

004E            388              ORG    H'4E
                389 ;
                390 ; TEST PRIORITY FLAG
                391 ;     SF = 1 NOT
                392 ;        = 0 PR MODE
                393 ;--------
004E CD         394 TPR:         LD     H,#PAG9
004F E3         395              LD     L,#SEG19
0050 58         396              TEST   @HL,SPRI
0051 2A         397              RET
                398 ;
                399 ;------------
                400 ; KEY ALL DEPRESS TEST PGM
                401 ;     SF = 0;ALL ZERO RETURN
                402 ;     SF = 1;ERROR RETURN
                403 ;------------
0052 C7         404 KAZ:         LD     H,#PAG7      ;GET PAGE ADR
0053 E0         405              LD     L,#KD        ;SET KEY DATA TABLE ADR
0054 96         406              B      TAZ          ;ALL DONE
                407 ;

ROM PAGE NO. 1

0056            408              ORG    H'56
                409 ;--------
                410 ; TEST 4 WORD ALL ZERO
                411 ;--------
0056 0C         412 TAZ:         LD     A,@HL        ;GET DATA
0057 18         413              INC    L
0058 1D         414 TAZ1:        OR     A,@HL        ;SET SF CODE
0059 18         415              INC    L
005A 1D         416              OR     A,@HL
005B 18         417              INC    L
005C 1D         418              OR     A,@HL        ;SET C.C FLAG
005D 2A         419              RET                 ;RETURN
                420 ;--------
                421 ; SF = 0 ALL ZERO
```

```
                    422 ; SF = 1
                    423 ;--------
                    424 ;

ROM PAGE NO. 1

005E                425           ORG    H'5E
                    426 ;--------
                    427 ; CLEAR A-REG
                    428 ;--------
005E  C7            429 CLX:      LD     H,#PAG7
005F  A7            430           BSS    CL              ;SET/CLEAR MEMORY
                    431 ;
                    432 ;----------
                    433 ; ERROR INFOMATION DISPLAY SUBROUTINE
                    434 ;----------
0060  4C            435 ERR:      LD     A,#H'C          ;GET CHAR "E"
0061  C7            436 ERRDS:    LD     H,#PAG7         ;GET PAGE ADR
0062  EB            437           LD     L,#CH+1         ;GET TEMP ADDR
0063  1B            438           ST     A,aHL-          ;AND SET CHAR
0064  FD            439           ST     #H'D,aHL+       ;AND SET CHAR "R"
0065  BC            440           B      LDDSP           ;JUMP LIKER SET
                    441 ;

ROM PAGE NO. 1

0066                442           ORG    H'66
                    443 ;--------
                    444 ; CLEAR A-REG
                    445 ;--------
0066  C1            446 CLA:      LD     H,#PAG1
0067  C0            447           NOP
0068  EC            448 CL:       LD     L,#AREG
0069  F0            449           ST     #0,aHL+
006A  F0            450           ST     #0,aHL+
006B  F0            451           ST     #0,aHL+
006C  F0            452           ST     #0,aHL+         ;CLEAR MEM
006D  2A            453           RET
                    454 ;

ROM PAGE NO. 1

006E                455           ORG    H'6E
                    456 ;--------
                    457 ; ADDR SELECTOR
                    458 ; TX ADDR SET
                    459 ;--------
006E  11            460 ATX:      MOV    L,A             ;GET ADR POINTER
006F  EC            461           LD     L,#TXMO         ;PRE SET ODD ADR
0070  D3            462           CMPR   A,#3            ;TEST IF EVEN ADDR
0071  B3            463           B      A3              ;ADR IS ODD
0072  E8            464           LD     L,#TXME         ;ADR IS EVEN
0073  2A            465 A3:       RET                    ;AND SET.
                    466 ;

ROM PAGE NO. 1

0076                467           ORG    H'76
                    468 ;--------
                    469 ; TEST IF PRIORITY CH. SET???
                    470 ;--------
0076  C7            471 TPO:      LD     H,#PAG7
0077  E9            472           LD     L,#PRI+1
0078  5B            473           TEST   aHL,PEMPT
0079  2A            474           RET
                    475 ; SF =0  MEM EMPTY
                    476 ; SF =1  MEM IN-USE
                    477 ;
                    478 ;----------
                    479 ; DISPLAY INFOMATION FOR
                    480 ;          SYSTEM INTO PROGRAM MODE
                    481 ;----------
```

```
007A 4A      492 PL:      LD    A,#H'A          ;GET CODE "P"
007B A1      493          B     ERRDS           ;AND USE COMMON ROUTINE
             494 ; JUMP ADDR LIKER POINTER
007C 6143    495 LDDSP:   BS    DDSP            ;GO TO DISPLAY ROUTINE
             486 ;
```

ROM PAGE NO. 1

```
007E         487          ORG   H'7E
             488 ;----------
             489 ; END OF (S) FORMAT CALL
             490 ;--------
             491 ;----------
             492 ; TRANSFER A-REG. TO X-REG.
             493 ;----------
007E EC      494 TAX:     LD    L,#AREG         ;GET WORD ADDR
007F C1      495 A4:      LD    H,#PAG1         ;GET PAGE ADDR POINTER
```

ROM PAGE NO. 2

```
0080 0C      496          LD    A,@HL           ;GET A DIGIT DATA
0081 C7      497          LD    H,#PAG7         ;GET X-REG,ADDR
0082 1A      498          ST    A,@HL+          ;AND SAVE IT
0083 607F    499          B     A4              ;LOOP TILL 4-TIMES
0085 2A      500          RET                   ;RETURN
             501 ;
```

ROM PAGE NO. 2

```
0086         502          ORG   H'86
             503 ;----------
             504 ; A-REG . SHIFT 1 BIT
             505 ;----------
0086 C1      506 RLA:     LD    H,#PAG1         ;GET PAGE ADDR PTR
0087 EC      507          LD    L,#AREG         ;GET ADDR OF A-REG
0088 06      508          TEST  CF              ;RESET CARRY
0089 0C      509 A5:      LD    A,@HL           ;GET DATA
008A 05      510          ROLC  A               ;SHIFT 1BIT
008B 1A      511          ST    A,@HL+          ;AND SAVE IT.
008C 89      512          B     A5              ;LOOP
008D 2A      513          RET                   ;RETURN
             514 ;
             515 ;----------
             516 ; RKBD .. KEY-BOARD DATA READ MODULU
             517 ;         SF = 0 .. READ AND INPUT DATA
             518 ;         SF = 1 .. NO KEY
             519 ;----------
             520 ; KEY SENCE FLAG TURN ON
008E F7      521 RK30:    ST    #B'0111,@HL+    ;PRESET FLAG
008F 2A      522          RET                   ;RETURN
             523 ;----------
             524 ; READ KEY DATA
0090 00      525 RKBD:    NOP                   ;SUBROUTINE(RKBD)
0091 C7      526          LD    H,#PAG7         ;GET PAGE ADR
0092 E6      527          LD    L,#KFLG
0093 53      528          TEST  @HL,KONF
0094 60EF    529          B     KOF
             530 ; TEST THE KEY PRESED
0096 2052    531          CALL  KAZ
0098 9C      532          B     KON             ;CHECK THE KEY HIT
0099 E6      533 RKER2:   LD    L,#KFLG         ;GET KEY CONTROL FLAG REG. ADDR
009A F1      534          ST    #B'0001,@HL+    ;AND RESET
009B 2A      535          RET                   ;RETURN
             536 ; PRESSED KEY
009C E3      537 KON:     LD    L,#KD+3         ;GET KEY TABLE ADR
009D 26F2    538          ST    #-1,WK1         ;SET ERROR COUNTER
009F 0C      539 KHZ1:    LD    A,@HL           ;GET COLUMN KEY DATA
00A0 0E      540          TESTP ZF              ;KEY = 0?
00A1 A3      541          B     KHZ2            ;YES..CHECK NEXT
00A2 11      542          MOV   L,A             ;SAVE KEY COLMN DATA
00A3 3F03    543          ST    A,WK2           ;AND TO MEMORY
```

```
00A5 2F12      544           ADD     WK1,#1          ;COUNT ERROR FIND?
00A7 B3        545           B       RKERR           ;YES..KEY ERROR OPERATION
               546 ; CHECK THE NEXT COLUMN LINE
00A8 19        547 KHZ2:     DEC     L               ;SET NEXT AND TEST IF DONE?
00A9 9F        548           B       KHZ1            ;NO
00AA 3C03      549           LD      A,WK2
00AC 31        550           XCH     A,L
00AD 0C        551           LD      A,@HL
00AE 06        552           TEST    CF              ;RESET CARRY
00AF 05        553 A6:       ROLC    A               ;AC - MSB TO CARRY; C = 1?
00B0 AF        554           B       A6              ;NO
00B1 0E        555           TESTP   ZF              ;YES..CHECK THE AC = 0?
00B2 B6        556           B       RK10            ;     YES
               557 ; KEY-BOARD ERROR OPERATION
00B3 E6        558 RKERR:    LD      L,#KFLG         ;NO..RESET KEY FLAG
00B4 F0        559           ST      #0,@HL+         ;AND SAVE
00B5 2A        560           RET                     ;RETURN
               561 ; SET KEY SENCE ON
00B6 E6        562 RK10:     LD      L,#KFLG         ;GET ADR OF KEY CONTROL FLAGS
00B7 59        563           TEST    @HL,KSNS        ;KEY SENCE ON?
00B8 8E        564           B       RK30            ;NO..SET KEY CTL FLAG
               565 ; CHECK KEY DONE ???
00B9 0C        566           LD      A,@HL           ;YES
00BA 380C      567           ADD     A,#B'1100       ;SENCE DONE?
00BC BE        568           B       KCDC            ;READ SET KEY DATA
00BD 2A        569           RET                     ;NO
               570 ; KEY COMAND DECODE
00BE 3B24      571 KCDC:     SET     %R4,PEE         ;YES..SET PEE TONE GATE

ROM PAGE NO. 3

00C0 F0        572           ST      #0,@HL+         ;RESET KEY SENCE FLAG
00C1 3C03      573           LD      A,WK2           ;GET CLOMUN COUNTER
00C3 31        574           XCH     A,L             ;AND IT TO LR.
00C4 11        575           MOV     L,A             ;GET COLUMN DATA
00C5 06        576           TEST    CF              ;RESET CARRY
00C6 05        577           ROLC    A               ;ACC X 2
00C7 05        578           ROLC    A               ;ACC X 4
00C8 3F03      579           ST      A,WK2           ;AND SAVE CLOUMN DATA
00CA 0C        580           LD      A,@HL
00CB 07        581 RK20:     RORC    A               ;FIND KEY-CODE?
00CC AC        582           B       RK50            ;NO..CHECK NEXT DIGIT
00CD 3C03      583           LD      A,WK2           ;GET KEY DATA
00CF 06        584           TEST    CF              ;RESET CARRY
00D0 07        585           RORC    A               ;HALF WD ADDR TO WD ADDR
               586                                   ;AND SAVE IT
00D1 CF        587           LD      H,#PAG15        ;GET PAGE ADR
00D2 EC        588           LD      L,#RTBP         ;GET X-REG ADDR
00D3 F0        589           ST      #0,@HL+         ;AND SET LSD ADDR PTR
00D4 FE        590           ST      #14,@HL+        ;2ND DIGIT
00D5 F7        591           ST      #07,@HL+        ;3RD DIGIT
00D6 EC        592           LD      L,#RTBP         ;AND SET ROM ADDR PTR
00D7 2291      593           CALL    MADDS           ;SET ADR SUBROUTINE
00D9 33        594           LDL     A,@DC           ;GET RIGHT HALF BYTE DATA
00DA 3983      595           TEST    WK2,0           ;TEST IF LEFT HALF BYTE?
00DC 9E        596           B       A7              ;NO
00DD 32        597           LDH     A,@DC+          ;YES
00DE 3F74      598 A7:       ST      A,KNEW          ;AND SET NEW KEY DATA
00E0 CF        599           LD      H,#PAG15        ;GET PAGE ADR
00E1 E4        600           LD      L,#TC1          ;GET TIMER COUNTER ADDR
00E2 F0        601           ST      #00,@HL+        ;SET LSD
00E3 F8        602           ST      #08,@HL+        ;SET OSD
00E4 FE        603           ST      #14,@HL+        ;SET MSD
00E5 216F      604           CALL    T2XX            ;AND COUNT 50(MS)
00E7 40        605           LD      A,#0
00E8 3F76      606           ST      A,KFLG
00EA 09        607           DEC     A               ;SET KEY ON (SF)
00EB 2A        608           RET
               609 ;-------COUNT CLOUMN DATA # AND CHECK NEXT
```

```
00EC 2F13      610 RK50:   ADD    WK2,#1          ;SET COUNT DIGIT #
00EE 8B        611         B      RK20            ;AND CHECK NEXT CLOUMN DATA
               612 ;--------
               613 ; KEY OFF SENCE
00EF 2052      614 KOF:    CALL   KAZ
00F1 60B3      615         B      RKERR           ;KEY STELL ON
00F3 E6        616         LD     L,#KFLG
00F4 59        617         TEST   @HL,KSNS        ;KEY SENCE ON?
00F5 BC        618         B      RK40            ;NO
00F6 0C        619         LD     A,@HL           ;YES
00F7 380C      620         ADD    A,#B'1100       ;KEY DONE?
00F9 6099      621         B      RKER2           ;YES
00FB 2A        622         RET                    ;NO
               623 ; SET KEY-SENCE FLAG
00FC E6        624 RK40:   LD     L,#KFLG
00FD F6        625         ST     #B'0110,@HL+    ;SET NEW KEY OFF COUNTER
00FE 2A        626         RET
               627 ;
               628 ;--------
               629 ; STORE A-REG
               630 ;   H.LR    ;SET DESTINATION ADDR
               631 ;   H.LG2   ;SET SOURCE ADDR PTR
               632 ;--------
00FF 2904      633 STA:    XCH    HL,HG2          ;SAVE DESTINATION ADDR

ROM PAGE NO. 4 *

0101 C1        634         LD     H,#PAG1         ;GET PAGE ADDR PTR
0102 EC        635         LD     L,#AREG         ;GET SOURCE ADDR PTR
0103 8A        636         B      MOVE            ;AND TRANSFER DATA
               637 ;
               638 ;--------
               639 ; LOAD A-REG
               640 ;   H.LR;  SOURCE ADDR
               641 ;   HG2.LG2; DESTINATION.ADDR
               642 ;--------
0104 2904      643 LDA:    XCH    HL,HG2          ;SAVE SOURCE ADDR
0106 C1        644         LD     H,#PAG1         ;GET PAGE ADDR
0107 EC        645         LD     L,#AREG         ;GET DESTINATION ADDR
0108 2904      646         XCH    HL,HG2          ;AND SET SOURCE/DESTINATION ADDR
               647 ;
               648 ;--------
               649 ; MOVE    - MOVE DATA(H.LR) FROM MEM(HG2.LG2)
               650 ;           H.LR....SOURCE REG.
               651 ;           H.LG2...DESTINATION ADR
               652 ;--------
010A 2DC2      653 MOVE:   ST     #-4,WK1         ;GET TRANSFER COUNTER
010C 0C        654 MV1:    LD     A,@HL           ;GET DATA
010D 18        655         INC    L               ;SET NEXT SOURCE ADR
010E 2904      656         XCH    HL,HG2          ;SAVE AND GET DESTINATION ADR
0110 1A        657         ST     A,@HL+          ;SAVE DATA
0111 2904      658         XCH    HL,HG2          ;GET SOURCE ADR
0113 2F12      659         ADD    WK1,#1          ;COUNT #OF DATA
0115 8C        660         B      MV1             ;LOOP TILL 4-TIMES
0116 2A        661         RET                    ;RETURN
               662 ;
               663 ;--------
               664 ; RX MEMORY ADDR SET
               665 ;        AND TEST IF OCP ???
               666 ;        SF = 0 ; MEMORY INUSED
               667 ;        SF = 1 ; MEMORY EMPTY
               668 ;--------
0117 C7        669 MRT:    LD     H,#PAG7
0118 EA        670         LD     L,#CH           ;GET CH. TEMP ADR
0119 3BD5      671         TESTP  %R5,DF          ;TEST IF PGM MODE?
011B A0        672         B      MRT3            ;YES
011C 3990      673         TEST   STNL,PIR        ;TEST IF PRIORITY CHECK?
011E A0        674         B      MRT3            ;NO
011F E8        675         LD     L,#PRI          ;YES..GET PRIORITY CH. TEMP ADR
```

```
0120 0C        676 MRT3:    LD    A,@HL         ;GET RECIVER CH. DATA
0121 06        677 MRT1:    TEST  CF            ;RESET CARRY
0122 07        678         RORC  A             ;AC X 2 /SET CARRY
0123 30        679         XCH   A,H           ;SET PAGE ADDR
0124 E3        680         LD    L,#RXME+3     ;SET EVEN ADR
0125 06        681         TEST  CF            ;TEST IF ODD NUMBER?
0126 A8        682         B     MRT2          ;NO
0127 E7        683         LD    L,#RXMO+3     ;YES..SET
0128 38C2      684 MRT2:   ADD   H,#2          ;ADDR OFFSET LOCATION
012A 5B        685         TEST  @HL,EMPT      ;SET C.C
012B 2A        686         RET                 ;AND RETURN
               687 ;
               688 ;--------
               689 ; TRANSFER THE DATA TO SUB CPU
               690 ;    TRIGGER MODULE
               691 ;--------
012C 3874      692 TRN:    CLR   %R4,DTR
012E 38B8      693 TRNZ:   TEST  %R8,BUSY
0130 AE        694         B     TRNZ
0131 3834      695         SET   %R4,DTR
0133 2A        696         RET
               697 ;
               698 ;--------
               699 ; ABLNK  NUMBER DISPLAY ALL CLEAR
               700 ;--------
0134 CC        701 ABLNK:  LD    H,#PAG8       ;GET PAGE ADDR PTR
0135 EF        702         LD    L,#SEG15      ;GET SEGMENT POINTER
0136 54        703 A8:     CLR   @HL,0         ;AND CLEAR IT.
0137 19        704         DEC   L
0138 B6        705         B     A8            ;LOOP TILL ALL CLEARED
0139 CD        706         LD    H,#PAG9       ;GET PAGE ADDR
013A E3        707         LD    L,#SEG19      ;GET SEGMENT TABLE ADDR
013B 54        708 A9:     CLR   @HL,0         ;CLEAR SEGMENT
013C 19        709         DEC   L             ;DECRS LR AND TEST IF END?
013D B6        710         B     A9            ;NO..LOOP TILL LP = 0
013E 2A        711         RET                 ;YES.. RETURN
               712 ;
               713 ;--------
               714 ; CHANNEL DATA DISPLAY SUBROUTINE
               715 ;--------
013F 3928      716 CDSP:   SET   SY4,CDF       ;SET FLAG
               717 ;--------
               718 ; NORMAL CH. DISPLAY SUBROUTINE
               719 ;    (ZERO SUPPRESS MODE)
               720 ;--------

ROM PAGE NO. 5 *

0141 3938      721 ZDSP:   SET   SY4,ZSP       ;SET FLAG
               722 ;
               723 ; NORMAL DATA DISPLAY SUBROUTINE
               724 ;--------
0143 3C7A      725 DDSP:   LD    A,CH          ;GET CH. DATA
0145 39A8      726         TEST  SY4,CDF       ;TEST IF CH. DISPLAY MODE?
0147 99        727         B     CDS0          ;NO
0148 C7        728         LD    H,#PAG7       ;YES..GET PAGE ADR
0149 38D5      729         TESTP %R5,DF        ;TEST IF F(2)?
014B 93        730         B     CDSX          ;YES
014C 39A0      731         TEST  STNL,DPIR     ;TEST IF PRIORITY?
014E 93        732         B     CDSX          ;NO
014F E8        733         LD    L,#PRI        ;GET PRIORITY ADR
0150 0C        734         LD    A,@HL         ;AND GET CH. DATA
0151 13        735         INC   L             ;AND IT NEXT ADR
0152 94        736         B     CDX1          ;DONE
               737 ; SET ADDR NORMAL CH.
0153 EB        738 CDSX:   LD    L,#CH+1       ;GET CH. DATA TEMP ADDR
               739 ;CHECK THE DATA FOR CHANNEL
0154 D0        740 CDX1:   CMPR  A,#0          ;TEST IF ACC.= 0?
0155 98        741         B     CDX           ;NO
0156 F1        742         ST    #1,@HL+       ;YES..SET MSD = 1
0157 99        743         B     CDS0          ;DONE
```

```
                744 ; NOT CH. # 10 SET
0158 F0         745 CDX:    ST    #0,@HL+        ;CLEAR MSD
                746 ; DISPLAY 1ST DIGIT
0159 E6         747 CDS0:   LD    L,#SEG6        ;GET DISPLAY PANEL ADDR
015A 2177       748         CALL  DRC            ;AND DECODE DATA
015C 3C7B       749         LD    A,CH+1         ;GET CH. DATA
015E 39E8       750         TESTP SY4,CDF        ;TEST IF CHANNEL DATA MODE
0160 A5         751         B     CDS3           ;YES
                752 ; CHECK THE DATA MODE
0161 39E8       753         TEST  SY4,ZSP        ;ZERO SUPPRESS?
0163 B2         754         B     CDS2           ;NO
0164 AF         755         B     CDS1           ;YES
                756 ; DISPLAY CH. DATA
0165 3ED5       757 CDS3:   TESTP %R5,DF         ;MODE F(2)?
0167 AF         758         B     CDS1           ;YES
0168 39A0       759         TEST  STNL,DPIR      ;PRIORITY DISPLAY?
016A AF         760         B     CDS1           ;NO
016B C7         761         LD    H,#PAG7        ;GET PAGE ADR
016C E9         762         LD    L,#PRI+1       ;GET PRIORYTY CH. TEMP ADR
016D 0C         763         LD    A,@HL          ;GET DATA
016E 53         764         SET   @HL,PEMPT      ;SET PRIORITY INUSE FLAG
                765 ;ZERO SUPPRESS CONTROL
016F D0         766 CDS1:   CMPR  A,#0           ;TEST IF ACC = 0?
0170 B2         767         B     CDS2           ;NO
0171 4F         768         LD    A,#H'F         ;YES..SET BLANK DATA
                769 ; DISPLAY 2ND DIGIT
0172 ED         770 CDS2:   LD    L,#SEG13       ;GET SEGMENT TABLE ADDR
0173 3968       771         CLR   SY4,CDF        ;CLEAR CH. DATA INDICATOR
0175 3978       772         CLR   SY4,ZSP        ;CLEAR ZERO SUPPRESS FLAG
                773                              ;AND GO TO DRC PROGRAM
                774 ;
                775 ;--------
                776 ; DECODE ROM CODE
                777 ;--------
0177 3F06       778 DRC:    ST    A,WK3          ;SAVE DIGIT DATA
0179 11         779         MOV   L,A
017A 3F02       780         ST    A,WK1          ;SAVE DIGIT NO
017C CF         781         LD    H,#PAG15       ;GET PAGE ADDR PTR
017D EC         782         LD    L,#RTBP        ;GET TABLE ADDR PTR
017E 3C06       783         LD    A,WK3          ;GET DATA

ROM PAGE NO. 6

0180 F8         784         ST    #H'8,@HL+      ;SET ADDR PTR 1ST
0181 FE         785         ST    #H'E,@HL+      ;SET ADDR PTR 2ND
0182 F7         786         ST    #H'7,@HL+      ;AND SET LAST DIGIT
0183 EC         787         LD    L,#RTBP        ;RENEW ADDR PTR
0184 366F       788         DICLR IL,B'111111
0186 22B1       789         CALL  MADDS          ;GET ADDR DATA
0188 21A8       790         CALL  LAROM          ; GET ROM DATA
018A 219E       791         CALL  SH             ;RESET CARRY
018C 2D93       792         ST    #9,WK2         ;SET # OF SEGMENT
018E 219E       793 DEC1:   CALL  SH             ;RESET CARRY
                794 ; SET THE SEGMENT
0190 CC         795         LD    H,#PAG8
0191 3C02       796         LD    A,WK1
0193 31         797         XCH   A,L
0194 54         798         CLR   @HL,0          ;CLEAR SEGMENT
0195 06         799         TEST  CF             ;AND TEST IF SEGMENT ON?
0196 98         800         B     DEC2           ;NO
0197 50         801         SET   @HL,0          ;YES..SEGMENT ON
0198 2FF2       802 DEC2:   ADD   WK1,#-1        ;DISPLAY REG. DECREMENT
019A 2F13       803         ADD   WK2,#1
019C 8E         804         B     DEC1           ;DISPLAY NEXT SEGMENT
019D 2A         805         RET                  ;RETURN TO FGN
                806 ;
                807 ;--------
                808 ; SHIFT THE LCD SEGMENT DATA
                809 ;--------
019E 06         810 SH:     TEST  CF             ;RESET CARRY
```

```
019F C0        811          LD    H,#PAG0
01A0 E4        812          LD    L,#HG2         ;GET TEMP ADR
01A1 0C        813          LD    A,@HL          ;GET DATA
01A2 05        814          ROLC  A              ;MSB TO CARY
01A3 1A        815          ST    A,@HL+         ;AND SAVE IT
01A4 0C        816          LD    A,@HL          ;GET NEXT DATA
01A5 05        817          ROLC  A              ;SAVE CARY TO LSB/MSB TO CARY
01A6 0F        818          ST    A,@HL          ;SAVE DATA
01A7 2A        819          RET                  ;ALL DONE AND RETURN
               820  ;
               821  ;--------
               822  ; LOAD ROM DATA TO A-REG UPER HALF BYTE
               823  ;--------
01A8 C0        824 LAROM:   LD    H,#PAG0        ;GET PAGE ADDR PTR
01A9 E4        825          LD    L,#HG2         ;GET A-REG HALF WORD ADDR PTR
01AA 33        826 RMR:     LDL   A,@DC          ;GET ROM DATA
01AB 1A        827          ST    A,@HL+         ;SAVE ROM DATA AND INCRS PTR
01AC 32        828          LDH   A,@DC+         ;GET UPER ROM DATA
01AD 1A        829          ST    A,@HL+         ;AND SAVE IT.
01AE 2A        830          RET                  ;RETURN
               831  ;
               832  ;--------
               833  ; FIND SCAN CHANNEL
               834  ;--------
01AF CC        835 FS:      LD    H,#PAG8        ;GET PAGE ADDR PTR
01B0 3C7A      836          LD    A,CH           ;GET CHANNEL POINTER WORD
01B2 31        837          XCH   A,L            ;AND SAVE ACC AND ADDR PTR
01B3 0C        838          LD    A,@HL          ;GET MODE FLAG WORD
01B4 3308      839          ADD   A,#B'1000      ;COMPLEMENT MASK FLAG
01B6 5F        840          TEST  A,CMSK         ;TEST SCAN INHIBIT ?
01B7 2A        841          RET                  ;AND RETURN
               842  ; SF = 0  NOT MASK
               843  ; SF = 1  SCAN MASK
               844  ;
               845  ;--------
               846  ; T200   SET TIMER 200(MS)
               847  ;        2.0(MS) X782 = 200.9(MS)
               848  ;--------
01B8 3919      849 T200:    SET   SY1,T02
01BA CF        850          LD    H,#PAG15
01BB E4        851          LD    L,#TC1
01BC F2        852          ST    #02,@HL+       ;SET LSD
01BD FF        853          ST    #15,@HL+       ;SET 2ND DIGIT
01BE FC        854          ST    #12,@HL+       ;SET MSD TIMER COUNTER
01BF 49        855 T2XX:    LD    A,#B'1000      ;GET COMAND CODE
```

ROM PAGE NO. 7

```
01C0 3A2C      856          OUT   A,%TC1C        ;AND OUTPUT COMAND
01C2 2A        857          RET
               858  ;--------
               859  ; T500   500(MS) TIMER SET MODULE
               860  ;        4.1(MS) X 122 = 500.2(MS)
               861  ;--------
               862  ; 500 (MS) TIMER COUNTER DRIVER
01C3 CF        863 T500:    LD    H,#PAG15
01C4 E8        864          LD    L,#TC2
01C5 F5        865          ST    #05,@HL+
01C6 F3        866          ST    #03,@HL+       ;SET 2ND DIGIT
01C7 FF        867          ST    #15,@HL+       ;SET MSD
01C8 49        868          LD    A,#B'1001      ;SET COMAND
01C9 3A8D      869          OUT   A,%TC2C
01CB 2A        870          RET
               871  ;
               872  ;--------
               873  ; MUTA - AUDIO MUTE OUTPUT SUBROUTINE
               874  ;        MUTING ATACK TIMER COUNT MODULE
               875  ;--------
01CC 36BF      876 MUTA:    DICLR IL,B'111111    ;MASK INTR.
01CE 3B04      877 MUTA1:   SET   %R4,MUTE       ;CLOSE MUTE OUTPUT
01D0 3917      878          SET   DRS,TXRX       ;SIO INUSE FLAG SET
```

```
                879 ;----------
                880 ; COUNT ATACK TIMER
01D2 40         881           LD    A,#0           ;CLEAR ACC
01D3 E0         882           LD    L,#0           ;CLEAR LR
                883 ;
01D4 00         884 LOOP1:    NOP
01D5 00         885           NOP
01D6 08         886           INC   A              ;AC +1 =AC
01D7 94         887           B     LOOP1          ;AC NOT ZERO
01D8 13         888           INC   L              ;LR+1 = LR/ TEST IF ZERO?
01D9 94         889           B     LOOP1          ;NO
                890 ; TIMER DONE
01DA 39C0       891           TESTP STNL,SDN       ;SYSTEM TX MODE
01DC AA         892           B     SLRX           ;NO..RX MODE
01DD 3814       893           SET   %R4,TXI        ;YES..TURN ON TX DRIVER
                894 ;TX MODE
01DF C7         895           LD    H,#PAG7        ;GET PAGE ADR
01E0 EA         896           LD    L,#CH          ;GET CH. ADDR
01E1 39A0       897           TEST  STNL,DPIR      ;PRI. DISPLAY?
01E3 A5         898           B     SLTX           ;NO
01E4 E8         899           LD    L,#PRI         ;YES ..GET DATA
01E5 0C         900 SLTX:     LD    A,@HL          ;GET DATA
01E6 2121       901           CALL  MRT1           ;GET CH. MEMORY ADDR
01E8 7D         902           CALLS ATX            ;SET ADR TO TX LOCATION
01E9 B0         903           B     CFORM          ;DONE
                904 ; RX MODE
01EA 3854       905 SLRX:     CLR   %R4,TXI        ;RESET TX OUTPUT
01EC 2117       906           CALL  MRT            ;GET MEMORY CH. ADDR
01EE 638D       907           ADD   L,#-3          ;SET ADDR
                908 ;
                909 ;--------
                910 ; CFORM  CONVERT DATA FORMAT
                911 ;--------
                912 ; A-REG TO SB(SHIFTER BUFR)
01F0 2104       913 CFORM:    CALL  LDA            ;GET CH. TX/RX DATA
01F2 EC         914           LD    L,#AREG        ;GET REG. ADR
01F3 C1         915           LD    H,#PAG1        ;GET PAGE ADR
01F4 40         916           LD    A,#0           ;CLEAR ACC
01F5 CD         917           XCH   A,@HL          ;CLEAR REG/GET DATA
01F6 E5         918           LD    L,#SBF         ;GET TXMIT BUFR ADR
01F7 1A         919           ST    A,@HL+         ;AND SET 1ST DIGIT
01F8 3C1D       920           LD    A,AREG+1       ;GET NEXT DIGIT
01FA 3333       921           AND   A,#B'0011      ;CLEAR UPER HALF WORD
01FC 0F         922           ST    A,@HL          ;AND SET SERIAL BUFR
01FD ED         923           LD    L,#AREG+1      ;GET REG. ADR
01FE 387C       924           AND   @HL,#B'1100    ;CLEAR IGNORE BIT

ROM PAGE NO. 8

0200 70         925           CALLS RLA            ;SHIFT A-REG.
0201 06         926           TEST  CF             ;RESET CARY
0202 70         927           CALLS RLA            ;A-REG. SHIFT LEFT
0203 ED         928           LD    L,#AREG+1      ;GET REG. ADR
0204 0C         929           LD    A,@HL          ;GET DATA
0205 E6         930           LD    L,#SBF+1       ;GET BUFR ADR
0206 1D         931           OR    A,@HL          ;SAVE AND SET DATA
0207 0F         932           ST    A,@HL          ;AND SAVE IT.
0208 EE         933           LD    L,#AREG+2
0209 0C         934           LD    A,@HL
020A E7         935           LD    L,#SBF+2
020B 0F         936           ST    A,@HL
020C EF         937           LD    L,#AREG+3
020D 0C         938           LD    A,@HL
020E E8         939           LD    L,#SBF+3
020F 0F         940           ST    A,@HL
0210 C7         941           LD    H,#PAG7        ;GET PAGE ADR
0211 EA         942           LD    L,#CH          ;GET CH. TEM ADR
0212 3990       943           TEST  STNL,PIR       ;PRI. TXMIT MODE?
0214 96         944           B     CFOR2          ;NO
0215 E3         945           LD    L,#PRI         ;YES..GET ADR
```

```
0216 CC       946 CFOR2:    LD    A,aHL              ;GET DATA
0217 31       947           XCH   A,L                ;GET SW1/SW2 TABLE ADR
0218 CC       948           LD    H,#PAG8
0219 46       949           LD    A,#B'0110          ;GET MASK NIT DATA
021A 1E       950           AND   A,aHL
021B C1       951           LD    H,#PAG1            ;GET PAGE ADR
021C E9       952           LD    L,#SBF+4           ;GET BUFR ADR
021D 0F       953           ST    A,aHL              ;AND SAVE IT.
021E 3861     954           OR    aHL,#1             ;SET PLL DATA MSB/SAVE SW
              955  ;
              956  ;--------
              957  ; SI    SERIAL DATA TRANSMITER CONTROL MODULE
              958  ;--------
0220 3EFE     959 SI:       TESTP %SIOS,SC           ;TEST IF SIO BUSY?
0222 A0       960           B     SI                 ;YES..WAITE READY
0223 2D9F     961           ST    #9,IC              ;AND SET BUFR POINTER
0225 3917     962           SET   DRS,TXRX           ;SET MODULE BUSY FLAG
0227 42       963           LD    A,#B'0010          ;GET TX MODE DATA
0228 3A8F     964           OUT   A,%SIOC            ;AND OUTPUT COMAND
022A 2230     965           CALL  BSW                ;AND OUTPUT DATA
022C 4A       966           LD    A,#B'1010          ;GET START COMAND
022D 3A8F     967           OUT   A,%SIOC            ;AND OUTPUT
022F 2A       968           RET                      ;RETURN
              969  ;
              970  ;--------
              971  ; BSW   BIT PHASE SWAP MODULE
              972  ;--------
0230 3C0F     973 BSW:      LD    A,IC
0232 31       974           XCH   A,L
0233 C1       975           LD    H,#PAG1
0234 0C       976           LD    A,aHL
0235 C0       977           LD    H,#0
0236 EC       978           LD    L,#-4
0237 07       979 B1:       RORC  A
0238 30       980           XCH   A,H
0239 76       981           CALLS AHR
023A 18       982           INC   L
023B B7       983           B     B1                 ;LOOP TILL BIT SWAPPED
023C 30       984           XCH   A,H                ;GET SWAPPED DATA
023D 3AAF     985           OUT   A,%SIOB            ;OUTPUT DATA
023F 2A       986           RET                      ;RETURN
              987  ;
              988  ; DATA FORMAT CONVERTION
              989  ;--------
              990  ; DTB   DECIMAL TO BINARY CONVERTER
              991  ;       RSLT IN A-REG
              992  ;--------

ROM PAGE NO. 9

0240 7C       993 DTB:      CALLS CLA
0241 2090     994 DTB10:    CALL  RKBD               ;HIT THE KEY-BOARD ?
0243 81       995           B     DTB10              ;NO
0244 3C74     996           LD    A,KNEW             ;YES
0246 3806     997           ADD   A,#6               ;TEST IF DIGIT?
0248 8D       998           B     DTB20              ;YES
0249 3C74     999           LD    A,KNEW             ;GET KEY DATA
024B DA       1000          CMPR  A,#ENT             ;TEST AND SET SF
              1001                                   ;SF=1;ERROR RETURN
024C 2A       1002          RET                      ;NO..RETURN
              1003 ; CONVET TO BINARY
024D 2288     1004 DTB20:   CALL  SHCH               ;SHIFT CH. TO LEFT WORD
024F 2143     1005          CALL  DDSP               ;DISPLAY READIN DATA
0251 367F     1006          EICLR IL,B'111111        ;EIN
0253 70       1007          CALLS RLA                ; A-REG X 2
0254 7F       1008          CALLS TAX
0255 70       1009          CALLS RLA
0256 70       1010          CALLS RLA                ;A-REG X 8
0257 74       1011          CALLS AD                 ; A-REG X 10
0258 7B       1012          CALLS CLX
```

```
0259 3C74      1013           LD     A,KNEW
025B 3F7C      1014           ST     A,XREG
025D 74        1015           CALLS  AD
025E 81        1016           B      DTB10          ;CONVERT NEXT DIGIT
025F 81        1017           B      DTB10          ;CONVERT NEXT DIGIT
               1018 ;
               1019 ;----------
               1020 ; SET ADDR AND CONVERT DECIMAL
               1021 ;----------
0260 2117      1022 SADR:     CALL   MRT            ;SET MEMORY CH. ADR
0262 7D        1023           CALLS  ATX            ;SET TX ADR
0263 2104      1024           CALL   LDA            ;GET AND SAVE  A-REG.
               1025 ;
               1026 ;----------
               1027 ; BTD    BINARY TO DECIMAL CONVERTER
               1028 ;        PRTSET A-REG BINARY DATA
               1029 ;        RSLT IN A-REG
               1030 ;----------
0265 C1        1031 BTD:      LD     H,#PAG1        ;GET PAGE ADDR
0266 E5        1032           LD     L,#SBF         ;GET TX/RX BUFR ADDR
0267 2904      1033           XCH    HL,HG2         ;AND SAVE RSLT REG. ADDR
0269 CF        1034           LD     H,#PAG15       ;GET PAGE ADDR
026A EC        1035           LD     L,#RTBP        ;GET DATA COUNTER ADDR
026B F8        1036           ST     #08,@HL+       ;AND SET LSD
026C FF        1037           ST     #15,@HL+       ;          2ND DIGIT
026D F7        1038           ST     #07,@HL+       ;          MSD
               1039 ; GET ROM CONSTANT
026E CF        1040 BTD10:    LD     H,#PAG15       ;GET PAGE ADDR
026F EE        1041           LD     L,#RTBP+2      ;GET DATA TABLE POINTER
0270 5B        1042           TEST   @HL,MAXROM     ;AND TEST IF MAX. PTRED ADR
0271 B3        1043           B      B2             ;NO
0272 2A        1044           RET                   ;YES..RETURN
               1045 ; CONVERT NEXT DIGIT
0273 C7        1046 B2:       LD     H,#PAG7        ;GET PAGE ADR
0274 EC        1047           LD     L,#XREG        ;GET X-REG. ADDR PTR
0275 21AA      1048           CALL   RMR            ;LOAD ROM DATA HALF DATA
0277 21AA      1049           CALL   RMR            ;AND GET UPER HALF DATA
0279 2804      1050           LD     HL,HG2         ;SET H.LR TO RSLT ADDR
027B FF        1051           ST     #-1,@HL+       ;AND PRESET INITIAL DATA
               1052 ; 4-DIGIT CONVERTION
               1053 ; NOW CONVERT A DIGIT
027C 2804      1054 BTD20:    LD     HL,HG2         ;GET RSLT ADDR PTR
027E 0A        1055           INC    @HL            ;AND INCRS ADDR PTR
027F 04        1056           TESTP  CF             ;SET   CARRY
```

ROM PAGE NO.10

```
0280 75        1057           CALLS  SB             ;A-REG - X-REG = A-REG
0281 EF        1058           LD     L,#AREG+3      ;GET A-REG(MSB)
0282 5B        1059           TEST   @HL,SIGN       ;AD TEST IF RSLT - ?
0283 627C      1060           B      BTD20          ;NO
0285 74        1061           CALLS  AD             ;    RENEW DATA
0286 2F14      1062           ADD    HG2,#1         ;AND SET NEXT RSLT TEMP ADR
0288 626E      1063           B      BTD10          ;CONVERT NEXT
               1064 ;
               1065 ;----------
               1066 ; CSV    CHANNEL DATA SAVE
               1067 ;----------
028A 3C7A      1068 CSV:      LD     A,CH           ;GET CH. LO
028C 3F1A      1069           ST     A,OLD          ;AND SAVE IT
028E 3C7B      1070           LD     A,CH+1         ;AND GET HI
0290 3F1B      1071           ST     A,OLD+1        ;SAVE
0292 2A        1072           RET                   ;RETURN
               1073 ;
               1074 ;----------
               1075 ; CHRS   CHANNEL DATA RESTORE
               1076 ;----------
0293 3C1A      1077 CHRS:     LD     A,OLD          ;RESTORE LO
0295 3F7A      1078           ST     A,CH           ;AND SAVE IT.
0297 3C1B      1079           LD     A,OLD+1        ;RESTORE HI
```

```
0299 3F7B    1080          ST    A,CH+1         ;AND SAVE
029B 2A      1081          RET
             1082 ;
             1083 ;----------
             1084 ; SPARATE STACK COUNTER
             1085 ;----------
029C 3CFF    1086 SPS:     LD    A,SSP          ;GET STACK POINTER
029E 3302    1087          ADD   A,#2           ;RESET COUNTER
02A0 06      1088          TEST  CF             ;RESET CARRY
02A1 C0      1089          LD    H,#0           ;CLEAR HR
02A2 76      1090          CALLS AHR            ;
02A3 76      1091          CALLS AHR            ;
02A4 76      1092          CALLS AHR            ;
02A5 05      1093          ROLC  A              ;CARRY DATA TO ACC
02A6 382C    1094          OR    A,#B'1100      ;SET STACK BLOCK MEMORY
02A8 30      1095          XCH   A,H            ;AND SAVE HR
02A9 31      1096          XCH   A,L            ;LR
02AA 2A      1097          RET                  ;RETURN
             1098 ;
             1099 ;----------
             1100 ; ACC OFFSET JUMP CONTROL
             1101 ;----------
02AB 3F02    1102 AJ:      ST    A,WK1          ;SAVE ACC
02AD 229C    1103          CALL  SPS            ;STACK ADDR TO H.LR
02AF 3C02    1104          LD    A,WK1          ;GET OFFSET DATA
             1105 ;
             1106 ;----------
             1107 ; MULTI WORD INCREMENT AND SAVE
             1108 ;----------
02B1 06      1109 MADDS:   TEST  CF             ;RESET CARY
02B2 77      1110          CALLS ASI            ;INCRS. LSD
02B3 40      1111          LD    A,#0           ;CLEAR ACC
02B4 77      1112          CALLS ASI            ;2ND DIGIT
02B5 40      1113          LD    A,#0           ;CLEAR ACC
02B6 77      1114          CALLS ASI            ;AND MSD
02B7 2A      1115          RET                  ;RETURN
             1116 ;
             1117 ;----------
             1118 ; SHIFT WORD CHANNEL DATA
             1119 ;----------
02B8 C7      1120 SHCH:    LD    H,#PAG7
02B9 E4      1121          LD    L,#KNEW        ;GET KEY DATA ADR
02BA 0C      1122          LD    A,@HL          ;AND GET DATA
02BB EA      1123          LD    L,#CH          ;GET TEMP CH. ADR
02BC 0D      1124          XCH   A,@HL          ;SAVE AND GET DATA
02BD 13      1125          INC   L              ;SET ADR (CH+1)
02BE 0F      1126          ST    A,@HL          ;SAVE DATA
02BF 2A      1127          RET                  ;RETURN
             1128 ;
             1129 ;----------
             1130 ; TXZ - TEST THE TX DATA ALL ZERO?
             1131 ;       SF=0 ;ALL ZERO
             1132 ;       SF=1 ;NOT ZERO
             1133 ;----------

ROM PAGE NO.11

02C0 C7      1134 TXZ:     LD    H,#PAG7
02C1 EA      1135          LD    L,#CH          ;GET CH. TEMP ADR
02C2 39A0    1136          TEST  STHL,DPIR      ;TEST IF PRIORITY RECIVED?
02C4 86      1137          B     TXZ0           ;NO
02C5 E8      1138          LD    L,#PRI         ;YES..GET ADR
02C6 0C      1139 TXZ0:    LD    A,@HL          ;GET CH. DATA
02C7 2121    1140 TXZ1:    CALL  MRT1           ;SET MEMORY (H.L) REG
02C9 7D      1141          CALLS ATX            ;AND SET TO TX ADR
02CA 6056    1142          B     IAZ            ;AND CHECK
             1143 ;
             1144 ;----------
             1145 ; AMOV3 - DATA TRANSFER SUBROUTINE
             1146 ;         MOVE FROM BTD CONVERTER BUFR TO
             1147 ;         DISPLAY REGISTER DECODER BUFR.
             1148 ;----------
```

```
02CC 2039    1149 AMOV3:  CALL   CLC            ;CLEAR CH. DISPLAY REG.
02CE 3C15    1150         LD     A,SBF          ;GET MSD DATA
02D0 3F7A    1151         ST     A,CH           ;AND PUT INTO DIS. REG.
02D2 392B    1152         SET    SY3,MDB        ;SET FLASHING FLAG
02D4 2A      1153         RET                   ;RETURN
             1154 ;
             1155 ;------------------------------------------------
             1156 ; OTDC - OUTPUT TONE DECODE COMAND
             1157 ;         RETURNED IF (BUSY) = 1
             1158 ;------------------------------------------------
02D5 36BF    1159 OTDC:   DICLR  IL,B'111111    ;INT. DISABLE
02D7 3BB8    1160 OTDC1:  TEST   %R8,BUSY       ;CPU (2) BUSY?
02D9 9E      1161         B      OTDC2          ;YES..WAIT FOR OP
02DA 3BE8    1162         TESTP  %R8,HRQ        ;TEST IF HOLD REQ?
02DC 97      1163         B      OTDC1          ;NO
02DD 2A      1164         RET                   ;YES..RETURN
02DE 3C7A    1165 OTDC2:  LD     A,CH           ;NO...GET CH. DATA
02E0 3990    1166         TEST   STNL,PIR       ;TEST IF PRIORITY CH?
02E2 A5      1167         B      B3             ;NO
02E3 3C78    1168         LD     A,PRI          ;YES GET PRIORITY CH. DATA
02E5 3AA7    1169 B3:     OUT    A,%R7          ;AND OUTPUT DECODE COMAND
02E7 3B74    1170         CLR    %R4,DTR        ;AND START COMAND
02E9 3BF8    1171 B4:     TESTP  %R8,BUSY       ;DATA RECIVE OK?
02EB AF      1172         B      OTDC3          ;NO
02EC 3BEC    1173         TESTP  %R8,HRQ        ;TEST IF HOLD REQ?
02EE A9      1174         B      B4             ;NO
02EF 3C34    1175 OTDC3:  SET    %R4,DTR        ;YES...CLEAR COMAND LINE
02F1 2A      1176         RET                   ;AND RETURN TO PGM
             1177 ;
             1178 ;----------
             1179 ; CHANNEL DATA INCREMENT SUBROUTINE
             1180 ;         SF=1: RETURN...ERROR
             1181 ;         SF=0; RETURN...NORMAL RETURN
             1182 ;----------
02F2 C7      1183 CHINC:  LD     H,#PAG7
02F3 EA      1184         LD     L,#CH
02F4 0A      1185         INC    @HL
02F5 0C      1186         LD     A,@HL
02F6 3806    1187         ADD    A,#6           ;TEST IF MAX. CH?
02F8 EB      1188         B      CHI1           ;NO
02F9 0F      1189         ST     A,@HL          ;YES
02FA 2A      1190         RET                   ;RETURN
             1191 ;
02FB 40      1192 CHI1:   LD     A,#0
02FC 09      1193         DEC    A              ;SET SF=0
02FD 2A      1194         RET
             1195 ;
             1196 ;----------
             1197 ; MOVE THE DATA SUBROUTINE
             1198 ;----------
02FE C7      1199 AMOV1:  LD     H,#PAG7        ;GET PAGE ADR
02FF EA      1200         LD     L,#CH          ;GET CH. TEMP ADR

ROM PAGE NO.12

0300 3C1C    1201         LD     A,AREG         ;GET 1ST DATA
0302 1A      1202         ST     A,@HL+
0303 3C18    1203         LD     A,SBF+3
0305 0F      1204         ST     A,@HL
0306 2A      1205         RET
             1206 ;
             1207 ;----------
             1208 ; MOVE THE DATA SUBROUTINE
             1209 ;----------
0307 C7      1210 AMOV2:  LD     H,#PAG7        ;GET PAGE ADR
0308 EA      1211         LD     L,#CH          ;FET DISPLAY REG. ADR
0309 3C17    1212         LD     A,SBF+2        ;GET DATA
030B 1A      1213         ST     A,@HL+         ;AND SAVE IT.
030C 3C16    1214         LD     A,SBF+1        ;GET 2ND DATA
030E 0F      1215         ST     A,@HL          ;AND SAVE
030F 2A      1216         RET                   ;RETURN
```

```
              1217 ;
              1218 ;----------
              1219 ; CHECK PRIORITY AND SET MODE
              1220 ;----------
0310 C7       1221 PRIEQ:   LD    H,#PAG7
0311 E3       1222          LD    L,#PRI
0312 0C       1223          LD    A,@HL
0313 EA       1224          LD    L,#CH
0314 1F       1225          XOR   A,@HL
0315 98       1226          B     PRIEQ1
0316 3910     1227          SET   STNL,PIR
0318 3920     1228          SET   STNL,CFIR
031A 2A       1229          RET
              1230 ;
031B 40       1231 PRIEQ1:  LD    A,#0
031C 09       1232          DEC   A
031D 2A       1233          RET
              1234 ;
              1235 ;------------------------------------------
              1236 ; HTEST    HOLD MODE TEST PROGRAM
              1237 ;------------------------------------------
031E 39D7     1238 HTEST:   TESTP DRS,TXRX    ;SYSTEM IDLE ?
0320 B2       1239          B     HTEST1     ;NO
0321 39A7     1240          TEST  DRS,HFLG   ;YES..TEST IF H-REQ?
0323 B2       1241          B     HTEST1     ;    NO
              1242 ; HOLD MODE CONTROL
0324 36BF     1243          DICLR IL,B'111111 ;     YES..MASK INTR
0326 3B18     1244          SET   %R8,HACK   ;REQUEST ACK
0328 4C       1245          LD    A,#B'1100  ;GET HOLD DATA
0329 3A30     1246          OUT   A,%HOLD    ;AND OUTPUT HOLD COMAND
              1247 ; SYSTEM HOLD MODE
032B 00       1248          NOP
032C 39B7     1249          CLR   DRS,HFLG   ;RESET REQ. FLAG
032E 3B58     1250          CLR   %R8,HACK   ;RESET ACK OUTPUT
0330 61CE     1251          B     MUTA1      ;AND OUTPUT PLL DATA
0332 2A       1252 HTEST1:  RET              ;RETURN
              1253 ;
              1254 ;----------
              1255 ; INTERRUPTION #1 HANDLER
              1256 ;    POWER MONITOR & SELECT LOW-POWER MODE
              1257 ;    RESTART IF (HLD = 1) LEVEL.
              1258 ;----------
0333 71       1259 INT1:    CALLS SV         ;FIND HOLD REQUEST COMAND
0334 3927     1260          SET   DRS,HFLG   ;SET HOLD REQ FLAG
0336 71       1261          CALLS RS         ;RESTORE ALL-REGS.
0337 2B       1262          RETI
              1263 ;
              1264 ;----------
              1265 ; SERIAL DATA TRANSMIT HANDLER
              1266 ;      ISO  INTERRUPTION
              1267 ;        SO-/SC- SINK CURRENT
              1268 ;              5 (MA)...MAX.
              1269 ;----------
0338 71       1270 ISO:     CALLS SV         ;SAVE ALL REGS.
              1271 ; TRANSMIT THE DATA TO PLL( MC145156)
0339 C0       1272          LD    H,#PAG0    ;GET PAGE ADR
033A EF       1273          LD    L,#IC      ;GET BUFR COUNTER ADR
033B 05       1274          DEC   @HL        ;SET NEXT BUFR ADR
033C 0C       1275          LD    A,@HL      ;GET BUFR ADR PTR
033D D4       1276          CMPR  A,#4       ;TEST IF END OF BUFR?
033E B354     1277          B     SDT1       ; NO

ROM PAGE NO.13

0340 42       1278          LD    A,#B'0010  ; YES..END OF TRANSMIT
0341 3ACF     1279          OUT   A,%SIOC
0343 3E09     1280          SET   %R9,PENB   ;SET PLL LACH ENABLE
0345 3E49     1281          CLR   %R9,PENB   ;RESET ENABLE
0347 3BD4     1282          TESTP %R4,TXI
0349 98       1283          B     SDT2       ;SYSTEM TX MODE
034A 22D7     1284          CALL  OTDC1      ;OUTPUT TONE DECODE COMAND
```

```
034C 3957   1285           CLR    DRS,TXRX
034E C1     1286           LD     H,#PAG1        ;GET PAGE ADR
034F E0     1287           LD     L,#D0          ;GET TIMER ADR
0350 FF     1288           ST     #-1,@HL+       ;AND SET COUNTER
0351 3907   1289           SET    DRS,RDEC
0353 96     1290           B      SDT2           ;SET SQ/TONE DECODE REQ.
            1291 ; TRANS FER NEXT DATA
0354 2230   1292 SDT1:     CALL   BSW
0356 71     1293 SDT2:     CALLS  RS             ;RESTORE ALL-REGS.
0357 2B     1294           RETI                  ;AND RETURN TO PGM
            1295 ;
            1296 ;--------
            1297 ; HTC1   TIMER COUNTER #1 OVERFLOW HANDLER
            1298 ;--------
0358 71     1299 HTC1:     CALLS  SV
0359 72     1300           CALLS  P1             ;STOP TC1
035A 3999   1301           TEST   SY1,T02        ;TEST IF TX TIMER CHECK?
035C A9     1302           B      HTC31          ;NO
            1303 ; TX DELAY COUNT PROCESSOR
035D 3959   1304           CLR    SY1,T02        ;CLEAR TIMER CTL FLAG.
035F 22C0   1305           CALL   TXZ            ;TX NOT USE?
0361 0E     1306           TESTP  ZF             ;CHECK THE FLAG.
0362 A7     1307           B      HTC30          ;NO
            1308 ; READY TO TX
0363 3940   1309           CLR    STNL,SDN       ;SET MODE TX
0365 21CE   1310           CALL   MUTA1          ;SET MUTE ON
            1311 ; ALL DONE
0367 71     1312 HTC30:    CALLS  RS             ;RESTORE REG.
0368 2B     1313           RETI                  ;RETURS
            1314 ; KEY PEE TONE COUNTER
0369 3B64   1315 HTC31:    CLR    %R4,PEE        ;CLEAR TONE ENABLE OUTPUT
036B 71     1316           CALLS  RS             ;RESTORE REGS
036C 2B     1317           RETI                  ;RETURN
            1318 ;
            1319 ;--------
            1320 ; HTC2   TIMER COUNTER #2 OVEFLOW HANDLER
            1321 ;        TC2 IS MONITOR THE FLOWING-FLAGS:
            1322 ;
            1323 ;
            1324 ;            MD......MULTI DATA DISPLAY FLAG.
            1325 ;            (REC)....MEMORY DATA REVIUE COMAND.
            1326 ;            AND RETURN.
            1327 ;--------
036D 71     1328 HTC2:     CALLS  SV
036E 73     1329           CALLS  P2
            1330 ; CHECK THE INTERRUPTION MODE
036F 3C01   1331           LD     A,STNH         ;YES..GET STATE REG.
0371 D2     1332           CMPR   A,#REC         ;TEST IF MEM RECALL?
0372 63EC   1333           B      HTC40          ;NO
0374 2134   1334           CALL   ADLNK          ;DISPLAY ALL CLEAR
0376 3BAB   1335           TEST   SY3,MDB        ;TEST IF MD/BLANKING?
0378 BD     1336           B      HTC33          ;NO
0379 396B   1337           CLR    SY3,MDB        ;YES..CLEAR FLAG
037B 53F9   1338           B      HTC75          ;AND RETURN
            1339 ;
037D 3C00   1340 HTC33:    LD     A,STNL         ;YES..GET LOWER STATE REG.
037F 06     1341           TEST   CF             ;RESET CARRY

ROM PAGE NO.14

0380 05     1342           ROLC   A
0381 22AB   1343           CALL   AJ
0383 6396   1344           BS     TXNO           ;TX MIDULE DATA
0385 6393   1345           BS     TXNL           ;TX LOWER DATA
0387 639B   1346           BS     RXNU           ;RX UPER DATA
0389 63AD   1347           BS     RXNO           ;RX MIDULE DATA
038B 63B0   1348           BS     RXNL           ;RX LOWER DATA
038D 63B6   1349           BS     TOND           ;TONE DATA
038F 63D7   1350           BS     SWNX           ;SWITCH DATA
0391 63E3   1351           BS     CHDS           ;ALL DONE/DISPLAY CH. DATA
            1352 ; TX LOWER HALF DATA DISPLAY
```

```
0393 22FE    1353 TXNL:   CALL   AMOV1         ;SET DATA TO DISPLAY REG.
0395 98      1354         B      TXNC          ;DONE
             1355 ; TX MIDULE DATA DISPLAY
0396 2307    1356 TXNQ:   CALL   AMOV2         ;SET DATA
0398 2042    1357 TXNC:   CALL   DSTX          ;DISPLAY TX INDICATOR
039A B4      1358         B      HTC34         ;DONE
             1359 ;-----------
             1360 ; RX DATA READ-OUT MODE
             1361 ; UPER HALF DATA DISPLAY
             1362 ;-----------
039B 204A    1363 RXNU:   CALL   DSRX          ;DISPLAY RX DATA
039D 3C1A    1364         LD     A,OLD         ;RESTORE CH. DATA
039F 2121    1365         CALL   MRT1          ;GET ADDR OF MEMORY DATA
03A1 393D    1366         ADD    L,#-3         ;SET ADDR
03A3 2104    1367         CALL   LDA           ;GET MEMORY DATA
03A5 C1      1368         LD     H,#PAG1       ;GET PAGE ADR
03A6 EF      1369         LD     L,#AREG+3     ;GET A-REG. ADR
03A7 57      1370         CLR    @HL,3         ;CLEAR EMPTY FLAG
03A8 2265    1371         CALL   BTD           ;CONVERT TO DECIMAL
03AA 22CC    1372         CALL   AMOV3         ;SET DISPLAY DATA
03AC B4      1373         B      HTC34         ;DONE
             1374 ; DISPLAY RX MIDULE DATA
03AD 2307    1375 RXNQ:   CALL   AMOV2         ;SET DATA
03AF B2      1376         B      RXNC          ;DONE
             1377 ; DISPLAY RX LOWER ADAT
03B0 22FE    1378 RXNL:   CALL   AMOV1         ;SET DATA
03B2 204A    1379 RXNC:   CALL   DSRX          ;DISPLAY
03B4 63D0    1380 HTC34:  BS     HTC35         ;DONE
             1381 ; TONE DATA DISPLAY
03B6 7C      1382 TOND:   CALLS  CLA           ;CLEAR A-REG.
03B7 C1      1383         LD     H,#PAG1       ;GET PAGE ADR
03B8 EC      1384         LD     L,#AREG       ;GET TEMP REG. ADR
03B9 3C11    1385         LD     A,D1          ;GET TRANSFERED DATA LO
03BB 1A      1386         ST     A,@HL+        ;AND SAVE IT.
03BC 3C12    1387         LD     A,D2          ;GET UPER DATA
03BE 3333    1388         AND    A,#B'0011     ;ELSE CLEAR IGNORE BIT

ROM PAGE NO.15
03C0 0F      1389         ST     A,@HL         ;AND SAVE IT.
03C1 3C12    1390         LD     A,D2          ;GET STATE DATA
03C3 CD      1391         LD     H,#PAG9
03C4 E0      1392         LD     L,#SEG16
03C5 5E      1393         TEST   A,2           ;TEST IF E/D = 1?
03C6 09      1394         B      B6            ;NO
03C7 CC      1395         LD     H,#PAG8       ;YES
03C8 EE      1396         LD     L,#SEG14
03C9 50      1397 B6:     SET    @HL,S1        ;DISPLAY TONE E/D
03CA 2265    1398         CALL   BTD
03CC 22FE    1399         CALL   AMOV1
03CE 2141    1400         CALL   ZDSP          ;DISPLAY TONE DATA
             1401 ;
03D0 2F10    1402 HTC35:  ADD    STNL,#1       ;INCRS. DISPLAY COUNTER
03D2 392B    1403         SET    SY3,MDB       ;SET FLAG FOR BLANKING
03D4 2143    1404         CALL   DDSP          ;DISPLAY DATA
03D6 B9      1405         B      HTC75         ;AND DISPLAY DATA
             1406 ; DISPLAY SWITCH DATA
03D7 3C1A    1407 SWNX:   LD     A,OLD         ;GET CH. DATA
03D9 31      1408         XCH    A,L           ;AND SET LR
03DA CC      1409         LD     H,#PAG8       ;GET PAGE ADR
03DB 0C      1410         LD     A,@HL         ;GET SWITCH DATA
03DC 06      1411         TEST   CF
03DD 07      1412         RORC   A
03DE C7      1413         LD     H,#PAG7       ;GET PAGE ADR
03DF EA      1414         LD     L,#CH         ;GET CH. ADR
03E0 1A      1415         ST     A,@HL+        ;AND SET SWITCH DATA
03E1 F8      1416         ST     #11,@HL+      ;DISPLAY "S"
03E2 90      1417         B      HTC35         ;ALL DONE
             1418 ; ALL-MODE OVER
03E3 2293    1419 CHDS:   CALL   CHRS          ;RESTORE CH. #
03E5 213F    1420         CALL   CDSP          ;& DISPLAY
```

```
03E7 2D01    1421              ST      #0,STNH
03E9 395A    1422              CLR     SY2,MD          ;RESET AND ALL DONE
03EB BB      1423              B       HTC80           ;ALL DONE
             1424 ; (REV) KEY CONTROL AND DISPLAY
             1425 ; SCAN CH. ALL DISPLAY
03EC 22F2    1426 HTC40:       CALL    CHINC           ;INCRS. CH. NUMBER
03EE A3      1427              B       CHDS            ;YES..DISPLAY CH. DATA
             1428 ;
03EF 21AF    1429              CALL    FS              ;FIND SC
03F1 AC      1430              B       HTC40           ;NO
03F2 3C7A    1431              LD      A,CH            ;GET DATA
03F4 2121    1432              CALL    MRT1            ;GET MEMORY ADR
03F6 AC      1433              B       HTC40           ;YES
03F7 213F    1434              CALL    CDSP            ;DISPLAY CH. DATA
             1435 ; FIND CHANNEL NUMBER
03F9 21C3    1436 HTC75:       CALL    T500            ;SET 500(MS) TIMER
03FB 71      1437 HTC80:       CALLS   RS              ;RESTORE ALL REGS
03FC 3B      1438              RETI
             1439 ;
             1440 ;--------
             1441 ; INTERVAL TIMER COUNTER HANDLER
             1442 ;         FUNCTIONS:
             1443 ;           1) CHEANGE KEY CLUMN READER
             1444 ;           2) KEY NOISE LIMITER
             1445 ;           3) CPU1 TO CPU2 DATA TRANSMITER
             1446 ;--------
03FD 71      1447 TIMR:        CALLS   SV
             1448 ; CHECK THE KEY LOCK MODE
03FE 38C5    1449              TESTP   %R5,KL          ;TEST IF KEY LOCK?

ROM PAGE NO.16

0400 6440    1450              B       TIM40           ;YES
             1451 ; NORMAL OPERATION
0402 C7      1452              LD      H,#PAG7
0403 E7      1453              LD      L,#DIG          ;GET DIGIT DATA ADR
0404 0C      1454              LD      A,@HL           ;GET DATA
0405 31      1455              XCH     A,L
0406 3A60    1456              IN      %KEY,@HL
0408 3BB5    1457              TEST    %R5,TRN1
040A 93      1458              B       TIM1
             1459 ; DATA READ IN MODE
040B 2CF7    1460              OUT     #B'1111,%R7     ;SET PORT INPUT MODE
040D 3BF6    1461              TESTP   %R6,3           ;DIGIT = 3?
040F 93      1462              B       TIM1            ;YES
0410 C1      1463              LD      H,#PAG1
0411 3A67    1464              IN      %R7,@HL
             1465 ; CHANGE THE DIGIT SIGNAL
0413 3888    1466 TIM1:        ADD     L,#B'1000       ;SET L-REG. PORT ADDR
0415 35      1467              CLR     @L              ;AND CLEAR DIGIT #
0416 C7      1468              LD      H,#PAG7         ;GET PAGE ADDR PTR
0417 E7      1469              LD      L,#DIG
0418 0A      1470              INC     @HL
0419 0C      1471              LD      A,@HL
041A 330C    1472              ADD     A,#-4
041C A8      1473              B       TIM2
041D F0      1474              ST      #0,@HL+         ;NOT KEY HIT
             1475 ; COUNT KEY NOISE LIMITER
041E E6      1476              LD      L,#KFLG
041F 59      1477              TEST    @HL,KSNS
0420 A8      1478              B       TIM2            ;NOT KEY SENCE
0421 0C      1479              LD      A,@HL
0422 380C    1480              ADD     A,#B'1100
0424 A8      1481              B       TIM2
0425 3844    1482              ADD     @HL,#4
0427 E7      1483              LD      L,#DIG
             1484 ; CHECK THE DATA TRANSMIT
0428 3B95    1485 TIM2:        TEST    %R5,DF
042A B4      1486              B       TIM3            ;TRANCIVER MODE
042B 3BF5    1487              TESTP   %R5,TRN1
042D B4      1488              B       TIM3
```

```
C42E E7        1489         LD      L,#DIG         ;SET ADR DIGIT COUNTER
042F CC        1490         LD      A,@HL
0430 31        1491         XCH     A,L
0431 C1        1492         LD      H,#PAG1
0432 3AE7      1493         OUT     @HL,%R7
               1494 ;
0434 3C77      1495 TIM3:   LD      A,DIG
0436 3828      1496         OR      A,#B'1000
0438 31        1497         XCH     A,L
0439 34        1498         SET     @L
043A 3C00      1499 TIM4X:  LD      A,STNL         ;GET CONTROL STATUS
043C D3        1500         CMPR    A,#REV         ;TEST IF SYSTEM REVUE MODE?
043D 0E        1501         TESTP   ZF
043E 645D      1502         B       TIM4           ;YES..ALL DONE

RCM PAGE NO.17

0440 3B83      1503 TIM40:  TEST    %R8,TX         ;NO..TX REG?
0442 9D        1504         B       TIM4           ;YES
0443 39BB      1505         TEST    SY3,DWFS       ;NO..TEST IF DUAL WATCH?
0445 9D        1506         B       TIM4           ;  NO
               1507 ; COUNT TIMER
0446 C1        1508 TIM5:   LD      H,#PAG1        ;GET PAGE ADR
0447 E2        1509         LD      L,#D2          ;GET TIMER ADR
0448 41        1510         LD      A,#1
0449 22B1      1511         CALL    MADDS
044B 06        1512         TEST    CF             ;TEST IF TIMER DONE?
044C 9D        1513         B       TIM4           ;NO
               1514 ; TIMER OVERFLOWED
044D C0        1515         LD      H,#PAG0        ;GET PAGE ADR
               1516 ; DUAL WATCH MODE SENCE
044E E9        1517 TIM6:   LD      L,#SY1         ;GET FLAG ADR
044F 5B        1518         TEST    @HL,AT         ;TEST IF AT MODE?
0450 95        1519         B       TIM8           ;NO
0451 52        1520         SET     @HL,ATP        ;YES..AND SET PRIORITY CHECK
FLG
0452 201A      1521         CALL    SET3S          ;SET 3-SEC, TIMER
0454 9D        1522         B       TIM4           ;DONE
               1523 ;
0455 397B      1524 TIM8:   CLR     SY3,DWFS
0457 3910      1525         SET     STNL,PIR       ;RESET PRI. CHECK FLAG
0459 21CE      1526 TIM9:   CALL    MUTA1          ;SET MUTE ON
045B 213F      1527         CALL    CDSP           ;DISPLAY CH. DATA
               1528 ;
045D 71        1529 TIM4:   CALLS   RS             ;RESTORE ALL REGS.
045E 2B        1530         RETI
               1531 ;
               1532 ;---------
               1533 ; INTERRUPTION #2 HANDLER
               1534 ;       INT2 IS
               1535 ;       TX COMAND INPUT.
               1536 ;
               1537 ;       COMAND STATE:
               1538 ;       AS MODE IN STOP SQ...CLEAR THE PRI & RETURN(IF PTT)
               1539 ;       AS MODE IN AT    ...STOP AT & HOLD CH.AT PRI.
               1540 ;                        IF NO PRI. SELECT SMALLEST CH.
               1541 ;                        (PTT)
               1542 ;---------
045F 71        1543 INT2:   CALLS   SV             ;SAVE REGS.
0460 3C01      1544         LD      A,STNH         ;GET STSTE FLAG
0462 D3        1545         CMPR    A,#REV         ;TEST IF REV?
0463 A6        1546         B       I4             ;NO
0464 64AC      1547         B       I30            ;YES
               1548 ; TX MODE TURN CONTROL
0466 72        1549 I4:     CALLS   P1             ;STOP TC1
0467 3BD5      1550         TESTP   %R5,DF         ;SYSTEM PGM MODE?
0469 64AC      1551         B       I30            ;YES..DONE
046B 39B9      1552         TEST    SY1,AT         ;YES..CHECK AT?
046D B0        1553         B       I6             ;    NO
046E 393E      1554         SET     SY5,AT         ;    YES..SET FLAG/SAVE
0470 73        1555 I6:     CALLS   TAS            ;TEST IF SCAN MODE?
```

```
0471 B4       1556            B     I5           ;NO
0472 390E     1557            SET   SY5,SCAN     ;YES..SAVE FLAG
0474 7E       1558 I5:        CALLS TP0          ;TEST IF PRI. SELECTED?
0475 68       1559            B     I7           ;NO
0476 391E     1560            SET   SY5,1        ;YES..SAVE FLAG
              1561 ;
0478 78       1562 I7:        CALLS TAS          ;GET ADR
0479 54       1563            CLR   @HL,SCAN     ;CLEAR SCAN MODE FLAG
047A C0       1564            LD    H,#PAG0
047B E9       1565            LD    L,#SY1       ;GET CTL FLAG ADR
047C 5B       1566            TEST  @HL,AT       ;AT?
047D 6495     1567            B     I26          ;NO
047F 57       1568            CLR   @HL,AT       ;YES..CLEAR AT MODE

ROM PAGE NO.18

0480 7E       1569            CALLS TP0          ;PRI. SEL ?
0481 5B       1570            TEST  @HL,PEMPT    ;TEST IF PRI. ON?
0482 89       1571            B     I15          ;NO
0483 3C78     1572            LD    A,PRI        ;GET PRI. CH. DATA
0485 3F7A     1573            ST    A,CH         ;AND SET PRIORITY CH. DATA
0487 8E       1574            B     I20          ;DONE
              1575 ; SET NEW CHANNEL DATA
0488 C7       1576            LD    H,#PAG7      ;NO
              1577 ; PRI. EMPTY & FIND FIRST CH.
0489 EA       1578 I15:       LD    L,#CH        ;GET CH. TEMP ADDR
048A 41       1579            LD    A,#1         ;GET DATA
048B 1A       1580            ST    A,@HL+       ;SET CH. NUMBER (1)
048C F0       1581            ST    #0,@HL+
048D 1B       1582            ST    A,@HL-       ;SET CH. ADDR
048E 21CE     1583 I20:       CALL  MUTA1        ;SET RX DATA
0490 213F     1584            CALL  CDSP         ;AND DISPLAY CH. DATA
0492 21B8     1585            CALL  T200         ;WAITE FOR 200(MS)
0494 A8       1586            B     I29          ;DONE
              1587 ; CHECK THE TX DATA = 0?( TX = 0 NOT TRANSMIT MODE)
0495 22C0     1588 I26:       CALL  TXZ          ;TEST IF MODE ?
0497 0E       1589            TESTP ZF
0498 9E       1590            B     I28          ;NOT TX MODE(INHIBIT TX MODE)
              1591 ;--------
              1592 ; SELECT TX MODE
0499 C0       1593            LD    H,#PAG0      ;GET PAGE ADR
049A E0       1594            LD    L,#STNL      ;GET CONTROL FLAG ADR
049B 54       1595            CLR   @HL,SDN      ;SET MODE (TX)
049C 21CE     1596            CALL  MUTA1        ;SET MUTE ON
049E C0       1597 I28:       LD    H,#PAG0      ;GET PAGE ADR
049F E0       1598            LD    L,#STNL      ;GET CTL FLAG ADR
04A0 5A       1599            TEST  @HL,DPIR     ;PRI. CH DISPLAYED?
04A1 A8       1600            B     I29          ;NO
04A2 3C78     1601            LD    A,PRI        ;YES..GET PRI. CH
04A4 3F7A     1602            ST    A,CH         ;AND SAVE RENEW CH. DATA
04A6 55       1603            CLR   @HL,PIR      ;CLEAR PRI. CHECK FLAG
04A7 56       1604            CLR   @HL,DPIR     ;CLEAR PRI. DISPLAY FLAG
04A8 7E       1605 I29:       CALLS TP0          ;PRI. EMPTY?
04A9 57       1606            CLR   @HL,PEMPT    ;AND CLEAR FLAG
04AA 79       1607            CALLS TPR         ;GET INDICATOR ADR
04AB 54       1608            CLR   @HL,PD       ;AND CLEAR
04AC 71       1609 I30:       CALLS RS           ;RESTORE CH. DATA
04AD 2B       1610            RETI               ;RETURN
              1611 ;
              1612 ;--------
              1613 ; POWER ON INITIALIZE MODULE
              1614 ; INIT. SET THE I/O,FLAGS AND DATA RAM.
              1615 ;       SYSTEM RESET
              1616 ;--------
              1617 ; INITIAL SET I/O PORT
              1618 ;--------
04AE 2C94     1619 INIZ:      OUT   #B'1001,%R4  ;CLEAR DIGIT OUTPUT PORT/MUTE
04B0 2C06     1620            OUT   #B'0000,%R6  ;CLEAR R6 PORT
04B2 2C07     1621            OUT   #B'0000,%R7  ;CLEAR R7 PORT
04B4 2CD8     1622            OUT   #B'1101,%R8  ;CLEAR R8 PORT
```

```
04B6 2C69      1623              OUT    #B'0110,%R9    ;SET SERIAL BUFR PORT
               1624 ; RAM ALL CLEAR
04B8 C0        1625              LD     H,#PAG0        ;GET PAGE STARTING ADDR
04B9 E0        1626              LD     L,#STNL        ;AND GET WD STARTING ADDR
04BA F0        1627 Z10:         ST     #0,@HL+        ;CLEAR RAM
04BB BA        1628              B      Z10            ;AND LOOP TILL 16 TIMES
04BC 38C1      1629              ADD    H,#1           ;AFTER INCRES H-REG.
04BE BA        1630              B      Z10            ;CLEAR MORE.
               1631 ; LCD COMAN REGISTOR SET
04BF 4C        1632              LD     A,#B'1100      ;GET LCD DISPLAY ADDR
```

ROM PAGE NO.19

```
04C0 3A8A      1633              OUT    A,%LCD1        ; PAGE 12/WD 0 AND OUTPUT
04C2 4B        1634              LD     A,#B'1011      ;AND SELECT DISPLAY MODE
04C3 3A8B      1635              OUT    A,%LCD2        ;AND OUTP
               1636 ; INTERVAL TIMER COUTER SET
04C5 47        1637              LD     A,#B'0111      ;GET INTERVAL TIMER 4.1(MS)
04C6 3A89      1638              OUT    A,%TV          ;AND OUTPUT COMAND
               1639 ;----------------------------
               1640 ; SET AND INITIALIZE STACK POINTER
04C8 4C        1641              LD     A,#B'1100      ;GET STACK STARTING ADDR
04C9 3FFF      1642              ST     A,SSP          ;AND SAVE IT.
               1643 ; WAITE FOR MODE PROGRAM
04CB 3640      1644 Z20:         EICLR  IL,B'000000    ;SET INTERRUPTION ENABLE
04CD 3B95      1645              TEST   %R5,DF         ;INITIAL START IN PROGRAM MOD
04CF 9B        1646              B      Z20            ;AND WAITE FOR THIS MODE
               1647 ;
               1648 ;---------
               1649 ; (F0) - FUNCTION MODE #(0) HANDLER
               1650 ;        TX/RX CHANNL PROGRAMMER
               1651 ;---------
04D0 46        1652 F0:          LD     A,#B'0110      ;SET INTERRUPTION MODE
04D1 13        1653              XCH    A,EIR          ;AND DEPOSITE MASK REG.
04D2 2134      1654 FB:          CALL   ABLNK          ;DISPLAY ALL BLANCK
04D4 207A      1655              CALL   PL             ;DISPLAY SYSTEM MODE
               1656 ; MODE CONTROL FOR
               1657 ; ENTER THIS MODE
04D6 367F      1658 FE:          EICLR  IL,B'111111    ;EIN
04D8 2D00      1659              ST     #0,STNL        ;CLEAR STATE CONTROL DATA
04DA 2D01      1660              ST     #0,STNH        ;CLEAR STATE (L)
               1661 ; READ KEY COMAND
04DC 231E      1662 PSTART:      CALL   HTEST          ;TEST HOLD MODE
04DE 3BD5      1663              TESTP  %R5,DF         ;SYSTEM PROGRAM MODE?
04E0 A5        1664              B      FR             ;YES
04E1 4F        1665              LD     A,#B'1111      ;NO...GO OUT NORMAL MODE
04E2 13        1666              XCH    A,EIR          ;SET INTERRUPTION MODE F/F
04E3 65C5      1667              B      SETUP          ;GO TO
04E5 2090      1668 FR:          CALL   RKBD           ;READ KEY COMAND
04E7 9C        1669              B      PSTART         ;NOT KEY HIT
               1670 ; FIND KEY INPUT
04E8 2134      1671              CALL   ABLNK
04EA C7        1672              LD     H,#PAG7        ;GET PAGE ADR
04EB E4        1673              LD     L,#KNEW        ;GET KEY DATA ADR
04EC 0C        1674              LD     A,@HL          ;GET DATA
04ED 3806      1675              ADD    A,#6           ;TEST IF DIGIT?
04EF B2        1676              B      CHKCMD         ;YES
04F0 656D      1677              B      ENT2           ;NO..ERROR
               1678 ;----------
               1679 ; CHECK THE FAST KEY COMAND
               1680 ;----------
04F2 0C        1681 CHKCMD:      LD     A,@HL          ;GET NEW KEY DATA
04F3 EA        1682              LD     L,#CH          ;GET CH. TEMP ADR
04F4 0F        1683              ST     A,@HL          ;AND SAVE IT
04F5 36BF      1684              DICLR  IL,B'111111    ;INT. DISABLE
04F7 C1        1685              LD     H,#PAG1        ;GET PAGE ADR
04F8 E0        1686              LD     L,#D0          ;GET COMAND BUFR ADR
04F9 F0        1687              ST     #0,@HL+        ;SET COMAND
04FA 0F        1688              ST     A,@HL          ;AND SET CH. #
04FB 212C      1689              CALL   TRN            ;AND OUTPUT CMD
```

```
04FD 213F    1690              CALL  CDSP           ;AND DISPLAY CH. DATA
04FF 367F    1691              EICLR IL,B'111111    ;EIN
             1692 ; CHECK THE REQUEST COMAND

ROM PAGE NO.20 *

0501 2090    1693 B9:          CALL  RKBD           ;READ KEY DATA
0503 81      1694              B     B9             ;NOT KEY HIT
0504 2134    1695              CALL  ABLNK          ;DISPLAY ALL BLANK
0506 3C74    1696              LD    A,KNEW         ;GET NEW KEY DATA
0508 DF      1697              CMPR  A,#REK         ;TEST IF MEMORY RECALL MODE?
0509 80      1698              B     MW             ;NO
050A 2117    1699              CALL  MRT            ;TEST IF MEMORY EMPTY?
050C 65BD    1700              B     ENT2           ;YESS...ERROR
             1701 ;READ OUT CH. DATA
050E 2D21    1702              ST    #REC,STNH      ;SET MEMORY RECALL MODE
0510 2D00    1703              ST    #0,STNL        ;CLEAR STATE CTL DATA
0512 C1      1704              LD    H,#PAG1        ;GET PAGE ADDR
0513 E0      1705              LD    L,#D0          ;GET TRANSFER BUFR ADDR
0514 F2      1706              ST    #2,@HL+        ;SET TONE DATA RETURN COMAND
0515 212C    1707              CALL  TRN            ;AND OUTPUT COMAND
0517 228A    1708              CALL  CSV            ;SAVE CH. DATA
             1709 ;DISPLAY CHANNEL PROGRAMED DATA
0519 2260    1710              CALL  SADR
051B 22CC    1711              CALL  AMOV3          ;SET DISPLAY DATA
051D 2042    1712              CALL  DSTX           ;SET TX INDICATOR
051F 2143    1713              CALL  DDSP           ;DISPLAY DATA
0521 367F    1714              EICLR IL,B'111111    ;EIN
0523 391A    1715              SET   SY2,MD         ;SET MULTI DISPLAY FLAG
0525 21C3    1716              CALL  T500           ;AND SET INTERVAL TIMER
             1717 ; WAITE FOR STN(H) READY MODE
0527 3C01    1718 B8:          LD    A,STNH         ;GET STATE DATA
0529 0E      1719              TESTP ZF             ;NO MODE?
052A AC      1720              B     B8END          ;ALL DONE
052B A7      1721              B     B8             ;NOT SYSTEM READY
             1722 ; ALL MODE OVER
052C 2D00    1723 B8END:       ST    #0,STNL        ;CLEAR CONTRL CODE
052E 64E5    1724              B     FR             ;DONE
             1725 ;
             1726 ;----------
             1727 ; (DLT) KEY CHECK AND (TX) KEY CHECK
             1728 ;----------
0530 00      1729 MW:          NOP                  ;MEMORY WRITE MODE
0531 DB      1730 DELAT:       CMPR  A,#DLTK        ;TEST IF DELAT MODE?
0532 83      1731              B     TXN            ;NO
             1732 ;DELAT THE MEMORY
0533 2117    1733              CALL  MRT            ;GET MEMORY ADDR
0535 57      1734              CLR   @HL,EMPT       ;AND CLEAR MEMORY INUSE FLAG
0536 64D2    1735              B     FB             ;ALL DONE
             1736 ;
             1737 ;----------
             1738 ; TX KEY CONTROL
             1739 ;----------
0538 DD      1740 TXN:         CMPR  A,#TXK         ;TEST IF TX KEY?
0539 65BD    1741              B     ENT2           ;NO..ERROR
             1742                                   ;YES
053B 228A    1743              CALL  CSV            ;SAVE THE CH. DATA
053D 3938    1744              SET   SY4,ZSP        ;SELECT ZERO SUPPRESS
053F 2029    1745              CALL  CLC            ;CLEAR CH. MEMORY

ROM PAGE NO.21 *

0541 2042    1746              CALL  DSTX           ;DISPLAY TX INDICATOR
0543 2240    1747              CALL  DTB            ;DECIMAL CONVERSION AND READ
0545 65BD    1748              B     ENT2           ;NO...ERROR
0547 2293    1749              CALL  CHRS           ;RESTORE CH. DATA
0549 2117    1750              CALL  MRT            ;GET CH. MEMORY ADDR SET
054B 7D      1751              CALLS ATX            ;MAKE IT TX ADDR POINTER
054C 20FF    1752              CALL  STA            ;AND SAVE DATA
054E 2134    1753              CALL  ABLNK          ;AND ALL CLEAR CH DISPLAY
0550 3938    1754              SET   SY4,ZSP        ;ZERO SUPPRESS SET
```

```
0552 2C39    1755         CALL   CLC            ;CLEAR DISPLAY MEMORY
0554 204A    1756         CALL   DSRX           ;RX INDICATOR ON
0556 2240    1757         CALL   DTB            ;READ AND CONVERT
0558 65BD    1758         B      ENT2           ;NO..ERROR
             1759                               ;YES
055A C1      1760         LD     H,#PAG1
055B EF      1761         LD     L,#AREG+3
055C 53      1762         SET    @HL,EMPT       ;SET CH. INUSE FLAG
             1763                               ;SET CH. RX DATA
055D 2293    1764         CALL   CHRS
055F 2117    1765         CALL   MRT
0561 33BD    1766         ADD    L,#-3          ;SET MEMORY OFFSET
0563 20FF    1767         CALL   STA            ;SAVE DATA
0565 2134    1768         CALL   ABLNK          ;ALL CLEAR DISPLAY
0567 2090    1769 C1:     CALL   RKBD           ;READ KEY DATA
0569 A7      1770         B      C1             ;WAITE FOR KEY OP
             1771                               ;SET TONE 1/0
056A CD      1772         LD     H,#PAG9
056B E0      1773         LD     L,#SEG16
056C 3C74    1774         LD     A,KNEW         ;GET KEY DATA
056E 0E      1775         TESTP  ZF             ;KEY =0 ?
056F B5      1776         B      DS0            ;YES
             1777                               ;NO..CHECK THE =1
0570 D1      1778         CMPR   A,#1           ;TEST IF IT?
0571 65BD    1779         B      ENT2           ;NO..ERROR
             1780                               ;SET ADDR POINTER
0573 CC      1781         LD     H,#PAG8
0574 EE      1782         LD     L,#SEG14
0575 50      1783 DS0:    SET    @HL,S1         ;SET TONE E/D INDICATOR
0576 3938    1784         SET    SY4,ZSP        ;READ IN ZERO SUPPRESS
0578 2039    1785         CALL   CLC            ;CLEAR CH. MEMORY
057A 2240    1786         CALL   DTB            ;AND CONVERT TO BINARY
057C 65BD    1787         B      ENT2           ;NO..ERROR
             1788                               ;GET THE TONE DATA
057E C1      1789         LD     H,#PAG1
057F E0      1790         LD     L,#D0

ROM PAGE NO.22

0580 F1      1791         ST     #1,@HL+
0581 3C1C    1792         LD     A,AREG
0583 1A      1793         ST     A,@HL+
0584 3C1D    1794         LD     A,AREG+1
0586 3833    1795         AND    A,#B'0011
0588 0F      1796         ST     A,@HL
0589 CC      1797         LD     H,#PAG8
058A EE      1798         LD     L,#SEG14       ;GET TONE E/D FLAG ADDR
058B 58      1799         TEST   @HL,S1         ;TEST IF E/D?
058C 91      1800         B      C2             ;NO
058D C1      1801         LD     H,#PAG1
058E E2      1802         LD     L,#D2
058F 3364    1803         OR     @HL,#B'0100    ;SET EN/DECODE FLAG
0591 212C    1804 C2:     CALL   TRN            ;AND TRANSFER COMAND
             1805 ; READ PLL SWITCH DATA CODE
0593 2134    1806         CALL   ABLNK          ;BLANK DISPLAY
0595 C7      1807         LD     H,#PAG7        ;GET PAGE ADR
0596 EA      1808         LD     L,#CH          ;GET CH. ADR PTR
0597 FF      1809         ST     #15,@HL+       ;BLANK
0598 FB      1810         ST     #11,@HL+       ;"S" DISPLAY
0599 2141    1811         CALL   ZDSP           ;DISPLAY DATA
059B 367F    1812         EICLR  IL,B'111111    ;EIN
059D 2039    1813         CALL   CLC            ;CLEAR CH. DISPLAY
059F 2090    1814 RSWDAT: CALL   RKBD           ;READ KEY
05A1 9F      1815         B      RSWDAT         ;NOT READY
05A2 3C74    1816         LD     A,KNEW         ;GET DATA
05A4 380C    1817         ADD    A,#12          ;CHECK >4?
05A6 A8      1818         B      RSD1           ;YES
05A7 BD      1819         B      ENT2           ;NO..ERROR
             1820 ;
05A8 3804    1821 RSD1:   ADD    A,#4           ;CLEAR UPER BITS
05AA 3F7A    1822         ST     A,CH           ;SAVE DIGIT
```

```
05AC 2143      1823            CALL   DDSP              ;DISPLAY DATA
05AE 3C1A      1824            LD     A,OLD             ;GET CH. DATA
05B0 31        1825            XCH    A,L               ;AND ITS ADDR
05B1 CC        1826            LD     H,#PAG8           ;GET SWITCH TABLE ADR
05B2 0C        1827            LD     A,@HL             ;AND GET FLAG DATA
05B3 3871      1828            AND    @HL,#B'0001       ;CLEAR IGNORE DATA
05B5 3C74      1829            LD     A,KNEW
05B7 06        1830            TEST   CF
05B8 05        1831            ROLC   A
05B9 1D        1832            OR     A,@HL             ;SET DATA
05BA 0F        1833            ST     A,@HL             ;AND SAVE IT.
05BB 64D2      1834            B      FB                ;ALL DONE
               1835   ;
               1836   ;---------
               1837   ; ERROR KEY OPERATION DISPLAY
               1838   ;---------
05BD 2134      1839   ENT2:    CALL   ABLNK             ;DISPLAY ALL BLANKING
05BF 2060      1840            CALL   ERR               ;DISPLAY ERROR

ROM PAGE NO.23 *

05C1 2293      1841            CALL   CHRS              ;RESTORE CH. DATA
05C3 64D6      1842            B      FE                ;AND READ BIGINNING OF COMAND
               1843   ;
               1844   ;
               1845   ;---------
               1846   ; SET UP MODULE
               1847   ;       SELECT THE CH# 1 AND RECIVER MODE
               1848   ;---------
05C5 72        1849   SETUP:   CALLS  P1                ;STOP TC1
05C6 73        1850            CALLS  P2                ;STOP TC2
05C7 C7        1851            LD     H,#PAG7           ;GET PAGE ADDR
05C8 E0        1852            LD     L,#PRI            ;SET PRIORITY CH. DATA
05C9 F1        1853            ST     #1,@HL+           ;SET PRIORITY CH. # = 1
05CA F0        1854            ST     #0,@HL+           ;AND CLEAR MOD
05CB F1        1855            ST     #1,@HL+           ;NORMAL CH. 1
05CC F0        1856            ST     #0,@HL+           ;SET
05CD 40        1857            LD     A,#0
05CE C1        1858            LD     H,#PAG1
05CF E3        1859            LD     L,#D3
05D0 1B        1860   C3:      ST     A,@HL-
05D1 90        1861            B      C3                ;CLEAR RAM
05D2 2D10      1862            ST     #1,STNL           ;CLEAR CONTROL FLAG
05D4 21CC      1863            CALL   MUTA              ;SET MUTE AND TX TO PLL
05D6 213F      1864            CALL   CDSP              ;DISPLAY CH. DATA
               1865   ;
               1866   ;---------
               1867   ; FUNCTION MODE #1 CONTROL (F1)
               1868   ;        KEY-LOCK OPERATION
               1869   ;        (F1) IS USED ONLY TOW OPERATION
               1870   ;             1.  TX  CONTROL
               1871   ;             2.  RX  CONTROL
               1872   ;---------
05D8 231E      1873   F1:      CALL   HTEST             ;TEST HOLD MODE
05DA 3B94      1874            TEST   %R4,TXI           ;RX STATE OR RX TO TX ?
05DC A9        1875            B      F1EXT             ;YES
05DD 3B88      1876            TEST   %R8,TX            ;NO..TEST IF TX STATE ?
05DF 93        1877            B      F1                ;YES
               1878   ; CHANGE THE MODE TO RECIVER
05E0 39C0      1879            TESTP  STNL,SDN          ;TEST IF RX CHANGE?
05E2 A9        1880            B      F1EXT             ;NO
05E3 3900      1881            SET    STNL,SDN          ;YES..SET FLAG
05E5 21CC      1882            CALL   MUTA              ;SET MUTE AND TX TO PLL
05E7 367F      1883            EICLR  IL,B'111111       ;EIN
05E9 00        1884   F1EXT:   NOP                      ; (F1) DONE
               1885   ;---------
               1886   ; FUNCTION MODE #4 CONTROL
               1887   ;        TXI OUTPUT CONTRL
               1888   ;        WAITE FOR 200(MS)
               1889   ;---------
05EA 3999      1890   F4:      TEST   SY1,T02           ;TEST IF 200(MS) COUNT?
```

```
05EC E5      1891            B       F4EXT           ;NO
             1892  ; CHECK FOR TX MODE
05ED 36BF    1893            DICLR   IL,B'111111     ;YES..DIS. INTR
05EF 3B88    1894            TEST    %R8,TX          ;TX REQ?
05F1 98      1895            B       F1              ;YES
05F2 72      1896            CALLS   P1              ;NO..STOP COUNT
05F3 3959    1897            CLR     SY1,TO2         ;RESET COUNT FLG
05F5 367F    1898  F4EXT:    EICLR   IL,B'111111     ;DONE
05F7 3C01    1899            LD      A,STNH          ;GET STATE DATA
05F9 D3      1900            CMPR    A,#REV          ;REVIUE MODE?
05FA BC      1901            B       F6              ;NO
05FB 98      1902            B       F1              ;YES..MASK CONTROL
             1903  ;
             1904  ;--------
             1905  ; TONE/SQ DETECTOR CONTROL MODULE
             1906  ;        IF THE TX MODE ENCODE TONE,
             1907  ;        RX MODE DETECT SQ OR DECODE TONE.
             1908  ;--------
05FC 39D7    1909  F6:       TESTP   DRS,TXRX        ;NO...SERIAL TRANS ?
05FE 666E    1910            B       F6EX2           ;     YES

ROM PAGE NO.24

0600 39F9    1911            TESTP   SY1,AT          ;TEST IF AUTO SCAN MODE?
0602 667D    1912            B       F2              ;YES
             1913  ; CHECK THE TONE/SQ SIGNAL
0604 36BF    1914            DICLR   IL,B'111111     ;DIN
0606 3BF8    1915            TESTP   %R8,BUSY        ;TEST IF CPU 2 BUSY?
0608 666E    1916            B       F6EX2           ;YES
060A 3BA5    1917            TEST    %R5,TEQ         ;NO..TEST IF EQUAL TONE?
060C B4      1918            B       CSM             ;   NO
060D 395B    1919            CLR     SY3,SQF         ;RESET SQ DETECTION FLAG
060F 3B44    1920            CLR     %R4,MUTE        ;   YES..OPEN MUTE
0611 7E      1921            CALLS   TP0             ;CHECK PRI. EMPTY?
0612 AD      1922            B       SER4            ;YES
0613 2310    1923            CALL    PRIEQ
0615 A1      1924            B       F6DSP           ;DISPLAY PRI. CH DATA
0616 C0      1925            LD      H,#PAG0         ;GET PAGE ADR
0617 EB      1926            LD      L,#SY3          ;GET SYSTEM CTL FLG ADR
0618 53      1927            TEST    @HL,DWF         ;TEST IF DUAL WATCH ?
0619 AD      1928            B       SER4            ;NO
061A 39FB    1929            TESTP   SY3,DWFS        ;TEST IF DUAL WATCH MODE?
061C AD      1930            B       SER4            ;YES
061D E0      1931            LD      L,#STNL         ;GET ADR OF STATE DATA
061E 59      1932            TEST    @HL,PIR         ;PRI. WATCH?
061F A4      1933            B       SER2            ;NO
0620 52      1934            SET     @HL,DPIR        ;YES..SET PRI. RECIVE FLAG
0621 213F    1935  F6DSP:    CALL    CDSP            ;DISPLAY CH. DATA
0623 AD      1936            B       SER4            ;DONE
0624 7E      1937  SER2:     CALLS   TP0             ;PRIORITY INUSE?
0625 AD      1938            B       SER4            ;NO
             1939  ; SET MODE DUAL WATCH
0626 2310    1940            CALL    PRIEQ
0628 AD      1941            B       SER4            ;DONE
0629 393B    1942  SER3:     SET     SY3,DWFS        ;YES..SET FLG
062B 201A    1943            CALL    SET3S           ;SET 3SEC TIMER
062D C1      1944  SER4:     LD      H,#PAG1         ;GET PAGE ADR
062E E0      1945            LD      L,#D0           ;GET TEMP ADR
062F F7      1946            ST      #7,@HL+         ;AND SET TIME OUT COUNTER
0630 3947    1947            CLR     DRS,RDEC        ;CLEAR DEC. REQ FLAG
0632 666C    1948            B       RQDEC           ;DONE
             1949  ; CHECK THE SQUELTI MODE
0634 3B04    1950  CSM:      SET     %R4,MUTE        ;NO SIGNAL MUTE
0636 C1      1951            LD      H,#PAG1         ;SET RAM PAGE ADDR
0637 E0      1952            LD      L,#D0           ;GET TEMP ADR
0638 0A      1953            INC     @HL             ;INCRS. AND TEST IF TIME OUT?
0639 666C    1954            B       RQDEC           ;&SET NEXT DECODING MODE
             1955  ; SQ COUNT ERROR DETECTION
063B 337B    1956            CLR     SY3,DWFS        ;CLEAR WATCH FLAG
063D 3B04    1957            SET     %R4,MUTE        ;CLOSE MUTE SIGNAL
063F 3B8B    1958            TEST    SY3,DWF
```

ROM PAGE NO.25 *

```
0641 E6        1959              B     F6SCN
0642 3990      1960              TEST  STNL,PIR          ;TEST THE PRIORITY ON?
0644 A0        1961              B     NPR1              ;NO
0645 39A0      1962              TEST  STNL,DPIR         ;CHECK PRI. DISPLAYED?
0647 8E        1963              B     ODZ               ;NO
0648 3987      1964              TEST  DRS,RDEC          ;CHECK TH
064A 93        1965              B     SETSOF            ;NO
               1966   ;CLEAR PRIORITY INDICATOR
064B 2310      1967              CALL  PRIEQ
064D 9C        1968              B     SER1              ;DOBNE
064E 3950      1969   ODZ:       CLR   STNL,PIR          ;YES..CLEAR INDICATOR
0650 21CC      1970   ODATA:     CALL  MUTA              ;OUTPUT RECIVER PLL DATA
0652 AE        1971              B     F6EX2             ;DONE
               1972   ; SENCE THE SQUELTI OFF
0653 C0        1973   SETSOF:    LD    H,#PAG0           ;YES..GET PAGE ADR
0654 E0        1974              LD    L,#STNL           ;GET CTL FLAG ADR
0655 55        1975              CLR   @HL,PIR           ;RESET PRI. CHECK FLAG
0656 56        1976              CLR   @HL,DPIR          ;RESET PRI. DISPLAY FLAG
               1977   ; NOT AUTO SCANNING MODE
0657 21CC      1978   SETSQ1:    CALL  MUTA              ;OUTPUT PLL DATA
0659 213F      1979              CALL  CDSP              ;AND DISPLAY CH. DATA
065B AE        1980              B     F6EX2             ;DONE
               1981   ; CHECK THE SQ OFF TIMER
065C C1        1982   SER1:      LD    H,#PAG1
065D E0        1983              LD    L,#D0             ;GET TIMER ADR
065E FF        1984              ST    #-1,@HL+          ;AND SET TIMER
065F AC        1985              B     RODEC             ;DONE
               1986   ; NOT PRIORITY CHANNEL MODE
0660 36BF      1987   NPRI:      DICLR IL,B'111111       ;MASK INTERRPTION
0662 78        1988              CALLS TAS               ;SCAN MODE?
0663 A7        1989              B     NPR1              ;NO
0664 3939      1990   NPR2:      SET   SY1,AT            ;YES..SET SCAN FLAG
0666 AE        1991              B     F6EX2             ;DONE
               1992   ;PRIORITY CHECK
0667 7E        1993   NPR1:      CALLS TPO               ;PRI. SELECTED?
0668 9C        1994              B     SER1              ;NO
0669 3910      1995              SET   STNL,PIR          ;SET PRIORITY
066B 90        1996              B     ODATA             ;AND OUTPUT CHECK DATA
               1997   ;
               1998   ;--------------------------------
               1999   ; OUTPUT TONE DECODE COMAND
066C 22D5      2000   RODEC:     CALL  OTDC              ;DECODE TONE
               2001   ; CHECK THE KEY MODE
066E 00        2002   F6EX2:     NOP                     ;
066F 7E        2003              CALLS TPO               ;TEST IF PRI. ON?
0670 E3        2004              B     F6EX3             ;NO
0671 79        2005              CALLS TPR               ;YES..SET INDICATOR ADDR
0672 50        2006              SET   @HL,PD            ;AND SET
               2007   ; CHECK THE RETURN MODE
0673 00        2008   F6EX3:     NOP                     ;
0674 66AE      2009   F6EXT:     BS    F3                ;F6 ALL DONE
               2010   ; NORMAL CH. SQ OFF CONTROL
0675 36DF      2011   F6SCN:     DICLR IL,B'111111       ;MASK INTERRPTION
0678 78        2012              CALLS TAS               ;SCAN?
0679 9C        2013              B     SER1              ;NOT AT MODE
067A 3960      2014              CLR   STNL,DPIR         ;RESET PRI. DISPLAY FLAG
067C 64        2015              B     NPR2              ;DONE
               2016   ;
               2017   ;--------
               2018   ; RECIVER AUTO-SCAN AND CONTROL MODULE
               2019   ;         FUNCTION MODE #2 (F2)
               2020   ;--------
067D 3BF8      2021   F2:        TESTP %R8,BUSY          ;DECODER BUSY?
067F AC        2022              B     F2EXT             ;YES..CHECK NEXT MODE
               2023   ; CHECK THE STATION
```

ROM PAGE NO.26

```
0680 3BE5      2024              TESTP %R5,TEQ           ;NO..SQ ="L" ?
```

```
06C2 9C        2025              B      F2S01        ;YES..STOP AUTO SCAN MODE
               2026 ; NEXT CHANNL SERCH
06C3 39A9      2027              TEST   SY1,ATP      ;NO..PRIORITY CHECK?
06C5 8D        2028              B      F2NR1        ;    NO
06C6 3969      2029              CLR    SY1,ATP      ;    YES
06C8 201A      2030              CALL   SET3S        ;PRI. CHECK TIMER SET
06CA 3910      2031              SET    STNL,PIR     ;SET P-FLAG
06CC 97        2032              B      F2NR3        ;DONE
               2033 ; NORMAL CH. SCAN CONTROL
06CD 3950      2034 F2NR1:       CLR    STNL,PIR     ;PRIORTY NOT SEL.
06CF 22F2      2035 F2NR2:       CALL   CHINC        ;INCRS. CH. DATA
06D1 21AF      2036 C4:          CALL   FS           ;TEST IF SCAN CH.?
06D3 AC        2037              B      F2EXT        ;NO
               2038 ;
06D4 2117      2039              CALL   MRT          ;TEST IF MEMORY EMPTY?
06D6 8F        2040              B      F2NR2        ;YES..FIND NEXT CH.
06D7 21CC      2041 F2NR3:       CALL   MUTA         ;SET MUTE AND TX TO PLL
06D9 213F      2042              CALL   CDSP         ;DISPLAY CH. DATA
06DB AC        2043              B      F2EXT        ;DONE
               2044 ;--------
               2045 ; SQUELTI SIGNAL TURN DETECT
06DC C0        2046 F2SQ1:       LD     H,#PAG0
06DD E7        2047              LD     L,#DRS
06DE 54        2048              CLR    @HL,RDEC
06DF E9        2049              LD     L,#SY1
06A0 57        2050              CLR    @HL,AT
06A1 56        2051              CLR    @HL,ATP
06A2 EB        2052              LD     L,#SY3
06A3 E0        2053              LD     L,#STNL
06A4 59        2054              TEST   @HL,PIR      ;TEST IF PRIORITY SQ?
06A5 AA        2055              B      F2DWF        ;NO
06A6 52        2056              SET    @HL,DPIR     ;YES..SET PRI. DISPLAY FLG
06A7 213F      2057              CALL   CDSP         ;DISPLAY CH. DATA
06A9 AC        2058              B      F2EXT        ;DONE
               2059 ; SET DUAL WATCH MODE
06AA 390B      2060 F2DWF:       SET    SY3,DWF      ;PRESET FLAG
06AC 3C7F      2061 F2EXT:       EICLR  IL,B'111111  ;AND GO OUT PGM
               2062 ;
               2063 ;--------
               2064 ; FUNCTION MODE #3 CONTROL MODULE (F3)
               2065 ;     READ KEY-BOARD COMAND
               2066 ;     1   PRI   SELECT PRIORITY CH.
               2067 ;     2   RST   RECALL RRTORITY CH. & SCAN
               2068 ;     3   SCN   AUTO SCAN
               2069 ;     4   RVW   SCANNING CH. DISPLAY
               2070 ;     5   ENT   CH. DATA ENTRY
               2071 ;     6   DLT   SELECTED MODE DELAT
               2072 ;--------
06AE 2090      2073 F3:          CALL   RKBD         ;KEY-READ & CHECK HIT ?
06B0 67D5      2074              B      F3EXT        ;NO
               2075 ; CHECK THE KEY COMAND SSC.
06B2 3C8F      2076              DICLR  IL,B'111111  ;DISABLE TO INTR.
06B4 223A      2077              CALL   CSV          ;YES..SAVE CH. NUMBER
06B6 3C74      2078              LD     A,KNEW       ;AND GET NEW KEY DATA
06B8 DD        2079              CMPR   A,#H'D       ;RST KEY?
06B9 0E        2080              TESTP  ZF           ;TEST IF FLAG
06BA 8D        2081              B      F3CHK        ;YES..(RST) KEY FINDED
06BB 2D0E      2082              ST     #0,SY5       ;CLEAR FLAG
               2083 ; READ KEY DATA
06BD 3306      2084 F3CHK:       ADD    A,#6         ;KEY DATA > 9?
06BF 677F      2085              B      NB1          ;NO

ROM PAGE NO.27 *

06C1 06        2086              TEST   CF           ;YES..RESET CARRY
06C2 05        2087              ROLC   A
06C3 22AB      2088              CALL   AJ
06C5 66D1      2089              BS     ENT1         ;ENTRY KEY DOCODE
06C7 66F3      2090              BS     DLT1         ;DELEAT MODE
06C9 6713      2091              BS     PRIOTY       ;PRIORITY CONTROL
06CB 6717      2092              BS     RST          ;MODE RESTORE KEY
```

```
06CD  672C       2093              BS     SCN              ;AUTO SACN CONTROL
06CF  6766       2094              BS     RV               ;SCAN CH. REVIUE CTL
                 2095      ;--------
                 2096      ; ENTRY KEY DETECTION
                 2097      ;--------
06D1  7B         2098      ENT1:   CALLS  TP0              ;TEST IF PRI. EMPTY?
06D2  67D5       2099              B      F3EXT            ;YES..ALL DONE
                 2100      ; PRIORITY CH. IN USED/ OPERATION TO SELECTED
06D4  39E0       2101              TESTP  STNL,DPIR        ;TEST IF PRI. SET ALREADY?
06D6  67D5       2102              B      F3EXT            ;YES..ALL DONE
06D8  C0         2103              LD     H,#PAG0          ;GET PAGE ADR
06D9  E9         2104              LD     L,#SY1           ;GET CONTROL FLAG ADR
06DA  57         2105              CLR    @HL,AT           ;AND CLEAR ALL FLAGS
06DB  56         2106              CLR    @HL,ATP          ;CLEAR FLAF
06DC  EB         2107              LD     L,#SY3
06DD  54         2108              CLR    @HL,DWF
06DE  E0         2109              LD     L,#STNL
06DF  51         2110              SET    @HL,PIR          ;SET PRIORITY RECIVE FLG
06E0  52         2111              SET    @HL,DPIR         ;AND SET DISPLAY FLG
06E1  3C78       2112              LD     A,PRI            ;GET PRIO. CH. DATA
06E3  3F7A       2113              ST     A,CH             ;AND SET SAME CH DATA
06E5  21CC       2114              CALL   MUTA             ;AND OUTPUT MUTE
06E7  213F       2115              CALL   CDSP             ;DISPLAY CH. DATA
06E9  3E7F       2116              EICLR  IL,B'111111      ;ENABLE INTR
06EB  39C7       2117      ENT10:  TESTP  DRS,TXRX         ;TEST IF SIO BUSY?
06ED  A5         2118              B      ENT10            ;YES...WAITE FOR READY
06EE  C1         2119              LD     H,#PAG1          ;NO..GET PAGE ADR
06EF  EC         2120              LD     L,#DC            ;GET ERROR CHECK COUNTER ADR
06F0  F4         2121              ST     #4,@HL+          ;AND SET
06F1  67D5       2122              B      F3EXT            ;DONE
                 2123      ;
                 2124      ;--------
                 2125      ; DELAT FUNCTION
                 2126      ;--------
06F3  3C01       2127      DLT1:   LD     A,STNH
06F5  0E         2128              TESTP  ZF               ;TEST IF NO MODE?
06F6  670F       2129              B      DLT30            ;YES
06F8  D5         2130              CMPR   A,#PR            ;PRIORTY SELECT MODE?
06F9  67CC       2131              B      F3ERR            ;NO
06FB  7E         2132              CALLS  TP0              ;YES..DELAT PRIORTY CH.
06FC  57         2133              CLR    @HL,PEMPT
06FD  79         2134              CALLS  TPR              ;SET PRIORITY IND. ADDR
06FE  54         2135              CLR    @HL,PD           ;CLEAR PRIORITY INDICATOR
06FF  C0         2136              LD     H,#PAG0

ROM PAGE NO.28

0700  E0         2137              LD     L,#STNL
0701  5A         2138              TEST   @HL,DPIR         ;TEST IF PRI. RECIVED?
0702  87         2139              B      DLT10            ;NO
0703  3C78       2140              LD     A,PRI            ;YES..GET PRI. CH. DATA
0705  3F7A       2141              ST     A,CH             ;AND SET SAME CH.
0707  3879       2142      DLT10:  AND    @HL,#B'1001      ;CLEAR (PIR,DPIR FLAG)
0709  EB         2143              LD     L,#SY3
070A  3874       2144              AND    @HL,#B'0100      ;CLEAR (DWF,SQF,DWFS)
070C  2D01       2145              ST     #0,STNH          ;CLEAR CONTROL MODE TEMP
070E  91         2146              B      DLT40            ;DONE
                 2147      ;
070F  2041       2148      DLT30:  ST     #DL,STNH
0711  67D5       2149      DLT40:  BS     F3EXT            ;DONE
                 2150      ;
                 2151      ;--------
                 2152      ; PRIORITY SELECT COMAND
                 2153      ;--------
0713  2D51       2154      PRIOTY: ST     #PR,STNH         ;SET PRI. SELECTION MODE
0715  67D5       2155              B      F3EXT            ;ALL DONE
                 2156      ;
                 2157      ;--------
                 2158      ; RESET & RESTORE PRIORTY-SCAN TUNNING
                 2159      ;--------
```

```
0717 2D01      2160 RST:      ST    #0,STNH         ;CLEAR MODE
0719 399E      2161           TEST  SY5,1           ;RESTORE PRI. CH.
071B A0        2162           B     RST10           ;NO
071C 7E        2163           CALLS TPO             ;YES..GET ADR
071D 53        2164           SET-  @HL,PEMPT       ;AND SET
071E 79        2165           CALLS TPR             ;GET PRI. INDICATOR ADR
071F 50        2166           SET   @HL,PD          ;AND SET
               2167 ;
0720 393E      2168 RST10:    TEST  SY5,SCAN        ;SCAN?
0722 A5        2169           B     RST20           ;NO
0723 70        2170           CALLS TAS             ;YES
0724 50        2171           SET   @HL,SCAN        ;SET FLAG
               2172 ;
0725 39BE      2173 RST20:    TEST  SY5,AT          ;AT?
0727 AA        2174           B     RST30           ;NO
0728 3939      2175           SET   SY1,AT          ;YES..RESTORE AT FLAG
072A 67D5      2176 RST30:    BS    F3EXT           ;ALL DONE
               2177 ;
               2178 ;--------
               2179 ; AUTO SCAN PROCESOR
               2180 ;--------
072C 79        2181 SCN:      CALLS TAS             ;AS MODE?
072D 6743      2182           B     SCN1            ; NO
072F 54        2183           CLR   @HL,SCAN        ;YES..CLEAR AS MODE
0730 3979      2184           CLR   SY1,AT
0732 394B      2185           CLR   SY3,DWF         ;RESET DUAL WATCH MODE
0734 7E        2186           CALLS TPO             ;PRI. INUSE?
0735 6762      2187           B     SCN2            ;NO
0737 2310      2188           CALL  PRIEQ
0739 8E        2189           B     SCNPRI          ;PRI.. RECIVED
073A 390B      2190           SET   SY3,DWF         ;SET MODE DUAL WATCH
073C 6762      2191           B     SCN2            ;DONE
               2192 ; SET MODE PRIORITY CH. SET
073E 3C78      2193 SCNPRI:   LD    A,PRI           ;GET DATA

ROM PAGE NO.29

0740 3F7A      2194           ST    A,CH            ;AND SAME CH. SET
0742 A2        2195           B     SCN2            ;DONE
               2196 ;
0743 50        2197 SCN1:     SET   @HL,SCAN        ;SET MODE AT
0744 3C01      2198           LD    A,STNH          ;GET STATE DATA
0746 D4        2199           CMPR  A,#DL           ;DELATE SCAN?
0747 8D        2200           B     SCNMSK          ;NO
0748 CC        2201           LD    H,#PAG8         ;YES..GET PAGE ADR
0749 E9        2202           LD    L,#SEG9         ;GET MASK FLAG ADR
074A 57        2203 C5:       CLR   @HL,CMSK        ;CLEAR MASK BIT
074B 19        2204           DEC   L               ;SET NEXT ADR
074C 8A        2205           B     C5              ;LOOP TILL ALL CLEAR
074D 3950      2206 SCNMSK:   CLR   STNL,PIR        ;CLEAR PRI. CHECK FLAG
074F 3960      2207           CLR   STNL,DPIR       ;CLEAR PRI. DISPLAY FLAG
0751 3939      2208           SET   SY1,AT
0753 22F2      2209 NSCA:     CALL  CHINC           ;INCRS. CHANNEL ADR
0755 2117      2210           CALL  MRT             ;TEST IF MEMORY EMPTY?
0757 93        2211           B     NSCA            ;YES
0758 7E        2212 SNC1:     CALLS TPO             ;PRIORITY SEL?
0759 9E        2213           B     SNC2            ;YES
075A 201A      2214           CALL  SET3S           ;SET 3 - SEC TIMER
075C 393B      2215           SET   SY3,DWFS        ;DUAL WATCH SET
075E 21CC      2216 SNC2:     CALL  MUTA            ;TRANSFER PLL DATA
0760 213F      2217           CALL  CDSP            ;DISPLAY CH. DATA
0762 2D01      2218 SCN2:     ST    #0,STNH         ;RESET CONTROL DATA
0764 67D5      2219           B     F3EXT           ;AND ALL DONE
               2220 ;
               2221 ;--------
               2222 ; REVIEW THE SCANNING CH. & DISPLAY
               2223 ;--------
0766 3959      2224 RV:       TESTP SY1,AT
0768 67D5      2225           B     F3EXT           ;DONE
               2226 ; SELECT MODE
076A 79        2227           CALLS TPR             ;GET PRI. INDICATOR ADR
```

```
076B 54      2228           CLR   @HL,PD        ;AND RESET INDICATOR
076C C0      2229           LD    H,#PAG0       ;GET PAGE ADR
076D EB      2230           LD    L,#SY3        ;GET CTL ADR
076E 57      2231           CLR   @HL,DWFS      ;CLEAR MODE FLAG
076F 55      2232           CLR   @HL,SQF       ;AND SQF CLEAR
0770 E0      2233           LD    L,#STNL       ;GET FLAG ADR
0771 56      2234           CLR   @HL,DPIR      ;RESET PRI. DISPLAY FLAG
0772 2D31    2235           ST    #REV,STHH     ;SET CONTROL MODE
0774 391A    2236           SET   SY2,MD
0776 228A    2237           CALL  CSV           ;SAVE CHANNEL DATA
0778 4F      2238           LD    A,#-1         ;GET CHANNEL DATA
0779 3F7A    2239           ST    A,CH
077B 21C3    2240           CALL  T500          ;SET 500(MS) TIMER
077D 67D5    2241           B     F3EXT         ;DONE
             2242   ;--------
             2243   ; NUMBER KEY-DETECTION
             2244   ;--------
077F 3C01    2245   NB1:    LD    A,STNH        ;(N)/GET CTL FLAGS

ROM PAGE NO.30 *

0781 0E      2246           TESTP ZF            ;TEST IF NO SEL.?
0782 AB      2247           B     NB1FST        ;YES
0783 D4      2248           CMPR  A,#DL         ;NO..DELAT ?
0784 8B      2249           B     NB1PR         ;   NO
0785 3C74    2250           LD    A,KNEW        ;   YES
0787 31      2251           XCH   A,L
0788 CC      2252           LD    H,#PAG8
0789 53      2253           SET   @HL,CMSK      ;AUTO SCAN MASK REG. SET
078A AB      2254           B     NB1FST        ;DONE
             2255   ; CHECK THE PRIORITY SELECTION?
078B D5      2256   NB1PR:  CMPR  A,#PR         ;PRIORITY SEL ?
078C 67CC    2257           B     F3ERR         ;OPERATION ERROR
078E 3C74    2258           LD    A,KNEW        ;YES
0790 2121    2259           CALL  MRT1
0792 67CC    2260           B     F3ERR         ;MEMORY EMPTY ERROR
0794 79      2261           CALLS TPR           ;GET ADR PTR
0795 50      2262           SET   @HL,PD        ;SET PRIORITY INDICATOR
0796 3C74    2263           LD    A,KNEW        ;GET PAGE ADR
0798 C7      2264           LD    H,#PAG7       ;GET PRIORITY CH. ADR
0799 E8      2265           LD    L,#PRI
079A 1A      2266           ST    A,@HL+        ;AND SAVE IT
079B F8      2267           ST    #8,@HL+       ;AND SET CH. INUSE FLAG
079C 1A      2268           ST    A,@HL+        ;SET SAME CH.
079D F0      2269           ST    #0,@HL+       ;CLEAR UPER DIGIT
079E 39F9    2270           TESTP SY1,AT        ;AT ?
07A0 67CC    2271           B     F3ERR         ;YES
07A2 C0      2272           LD    H,#PAG0
07A3 EB      2273           LD    L,#SY3        ;GET FLAG WD ADR
07A4 54      2274           CLR   @HL,DWF
07A5 55      2275           CLR   @HL,SQF
07A6 E0      2276           LD    L,#STNL
07A7 51      2277           SET   @HL,PIR
07A8 52      2278           SET   @HL,DPIR      ;RESET ALL FLAG
07A9 67C5    2279           B     NB1F2         ;DONE
             2280   ; ONLY THE NUMBER KEY
07AB 3979    2281   NB1FST: CLR   SY1,AT        ;CLEAR AT FLAG
07AD 78      2282           CALLS TAS           ;SET ADR
07AE 54      2283           CLR   @HL,SCAN      ;CLEAR SCAN INDICATOR
07AF 3C74    2284           LD    A,KNEW        ;GET CH. DATA
07B1 2121    2285           CALL  MRT1          ;AND TEST
07B3 67CC    2286           B     F3ERR         ;MEMORY EMPTY
             2287   ; DISPLAT DIGIT
07B5 3C74    2288   NB1DSP: LD    A,KNEW        ;GET KEY DATA
07B7 3F7A    2289           ST    A,CH          ;AND SET CH. DATA
07B9 3960    2290           CLR   STNL,DPIR     ;CLEAR PRI. DISPLAY FLAG
07BB 3950    2291           CLR   STNL,PIR      ;CLEAR PRI. CHECK FLAG
07BD 7E      2292           CALLS TP0           ;TEST IF PRI. INUSE?
07BE 67C5    2293           B     NB1F2         ;NO
```

ROM PAGE NO.31

```
07C0 2310      2294             CALL   PRIEQ
07C2 85        2295             B      NB1F2           ;FIND PRI. CH
07C3 390B      2296             SET    SY3,DWF
07C5 21CC      2297  NB1F2:     CALL   MUTA            ;OUTPUT PLL DATA
07C7 213F      2298             CALL   CDSP            ;DISPLAY CH. DATA
07C9 2D01      2299             ST     #0,STNH         ;CLEAR CONTROL DATA
07CB 95        2300             B      F3EXT           ;DONE
               2301  ;
               2302  ;---------
               2303  ; KEY OPERATION ERROR SET
               2304  ;---------
07CC 2D01      2305  F3ERR:     ST     #0,STNH         ;CLEAR STATE (H)
07CE 2293      2306             CALL   CHRS            ;ERROR AND RESTORE CH. #
07D0 3928      2307             SET    SY4,CDF         ;SET CH. DISPLAY MARK
07D2 213F      2308             CALL   CDSP            ;AND DISPLAY CH. #
               2309  ;
               2310  ;--------
               2311  ; GO-OUT FUNCTION MODE #3
               2312  ;      KEY-DECODE & CONTROL IS ALL DONE.
               2313  ;
               2314  ;      SET    STN(H)....STATE SELECTOR
               2315  ;             STN(L)....FUCTION SELECTORE
               2316  ;--------
07D4 00        2317  KEYEXT:    NOP                    ;DONE
07D5 367F      2318  F3EXT:     EICLR  IL,B'111111     ;ENABLE TO INTR
07D7 65D8      2319             B      F1              ;ALL DONE
               2320  ;---------
               2321  ; ROM CONSTANT DATA TABLE
               2322  ;      LCD, KEY DATA AND DECIMAL DATA CONVERTER.
               2323  ;             A(7E0).....KEY DATA TABLE
               2324  ;             A(7E8).....LCD SEGMENT DATA TABLE
               2325  ;             A(7F8).....DECIMAL DATA TABLE
               2326  ;---------
```

ROM PAGE NO.31

```
07E0           2327             ORG    H'7E0
               2328  ;--------
               2329  ; KEY-BOARD KEY DECODER TABLE
               2330  ;--------
               2331  ;
               2332  ; KEY MATRIX DECODER TABLE LIST
               2333  ;-------------------------------------------------
               2334  ;CL/DIG I  D0   I  D1   I  D2   I  D3   I  COMMENT
               2335  ;-------+------+------+------+------+-------------
               2336  ;       I      I      I      I      I
               2337  ; K0    I  1   I  4   I  7   I  ENT I
               2338  ;       I (0)  I (4)  I (8)  I (12) I
               2339  ;-------+------+------+------+------+-------------
               2340  ;       I      I      I      I      I
               2341  ; K1    I  2   I  5   I  8   I  0   I
               2342  ;       I (1)  I (5)  I (9)  I (13) I
               2343  ;-------+------+------+------+------+-------------
               2344  ;       I      I      I      I      I
               2345  ; K2    I  3   I  6   I  9   I  DLT I
               2346  ;       I (2)  I (6)  I (10) I (14) I
               2347  ;-------+------+------+------+------+-------------
               2348  ;       I      I      I      I      I
               2349  ; K3    I  PRI I  RST I  SCN I  RVW I
               2350  ;       I (3)  I (7)  I (11) I (15) I
               2351  ;-------------------------------------------------
               2352  ;
               2353  ; KEY DATA REFERED THIS TABLE
               2354  ;      AND TABLE CONSTANT ARE CHEANGABLE.
               2355  ;
07E0 21        2356  KDEC:      DATA   H'21            ;KEY 0,1 DATA
07E1 C3        2357             DATA   H'C3            ;2,3
07E2 54        2358             DATA   H'54            ;4,5
07E3 D6        2359             DATA   H'D6            ;6,7
```

```
07E4  87      2360           DATA   H'87           ;8,9
07E5  E9      2361           DATA   H'E9           ;10,11
07E6  0A      2362           DATA   H'0A           ;12,13
07E7  FB      2363           DATA   H'FB           ;14,15
              2364   ;
```

ROM PAGE NO.31

```
07E8          2365           ORG    H'7E8
              2366   ;----------
              2367   ; LCD SEGMENT DISPLAY LIST
              2368   ;------------------------------------------------------------
              2369   ; DISPLAY #-I (8)  (7)  (6)--(5)  (4)  (3)  (2)  (1) I  ROM DATA
              2370   ;   SEG   I   -    F    G    E    D    C    B    A  I   (HEX)
              2371   ;-----------+---------------------------------------+----------
              2372   ;    0     I   0    1    0    1    1    1    1    1  I    5F
              2373   ;    1     I   0    0    0    0    0    1    1    0  I    06
              2374   ;    2     I   0    0    1    1    1    0    1    1  I    3B
              2375   ;    3     I   0    0    1    0    1    1    1    1  I    2F
              2376   ;    4     I   0    1    1    0    0    1    1    0  I    66
              2377   ;    5     I   0    1    1    0    1    1    0    1  I    6D
              2378   ;    6     I   0    1    1    1    1    1    0    0  I    7C
              2379   ;    7     I   0    1    0    0    0    1    1    1  I    47
              2380   ;    8     I   0    1    1    1    1    1    1    1  I    7F
              2381   ;    9     I   0    1    1    0    0    1    1    1  I    67
              2382   ;    P     I   0    1    1    1    0    0    1    1  I    73
              2383   ;    S     I   0    1    1    0    1    1    0    1  I    6D
              2384   ;    E     I   0    1    1    1    1    0    0    1  I    79
              2385   ;    R     I   0    0    1    1    0    0    0    0  I    30
              2386   ;-----------+---------------------------------------+----------
              2387   ;
              2388   ;---------
              2389   ; LCD DISPLAY SEGMENT DECODER
              2390   ;---------
07E8  5F      2391   LCDP:   DATA   H'5F           ;0
07E9  06      2392           DATA   H'06           ;1
07EA  3B      2393           DATA   H'3B           ;2
07EB  2F      2394           DATA   H'2F           ;3
07EC  66      2395           DATA   H'66           ;4
07ED  6D      2396           DATA   H'6D           ;5
07EE  7C      2397           DATA   H'7C           ;6
07EF  47      2398           DATA   H'47           ;7
07F0  7F      2399           DATA   H'7F           ;8
07F1  67      2400           DATA   H'67           ;9
07F2  73      2401           DATA   H'73           ;DISPLAY "P"
07F3  20      2402           DATA   H'20           ;DISPLAY "-"
07F4  79      2403           DATA   H'79           ;DISPLAY "E"
07F5  30      2404           DATA   H'30           ;DISPLAY "R"
07F6  00      2405           DATA   H'0            ;(14)
07F7  00      2406           DATA   H'0            ;(15)
              2407   ;
```

ROM PAGE NO.31

```
07F8          2408           ORG    H'7F8
              2409   ;---------
              2410   ; BINARY AND DECIMAL CONVERTION DATA TABLE
              2411   ;       CONVERT TO BINARY NUMBER TO DECIMAL
              2412   ;       AND BCD WAIGHT ROM CODE.
              2413   ;---------
              2414   ; CONVERTER REFERED THIS TABLE
07F8  1027    2415   DCIM:   DATA   H'10,H'27      ;DECIMAL 10,000
07FA  E803    2416           DATA   H'E8,3         ;DECIMAL 1,000
07FC  6400    2417           DATA   H'64,0         ;DECIMAL 100
07FE  0A00    2418           DATA   H'A,0          ;DECIMAL 10
              2419           END
```

ASSEMBLY COMPLETE,    0 PROGRAM ERROR(S)

SYMBOL TABLE

| Symbol | Addr | Symbol | Addr | Symbol | Addr | Symbol | Addr |
|---|---|---|---|---|---|---|---|
| A1 | 002B | A2 | 002F | A3 | 0073 | A4 | 007F |
| A5 | 0039 | A6 | 00AF | A7 | 00DE | A8 | 0136 |
| A9 | 013B | ABLNK | 0134 | AD | 0026 | AD1 | 0022 |
| AD2 | 0028 | AHR | 0036 | AJ | 02A9 | AMOV1 | 02FE |
| AMOV2 | 0307 | AMOV3 | 02CC | AR | 0075 | AREG | 001C |
| ASI | 003E | AT | 0003 | ATP | 0002 | ATX | 006E |
| B1 | 0237 | B2 | 0273 | B3 | 02E5 | B4 | 02E9 |
| B6 | 03C9 | B8 | 0527 | BSEND | 052C | B9 | 0501 |
| BSW | 0230 | BTD | 0265 | BTD10 | 026E | BTD20 | 027C |
| BUSY | 0003 | C1 | 0567 | C2 | 0591 | C3 | 05D0 |
| * C4 | 0691 | C5 | 074A | CDF | 0002 | CDS0 | 0159 |
| CDS1 | 016F | CDS2 | 0172 | CDS3 | 0165 | CDSP | 013F |
| CDSX | 0153 | CDX | 0158 | CDX1 | 0154 | CFOR2 | 0216 |
| CFORM | 01F0 | CH | 007A | CHDS | 03E3 | CHI1 | 02FB |
| CHINC | 02F2 | CHKCMD | 04F2 | CHRS | 0293 | CL | 0068 |
| CLA | 0066 | CLC | 0039 | CLX | 005E | CMSK | 0003 |
| CSM | 0634 | CSV | 028A | D0 | 0010 | D1 | 0011 |
| D2 | 0012 | D3 | 0013 | * DCIM | 07F8 | DDSP | 0143 |
| DEC1 | 018E | DEC2 | 0198 | * DELAT | 0531 | DF | 0001 |
| DIG | 0077 | * DIGT | 0006 | DL | 0004 | DLT1 | 06F3 |
| DLT10 | 0707 | DLT30 | 070F | DLT40 | 0711 | DLTK | 000B |
| * DN | 0000 | * DP | 0000 | DPIR | 0002 | DRC | 0177 |
| DRS | 0007 | DS0 | 0575 | DSRTX | 004C | DSRX | 004A |
| DSTX | 0042 | DTB | 0240 | DTB10 | 0241 | DTB20 | 024D |
| DTR | 0003 | DWF | 0000 | DWFS | 0003 | * ED | 0003 |
| EMPT | 0003 | ENT | 000A | ENT1 | 06D1 | ENT10 | 06EB |
| ENT2 | 05BD | * ER | 0003 | ERR | 0060 | ERRDS | 0061 |
| * ET | 0000 | * F0 | 04D0 | F1 | 05D3 | F1EXT | 05E9 |
| F2 | 067D | F2DWF | 06AA | F2EXT | 06AC | F2NR1 | 068D |
| F2NR2 | 063F | F2NR3 | 0697 | F2S01 | 069C | F3 | 06AE |
| F3CHK | 06BD | F3ERR | 07CC | F3EXT | 07D5 | * F4 | 05EA |
| F4EXT | 05F5 | F6 | 05FC | F6DSP | 0621 | F6EX2 | 066E |
| F6EX3 | 0673 | * F6EXT | 0674 | F6SCN | 0676 | FB | 04D2 |
| FE | 04D6 | FR | 04E5 | FS | 01AF | * FST | 0003 |
| * FSTC | 0002 | HACK | 0001 | HFLG | 0002 | HG1 | 000C |
| HG2 | 0004 | * HLDS | 000E | HOLD | 0010 | HRQ | 0002 |
| HTC1 | 0358 | HTC2 | 036D | HTC30 | 0367 | HTC31 | 0369 |
| HTC33 | 037D | HTC34 | 0384 | HTC35 | 03D0 | HTC40 | 03EC |
| HTC75 | 03F9 | HTC80 | 03FB | HTEST | 031E | HTEST1 | 0332 |
| I15 | 0489 | I20 | 048E | I26 | 0495 | I23 | 049E |
| I29 | 04A8 | I30 | 04AC | I4 | 0466 | I5 | 0474 |
| I6 | 0470 | I7 | 0478 | IC | 000F | * ID | 0000 |
| INIZ | 04AE | INT1 | 0333 | INT2 | 045F | IS0 | 0338 |
| KAZ | 0052 | KCDC | 006E | KD | 0070 | * KDEC | 07C0 |
| KEY | 0000 | * KEYEXT | 07D4 | KFLG | 0076 | KHZ1 | 009F |
| KHZ2 | 00A3 | KL | 0060 | KNEW | 0074 | KOF | 00FF |
| KON | 009C | KONF | 0000 | KSNS | 0001 | * KTN1 | 00F7 |
| * KTN2 | 00FB | LARCM | 01A3 | LCD1 | 001A | LCD2 | 001B |
| * LCDP | 07E8 | LDA | 0104 | LDDSP | 007C | * LG1 | 000D |
| * LG2 | 0005 | LOOP1 | 0154 | MADDS | 02B1 | * MATK | 0000 |
| MAXROM | 0003 | MD | 0001 | MDS | 0002 | MOVE | 010A |
| MRT | 0117 | MRT1 | 0121 | MRT2 | 0128 | MRT3 | 0129 |
| MUTA | 01CC | MUTA1 | 01CE | MUTE | 0000 | MV1 | 013C |
| MW | 0530 | * MWK | 000C | * MWM | 0001 | NE1 | 077F |
| * NB1DSP | 07B5 | NB1F2 | 07C5 | NB1FST | 07AB | NB1PR | 078B |
| * NMF | 0000 | NPR1 | 0667 | NPR2 | 0664 | NPRI | 0660 |
| NSCA | 0753 | * NTD | 0002 | ODATA | 0650 | ODZ | 064E |
| OLD | 001A | OTDC | 02D5 | OTDC1 | 02D7 | OTDC2 | 02DE |
| OTDC3 | 02EF | P1 | 0016 | P2 | 001E | PAG0 | 0000 |
| PAG1 | 0001 | * PAG10 | 000E | * PAG11 | 000F | * PAG12 | 000C |
| * PAG13 | 000D | * PAG14 | 000E | PAG15 | 000F | * PAG2 | 0002 |
| * PAG3 | 0003 | * PAG4 | 0004 | * PAG5 | 0005 | * PAG6 | 0006 |
| PAG7 | 0007 | PAG8 | 000C | PAG9 | 000D | PD | 0000 |
| FEE | 0302 | PEMPT | 0003 | PENB | 0000 | PIR | 0001 |
| PL | 007A | PR | 0005 | PRI | 0078 | PRIEQ | 0310 |
| PRIEQ1 | 031B | PRIOTY | 0713 | PSTART | 04DC | R0 | 0000 |
| * R1 | 0001 | * R2 | 0002 | * R3 | 0003 | R4 | 0004 |
| R5 | 0005 | R6 | 0006 | R7 | 0007 | R8 | 0008 |

| | | | | | | | |
|---|---|---|---|---|---|---|---|
| R9 | 0009 | RDEC | 0000 | * RE1 | 0001 | * RE2 | 0002 |
| * RE3 | 0003 | * RE4 | 0004 | * RE5 | 0005 | * RE6 | 0006 |
| REC | 0002 | REK | 000F | REV | 0003 | RK10 | 00B6 |
| RK20 | 00CB | RK30 | 008E | RK40 | 00FC | RK50 | 00EC |
| RKBD | 0090 | RKER2 | 0099 | RKERR | 00B3 | RLA | 0036 |
| RMR | 01AA | RODEC | 086C | RS | 000E | RSD1 | 05A8 |
| RST | 0717 | RST10 | 0720 | RST20 | 0725 | RST30 | 072A |
| RSWDAT | 059F | RTBP | 00FC | RV | 0766 | RXME | 0020 |
| RXMD | 0024 | RXNC | 03B2 | RXNL | 03B0 | RXNQ | 03AD |
| RXNU | 039B | * S0 | 0000 | S1 | 0000 | * SA1 | 0000 |
| * SA2 | 0000 | SADR | 0260 | SB | 002E | * SB1 | 0000 |
| * SB2 | 0000 | SBF | 0015 | SC | 0003 | * SC1 | 0000 |
| * SC2 | 0000 | SCAN | 0000 | * SCDW | 0003 | SCN | 072C |
| SCN1 | 0743 | SCN2 | 0762 | SCNMSK | 074D | SCNPRI | 073E |
| * SD1 | 0000 | * SD2 | 0000 | SDN | 0000 | SDT1 | 0354 |
| SDT2 | 0356 | * SE1 | 0000 | * SE2 | 0000 | * SE0 | 00C0 |
| * SEG1 | 00C1 | * SEG10 | 00CA | * SEG11 | 00CB | * SEG12 | 00CC |
| SEG13 | 00CD | SEG14 | 00CE | SEG15 | 00CF | SEG16 | 00D0 |
| SEG17 | 00D1 | SEG18 | 00D2 | SEG19 | 00D3 | * SEG2 | 00C2 |
| * SEG20 | 00D4 | * SEG3 | 00C3 | * SEG4 | 00C4 | * SEG5 | 00C5 |
| SEG6 | 00C6 | * SEG7 | 00C7 | * SEG8 | 00C8 | SEG9 | 00C9 |
| SER1 | 065C | SER2 | 0624 | * SER3 | 0629 | SER4 | 062D |
| SET3S | 001A | SET3SL | 0013 | * SETSO1 | 0657 | SETSOF | 0653 |
| SETUP | 05C5 | * SF1 | 0000 | * SF2 | 0000 | * SG1 | 0000 |
| * SG2 | 0000 | SH | 019E | SHCH | 02B8 | SI | 0220 |
| SIGN | 0003 | SIOB | 000F | SIOC | 001F | SIOS | 000E |
| SLRX | 01EA | SLTX | 01E5 | * SNC1 | 075B | SNC2 | 075E |
| SPRI | 0000 | SPS | 029C | SOF | 0001 | SRX | 0000 |
| SSP | 00FF | STA | 00FF | STNH | 0001 | STNL | 0000 |
| * STX | 0000 | SV | 000E | SWNX | 0207 | SY1 | 0003 |
| SY2 | 000A | SY3 | 000B | SY4 | 0003 | SY5 | 000E |
| T02 | 0001 | * T05 | 0002 | T200 | 01B3 | T2XX | 01BF |
| T500 | 01C3 | TAS | 0046 | TAX | 007E | TAZ | 0056 |
| * TAZ1 | 0058 | TC1 | 00F4 | TC1C | 001C | TC2 | 00F8 |
| TC2C | 001D | * TD | 0007 | * TDR | 0008 | TEQ | 0002 |
| TIM1 | 0412 | TIM2 | 0423 | TIM3 | 0434 | TIM4 | 045D |
| TIM40 | 0440 | * TIM4X | 043A | * TIM5 | 0446 | * TIM6 | 044E |
| TIM8 | 0455 | * TIM9 | 0459 | TIMR | 03FD | * TM | 0001 |
| * TOUN | 0001 | * TON1 | 0005 | TOND | 03E6 | * TOR | 0000 |
| TFO | 0076 | TPR | 004E | * TRCH | 0009 | TRN | 012C |
| TRN1 | 0003 | TRNZ | 012E | TV | 0019 | TX | 0000 |
| TXI | 0001 | TXK | 000D | TXME | 0028 | TXMO | 002C |
| TXN | 0533 | * TXN1 | 0001 | * TXN2 | 0002 | TXNC | 0393 |
| TXNL | 0393 | TXNQ | 0396 | TXRX | 0001 | TXZ | 02C0 |
| TXZ0 | 02C6 | * TXZ1 | 02C7 | WK1 | 0002 | WK2 | 0003 |
| WK3 | 0006 | XREG | 007C | Z10 | 04BA | Z20 | 04CB |
| ZDSP | 0141 | ZSP | 0003 | | | | |

DEFINED 458 USER SYMBOL(S)

A>

The invention is claimed as follows:

1. A microprocessor-controlled frequency-synthesized radio transceiver system comprising: frequency synthesizing means; microprocessor means for controlling the synthesis by said frequency synthesizing means of local-oscillator frequencies for both the transmitting and receiving of radio signals, said microprocessor means having a predetermined capacity for storage of data smaller than the capacity required to store sufficient data to control the synthesis of local-oscillator frequencies for a first plurality of radio frequencies comprising defined broadcast frequencies extending over a predetermined band of radio frequencies between given upper and lower frequency limits; transmitter circuit means and receiver circuit means, each capable of operating at all radio frequencies within said predetermined band; said transmitter circuit means and said receiver circuit means being respectively operatively coupled with said frequency synthesizing means; and control input means for programming said microprocessor means to control the synthesis of local-oscillator frequencies for a second plurality of radio frequencies comprising fewer than all of said first plurality of radio frequencies and requiring a quantity of data which is within the predetermined data storage capacity of the microprocessor means; wherein said frequency synthesizing means comprises phase-locked loop means coupled with said microprocessor means for synthesizing a plurality of local-oscillator frequencies including local-oscillator frequencies for all of the radio frequencies within said predetermined band; said microprocessor means being operative for producing predetermined control signals including data corresponding to local-oscillator frequencies for said second plurality of frequencies; said phase-locked loop means including PLL control means responsive to said predetermined control signals for controlling synthesis of corresponding local-oscillator frequencies, and dual-modulus selection means responsive to a predetermined one of said predetermined control signals for controlling synthesis of a first group of local-oscillator frequencies in response to predetermined corresponding data from said microprocessor; said dual-modulus selection means being further responsive to a second predetermined one of said predetermined control signals for controlling synthesis of a second group of local-oscillator frequencies in response to the same predetermined corresponding data from said microprocessor means.

2. A system according to claim 1, which further includes variable tuning means for tuning both said transmitter circuit means and said receiver circuit means for operating at radio frequencies within at least one segment of said predetermined band of radio frequencies; said at least one segment comprising a predetermined range of radio frequencies selectable at any portion of said predetermined band and including said second plurality of radio frequencies within said predetermined control capacity of said microprocessor means.

3. A system according to claim 2 wherein said variable tuning means comprises first tunable bandpass filter means coupled in circuit with said receiver circuit means and second tunable bandpass filter means coupled in circuit with said transmitter circuit means.

4. A system according to claim 2 wherein said variable tuning means is operative for tuning both said transmitter circuit means and said receiver circuit means for operation over two segments of said predetermined band of radio frequencies, each of said two segments comprising a predetermine range of radio frequencies selectable at any portion of said predetermined band; and said two segments together including said second plurality of radio frequencies which is within the control capacity of said microprocessor means.

5. A system according to claim 4 wherein said variable tuning means comprises first tunable bandpass filter means coupled in circuit with said receiver circuit means and second tunable bandpass filter means coupled in circuit with said transmitter circuit means.

6. A system according to claim 5 wherein each of said first and second tunable bandpass filter means comprises first variable impedance means for tuning to radio frequencies in one of said two segments and second variable impedance means for tuning to radio frequencies in the other of said two segments.

7. A system according to claim 2 wherein said predetermined band of radio frequencies includes radio frequencies from 136 MHz to 174 MHz.

8. A system according to claim 7 wherein said at least one predetermined segment comprises a pair of similar segments, each of substantially on the order of 3 MHz wide and selectable at any portion of said predetermined band.

9. A system according to claim 1 wherein said control input means comprises keyboard means coupled in circuit with said microprocessor means; said keyboard means being responsive to operator actuation in a predetermined fashion for developing signals corresponding to data for controlling said synthesis of local-oscillator frequencies for said second plurality of radio frequencies.

10. A system according to claim 1 wherein said phase-locked loop means further includes range selection means for selecting a range of operation thereof for synthesizing said second plurality of local-oscillator frequencies in response to said data from said microprocessor.

11. A system according to claim 1 wherein said phase-locked loop means further includes VCO means responsive to each of a plurality of predetermined voltage-control signals for generating a local-oscillator signal at a corresponding frequency said PLL control means being coupled with said VCO means and responsive to said microprocessor control signals for producing said predetermined voltage-control signals in a predetermined fashion; and wherein said dual-modulus selection means comprises selectable modulus prescaler means coupled intermediate said VCO means and said PLL control means and responsive to each local-oscillator signal for producing a scaled feedback control signal at a frequency corresponding to said local-oscillator signal divided by a selected modulus.

12. A system according to claim 11 which further includes variable tuning means for tuning both said transmitter circuit means and said receiver circuit means for operating at radio frequencies within at least one segment of said predetermined band of radio frequencies; said at least one segment comprising a predetermined range of radio frequencies selectable at any portion of said predetermined band and including said second plurality of radio frequencies within said predetermined control capacity of said microprocessor means; and wherein said phase-locked loop means further includes adjustable range control means coupled intermediate said PLL control means and said VCO means for selecting at least one range of operation of said VCO means corresponding to said at least one segment.

13. A system according to claim 1 wherein said phase-locked loop means further includes VCO means responsive to each of a plurality of predetermined voltage-control signal for generating a local-oscillator signal at a corresponding frequency; said PLL control means being coupled with said VCO means and responsive to said microprocessor control signals for producing said predetermined voltage-control signals in a predetermined fashion; and wherein said dual-modulus selection means comprises selectable modulus prescaler means coupled intermediate said VCO means and said PLL control means and responsive to each local-oscillator signal for producing a scaled feedback control signal at a frequency corresponding to said local-oscillator signal divided by a selected modulus.

14. A system according to claim 13 wherein said phase-locked loop means further includes adjustable range control means coupled intermediate said PLL control means and said VCO means for selecting two ranges of operation of said VCO means corresponding respectively to said two segments.

15. A system according to claim 14 wherein said range control means further includes adjustable means for adjusting operation of said VCO means to produce frequencies within each of said two ranges of operation; and selection means responsive to predetermined ones of said microprocessor means control signals for thereafter selecting between said two ranges of frequencies of VCO operation.

* * * * *